(12) United States Patent
Nashida

(10) Patent No.: US 10,455,184 B2
(45) Date of Patent: Oct. 22, 2019

(54) DISPLAY DEVICE AND INFORMATION PROCESSING TERMINAL DEVICE

(71) Applicant: Sony Corporation, Tokyo (JP)

(72) Inventor: Tatsushi Nashida, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 16/075,295

(22) PCT Filed: Jan. 26, 2017

(86) PCT No.: PCT/JP2017/002810
§ 371 (c)(1),
(2) Date: Aug. 3, 2018

(87) PCT Pub. No.: WO2017/159063
PCT Pub. Date: Sep. 21, 2017

(65) Prior Publication Data
US 2019/0075269 A1 Mar. 7, 2019

(30) Foreign Application Priority Data

Mar. 14, 2016 (JP) ................................. 2016-050052

(51) Int. Cl.
*H04N 7/14* (2006.01)
*H04N 5/64* (2006.01)
(Continued)

(52) U.S. Cl.
CPC ................. *H04N 5/64* (2013.01); *H04N 5/38* (2013.01); *H04N 7/18* (2013.01);
(Continued)

(58) Field of Classification Search
CPC ....................................................... H04N 7/14
See application file for complete search history.

(56) References Cited

U.S. PATENT DOCUMENTS 5,905,525 A 5/1999 Ishibashi et al.
2009/0027381 A1* 1/2009 Lee ...................... H04N 13/398
345/419

(Continued)

FOREIGN PATENT DOCUMENTS

JP 08-191419 7/1996
JP 09-037137 2/1997
(Continued)

OTHER PUBLICATIONS

International Search Report corresponding to PCT/JP2017/002810, dated Feb. 28, 2017 (3 pgs.).

(Continued)

*Primary Examiner* — Olisa Anwah
(74) *Attorney, Agent, or Firm* — Lerner, David, Littenberg, Krumholz & Mentlik, LLP

(57) ABSTRACT

Provided is a display device configured to display a video, and an information processing terminal device configured to control transmission of a video to the display device.
When a video-reproducing device detects a jumping movement of a user, the video-reproducing device determines that an instruction is given to move a viewpoint position to a place on which a target mark is displayed, and transmits a request for stopping transmission to a video-providing device as a transmission source of a currently displayed video, and transmits a request for starting transmission to a video-providing device as a moving destination. When transmission of a video from the video-providing device as the moving destination is started, the movement in viewpoint is achieved, and a video captured from a new viewpoint position is allowed to be viewed on the video-reproducing device.

3 Claims, 53 Drawing Sheets

(51) Int. Cl.
*H04N 7/18* (2006.01)
*H04N 21/2668* (2011.01)
*H04N 21/41* (2011.01)
*H04N 21/4728* (2011.01)
*H04N 5/38* (2006.01)

(52) U.S. Cl.
CPC ......... *H04N 21/2668* (2013.01); *H04N 21/41* (2013.01); *H04N 21/4728* (2013.01)

(56) References Cited

U.S. PATENT DOCUMENTS

| | | | |
|---|---|---|---|
| 2010/0020185 A1 | 1/2010 | Sako et al. | |
| 2012/0105308 A1* | 5/2012 | Chang | G09F 9/33 345/1.3 |
| 2013/0093785 A1* | 4/2013 | Zhang | G09G 3/003 345/619 |
| 2015/0293362 A1 | 10/2015 | Takahashi et al. | |
| 2016/0210783 A1* | 7/2016 | Tomlin | G06T 19/006 |
| 2017/0090556 A1* | 3/2017 | Baba | G06F 3/012 |
| 2017/0168303 A1* | 6/2017 | Petrov | G02B 27/0176 |
| 2017/0201731 A1* | 7/2017 | Brown | H04N 9/3185 |
| 2017/0322624 A1* | 11/2017 | Niccolini | H04N 7/181 |

FOREIGN PATENT DOCUMENTS

| | | |
|---|---|---|
| JP | 2001189927 A | 7/2001 |
| JP | 2003153263 A | 5/2003 |
| JP | 200478736 A | 3/2004 |
| JP | 2005302103 A | 10/2005 |
| JP | 2006186645 A | 7/2006 |
| JP | 2007208340 A | 8/2007 |
| JP | 2010068059 A | 3/2010 |
| JP | 2012194579 A | 10/2012 |
| JP | 2013141272 A | 7/2013 |
| JP | 2013169234 A | 9/2013 |
| WO | 2014077046 A1 | 5/2014 |

OTHER PUBLICATIONS

Erika Oishi et al., "Haptic Force Feedback System by Pulling Clothes," Entertainment Computing Symposium (EC2015), Oct. 27, 2015, pp. 95-99.

* cited by examiner

VIDEO-PROVIDING DEVICE 500

VIDEO-PROVIDING DEVICE 1900

VIDEO-PROVIDING DEVICE 1900

DISPLAY DEVICE AND INFORMATION PROCESSING TERMINAL DEVICE

CROSS-REFERENCE TO RELATED APPLICATIONS

This application is a national phase entry under 35 U.S.C. § 371 of International Application No. PCT/JP2017/002810 filed Jan. 26, 2017, which claims the priority from Japanese Patent Application No. 2016-050052 filed in the Japanese Patent Office on Mar. 14, 2016, the entire contents of which are hereby incorporated by reference.

TECHNICAL FIELD

A technology disclosed herein relates to a display device configured to display a video, and an information processing terminal device configured to control transmission of a video to a display device.

BACKGROUND ART

A technology for capturing and viewing a 360 degree full-dome video has been researched and developed. For example, the technology is mainly applied to a field of entertainment video such as sports or concert relay, intangible cultural heritage or education content, or the like. The technology is gradually applied to services providing virtual visit and experience of a real space.

A viewer can freely select a viewpoint position or a line-of-sight direction, enjoying a full-dome video. For example, a head mount display which is used by being mounted to the viewer's head can be used to view a full-dome video. The movement of the viewer's head is detected to display the full-dome video while changing the viewpoint position or the line-of-sight direction on the basis of a result of the detection. Therefore, the viewer can have experience as if he/she actually visit and experience a space where the full-dome video is captured.

For example, a head mount display system is proposed which includes an imaging system configured to capture a wide-angle image having a wider field of view than that of the image actually displayed, and extracts and displays an image to be displayed which a user should view, on the basis of information about the position of the user's head detected by a rotation angle sensor (e.g., see Patent Document 1).

Furthermore, a mobile camera device is proposed which includes a head mount display configured to be mounted to a viewer's head, an angular velocity sensor configured to detect the rotation of the viewer's head, and a camera direction calculation device configured to calculate a rotation angle of the viewer's head and turn right and left cameras (e.g., see Patent Document 2). In addition, a mobile camera system is proposed which includes a control server to manage the positions of a plurality of mobile camera devices installed on a mobile body, such as a vehicle, and images acquired therefrom in an image database, in which the control server searches the image database for an image satisfying an imaging request transmitted from a terminal device or acquires, from a new mobile camera device, an image satisfying the imaging request, and transmits the image to the terminal device (e.g., see Patent Document 3).

CITATION LIST

Patent Document

Patent Document 1: Japanese Patent Application Laid-Open No. H8-191419

Patent Document 2: Japanese Patent Application Laid-Open No. H9-37137

Patent Document 3: Japanese Patent Application Laid-Open No. 2006-186645

Patent Document 4: Japanese Patent Application Laid-Open No. 2005-302103

Patent Document 5: Japanese Patent Application Laid-Open No. 2007-208340

SUMMARY OF THE INVENTION

Problems to be Solved by the Invention

An object of a technology disclosed herein is to provide a display device configured to display a video, and an information processing terminal device configured to control transmission of a video to a display device.

Solutions to Problems

A technology disclosed herein has been made in consideration of the problems described above, and according to a first aspect of the present technology,
a display device includes
a spherical display unit,
a reception unit configured to receive an image from an external device,
a sensor unit configured to measure a line of sight, a head position, or a posture of a user, and
a control unit,
in which when a first image received from a first external device is displayed on the display unit, the control unit receives a second image from a second external device included in the first image, on the basis of at least one of a line of sight, a head position, and a posture of a user measured by the sensor unit, and the control unit causes the display unit to display the second image.

According to a second aspect of the technology disclosed herein, the display device according to the first aspect further includes a transmission unit configured to transmit information to the external device. In addition, the control unit is configured to transmit information measured by the sensor unit to the second device to display the second image.

According to a third aspect of the technology disclosed herein, the display device according to the first aspect further includes a sound collection unit. In addition, the control unit is configured to transmit audios collected by the sound collection unit to the external device.

According to a fourth aspect of the technology disclosed herein, the display device according to the first aspect includes at least one of an air blowing unit, a temperature control unit, a moisture control unit, a tactile control unit, a vibration control unit, and a scent generation unit. In addition, the control unit is configured to control the air blowing unit, the temperature control unit, the moisture control unit, the tactile control unit, the vibration control unit, and the scent generation unit, depending on a content of an image received from the external device and displayed on the display unit.

According to a fifth aspect of the technology disclosed herein, the display device according to the first aspect further includes a measurement unit configured to measure pressure acting between a user's foot and a ground surface with which the user's foot makes contact. In addition, the control unit is configured to switch the first image and the second image to control display according to a result of measurement by the measurement unit.

According to a sixth aspect of the technology disclosed herein, the display unit of the display device according to the first aspect includes a plurality of projection units configured to project images on a screen. In addition, the control unit is configured to control the projection unit to prevent generation of a shadow on the screen.

Furthermore, according to a seventh aspect of the technology disclosed herein, an information processing terminal device includes an imaging unit, a transmission unit configured to transmit an image captured by the imaging unit, a reception unit configured to receive a predetermined signal from an external device, and a control unit, in which the control unit controls transmission of an image captured by the imaging unit to the external device, on the basis of line-of-sight information or posture information contained in the predetermined signal.

According to an eighth aspect of the technology disclosed herein, in the information processing terminal device according to the seventh aspect, the imaging unit is configured to capture a full dome image, and the control unit is configured to control identification of a predetermined image from the full dome image and transmission of the predetermined image, on the basis of the line-of-sight information or the posture information.

Effects of the Invention

The technology disclosed herein enables provision of a display device configured to display a video, and an information processing terminal device configured to control transmission of a video to a display device.

Note that the effects described herein are by way of example only, and the effects of the present invention are not limited to the description herein. Furthermore, the present invention may have additional effects in addition to the effects described above.

Other objects, characteristics, or advantages of the technology disclosed herein will be apparent from further detailed description based on embodiments described later and accompanying drawings.

MODE FOR CARRYING OUT THE INVENTION

Hereinafter, embodiments of a technology disclosed herein will be described in detail with reference to the drawings.

A. Over View of System

A-1. System Configuration

Figure 1:
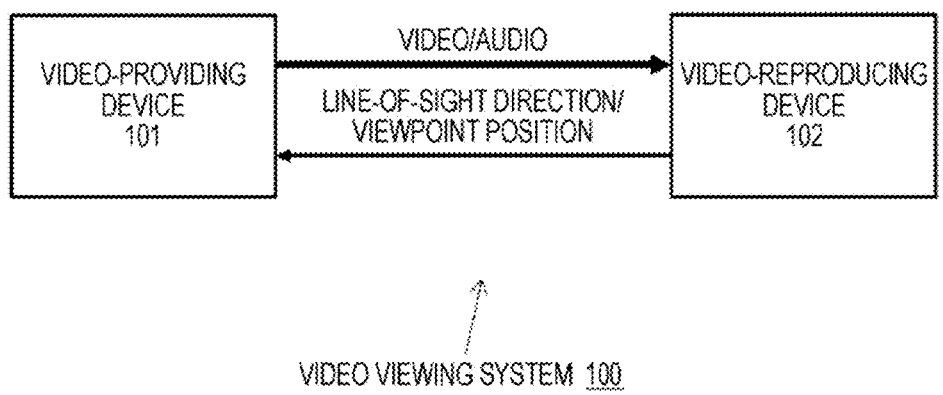
FIG. 1 is a schematic diagram illustrating an exemplary configuration of a video viewing system 100 for viewing a full-dome video.

FIG. 1 schematically illustrates an exemplary configuration of a video viewing system 100 for viewing a full-dome video. However, the full-dome video described below does not necessarily need to be 360 degrees, and may have a field of view partially less than 360 degrees. Furthermore, the full dome image may be a half celestial sphere image without a floor surface having less information (the same shall apply hereinafter).

The video viewing system 100 illustrated in FIG. 1 includes one video-providing device 101 configured to provide a full-dome video and one video-reproducing device 102 configured to reproduce the full-dome video, constituting a one-to-one network topology. The video-providing device 101 and the video-reproducing device 102 are connected to each other, for example, via a wireless or wired local area network (LAN) or a wide area network such as the Internet.

The video-providing device 101 includes an imaging unit configured to capture a full-dome video from an installation place thereof as a viewpoint position to transmit a video captured in any line-of-sight direction to the video-reproducing device 102. The imaging unit may include one omnidirectional camera, extracting a video having an angle of view in a line-of-sight direction from a captured full-dome video so as to be displayed by the video-reproducing device 102, transmitting the extracted video to the video-reproducing device 102. Alternatively, an imaging unit including one (wide-angle) camera may be installed on a line-of-sight changing device configured to desirably set a line-of-sight direction so that the camera is directed in a specified line-of-sight direction and a captured video is transmitted to the video-reproducing device 102. The line-of-sight changing device includes, for example, a three-axis table configured to support an imaging unit rotatably about two horizontal axes (X- and Y-axes) and one vertical axis (Z-axis).

Furthermore, the video-providing device 101 may further include a sound input unit such as a microphone, multiplexing a full-dome video and audio obtained by collecting sounds in a location where the full-dome video is captured, transmitting the multiplexed audio and video to the video-reproducing device 102.

The video-providing device 101 may be installed at a specific place as is a fixed point camera. Alternatively, the video-providing device 101 (or the imaging unit) may be mounted to human, animal, or a mobile body such as an automobile. In a case where the video-providing device 101 is mounted to the mobile body, to capture a video transmitted to the video-reproducing device 102, the video-providing device 101 is allowed to not only switch line-of-sight directions but also change a viewpoint position with the movement of the mobile body.

Meanwhile, the video-reproducing device 102 includes a display unit configured to display a full-dome video received from the video-providing device 101. The video-reproducing device 102 is configured, for example, as a head mount display mounted to a viewer's head to view a video to display a video having an angle of view in a specific line-of-sight direction of a full-dome video captured by the video-providing device 101. Alternatively, the video-reproducing device 102 may be configured as a dome display to display the whole of a full-dome video captured from an installation place of the video-providing device 101. For details of such a dome display, see, for example, Japanese Patent Application No. 2015-245710 which has been assigned to the present applicant. Alternatively, the video-reproducing device 102 may be a monitor display having a normal size (or having a large screen).

Furthermore, the video-reproducing device 102 may include an audio output unit such as a speaker or a headphone so that when an audio and a video are transmitted by multiplex from the video-providing device 101, the audio is reproduced and output along with the video.

The line-of-sight direction in which a video transmitted from the video-providing device 101 to the video-reproducing device 102 is captured (or a line-of-sight direction in which the video-providing device 101 performs imaging) is basically specified by the video-reproducing device 102. For example, the video-reproducing device 102 configured as the head mount display instructs the video-providing device 101 to change the line-of-sight direction on the basis of a result of detecting the movement of the viewer's head. As a matter of course, the system 100 is considered to be operated so that a device (not illustrated) other than the video-reproducing device 102 gives an instruction about the line-of-sight direction to the video-providing device 101.

Figure 2:
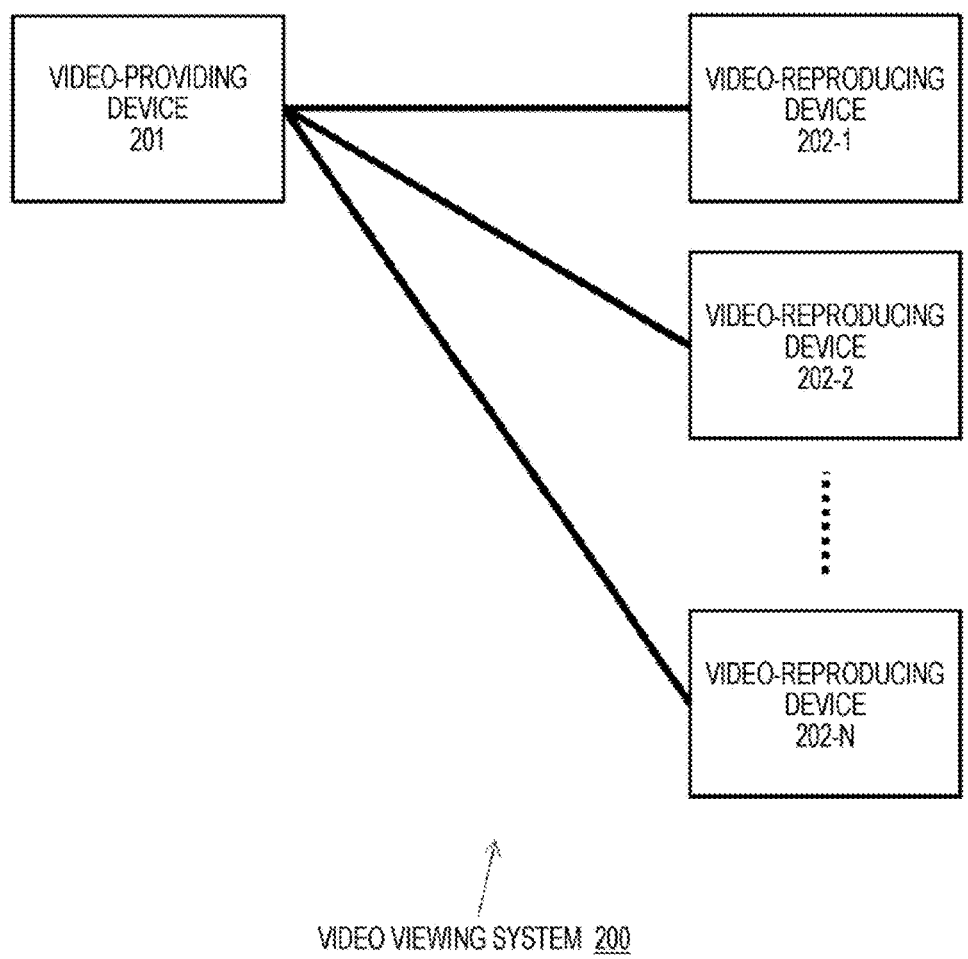
FIG. 2 is a schematic diagram illustrating an exemplary configuration of a video viewing system 200 for viewing a full-dome video.
Figure 3:
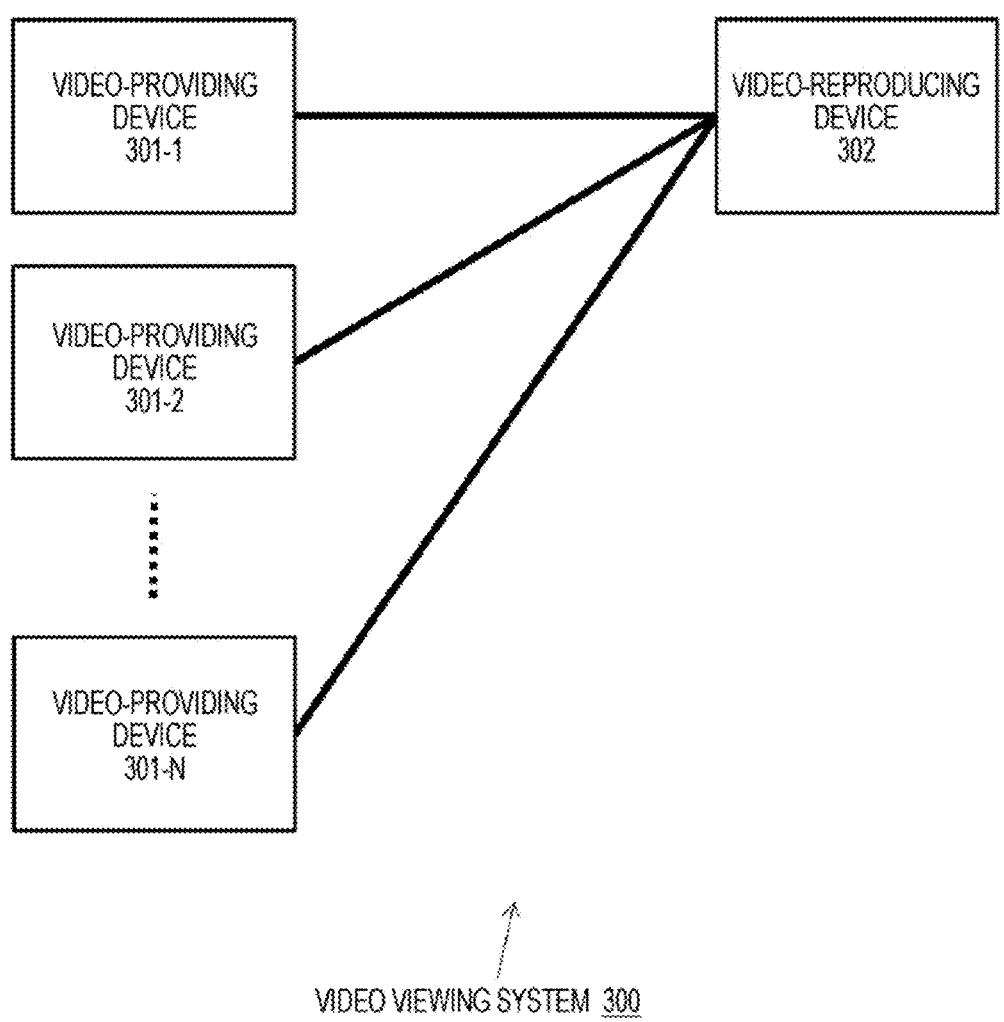
FIG. 3 is a schematic diagram illustrating an exemplary configuration of a video viewing system 300 for viewing a full-dome video.
Figure 4:
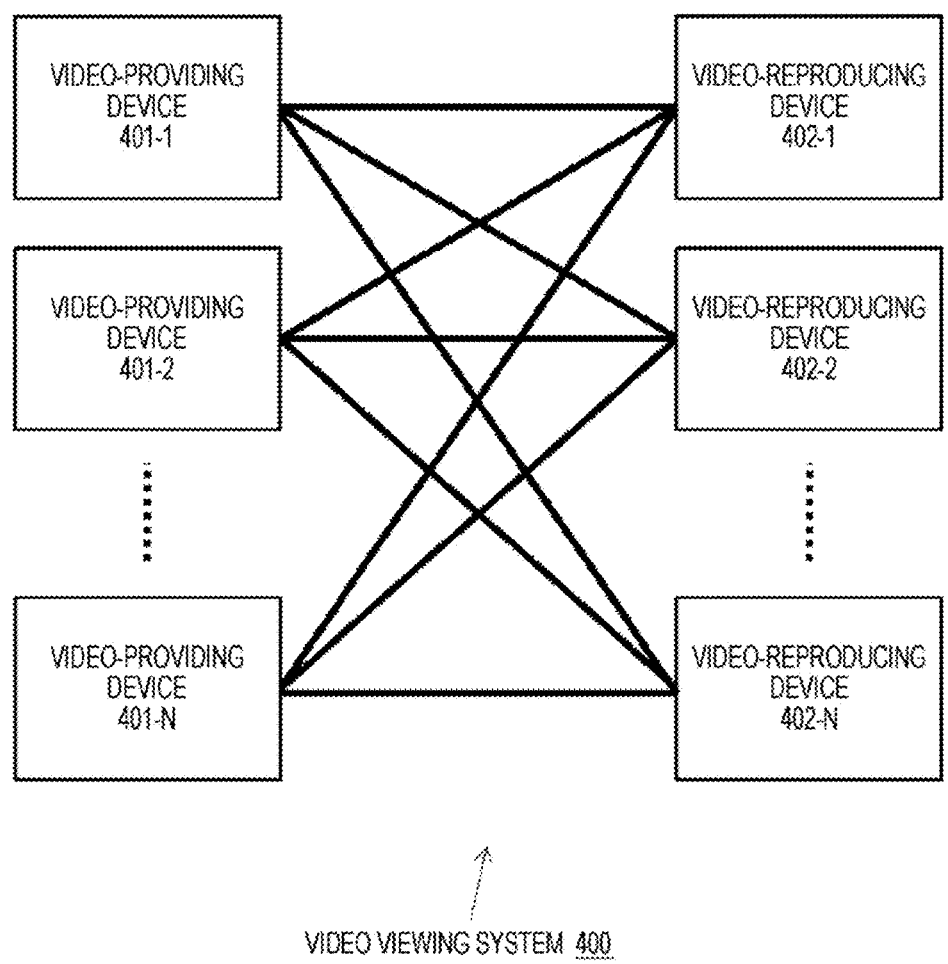
FIG. 4 is a schematic diagram illustrating an exemplary configuration of a video viewing system 400 for viewing a full-dome video.

FIGS. 2 to 4 illustrate modifications of the video viewing system 100 for viewing a full-dome video. In the video viewing system 100 illustrated in FIG. 1 includes one video-providing device 101 and one video-reproducing device 102, constituting the one-to-one network topology. In contrast, a video viewing system 200 illustrated in FIG. 2 includes one video-providing device 201 and a plurality of (N) video-reproducing devices 202-1, 202-2, . . . , and 202-N, constituting a one-to-N network topology. A full-dome video (a video captured in the same line-of-sight direction at the same viewpoint position) captured by the one video-providing device 201 is simultaneously viewed using the video-reproducing devices 202-1, 202-2, . . . , and 202-N.

Furthermore, a video viewing system 300 illustrated in FIG. 3 includes a plurality of (N) video-providing devices 301-1, 301-2, . . . , and 301-N and one video-reproducing device 302, constituting an N-to-one network topology. The one video-reproducing device 302 selectively receives a full-dome video from any of the video-providing devices 301-1, 301-2, . . . , and 301-N installed at different places, and the one video-reproducing device 302 displays the full-dome video. The video-reproducing device 302 dynamically switches a video transmission source between the video-providing devices 301-1, 301-2, . . . , and 301-N. When the video-providing devices 301 as the video transmission sources are switched, positions of viewpoints from which videos reproduced (viewed) by video-reproducing devices 302 are switched (a viewpoint position is instantaneously moved to an installation place of a selected video-providing device 301). Furthermore, the video-reproducing device 302 instructs a selected video-providing device 301 to switch the line-of-sight direction thereof.

Furthermore, a video viewing system 400 illustrated in FIG. 4 includes a plurality of (N) video-providing devices 401-1, 401-2, . . . , and 401-N and a plurality of (N) video-reproducing devices 402-1, 402-2, . . . , and 402-N, constituting an N-to-N network topology. The N-to-N network topology may include the 1-to-1 network illustrated in FIG. 1, the 1-to-N network illustrated in FIG. 2, and the N-to-one network illustrated in FIG. 3.

For example, the video viewing system 400 having the N-to-N network topology is considered to be operated so that a plurality of video-reproducing devices forms one viewing group, video-providing devices as a video providing source are switched for each viewing group, and a video captured in the same line-of-sight direction by the same video-providing device is simultaneously viewed.

Furthermore, each of the video viewing system 300 having the N-to-one network topology and the video viewing system 400 having the N-to-N network topology is also considered to be operated so that a plurality of video-providing devices forms one video group, a video-reproducing device selects a video group, and in the video group, a video is sequentially viewed while switching video-providing devices from which the video is received. When the video-providing devices as video transmission sources are switched, the position of a viewpoint from which a video is viewed and viewed using the video-reproducing device is instantaneously moved to an installation place of the latter video-providing device. The video-providing devices may be switched on the video-reproducing device by remote-control operation or the like similar to switching TV channels.

For example, in a facility, such as a soccer or baseball stadium, a sports stadium for athletic sports or the like, a concert hall, or the like a plurality of video-providing devices (cameras) is installed at different places to form one video group. Then, during a game, competition, or event, a video-reproducing device (or, a viewer of the video-reproducing device) is allowed to receive a video for viewing which is captured at desired viewpoint positions while sequentially switching the video-providing devices from which the videos are received.

Figure 5:
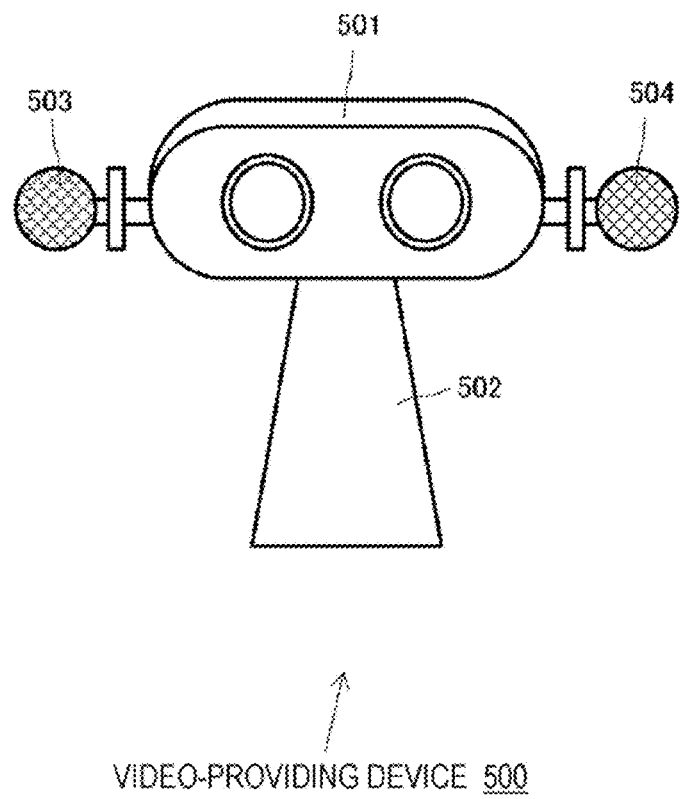
FIG. 5 is a diagram illustrating an exemplary appearance configuration of a video-providing device 500 usable for the video viewing systems 100 to 400.

FIG. 5 illustrates an exemplary appearance configuration of a video-providing device 500 usable for the video viewing systems 100 to 400. The video-providing device 500 illustrated in FIG. 5 includes an imaging unit 501, a support portion 502 configured to support the imaging unit 501, and sound input units 503 and 504. The imaging unit 501 includes a twin-lens stereo camera, but may include a wide-angle camera, a fish-eye camera, or a multi-lens omni-directional camera. Furthermore, the support portion 502 is, for example, a line-of-sight changing device including a three-axis table configured to support the imaging unit rotatably about two horizontal axes (X- and Y-axes) and one vertical axis (Z-axis), and the support portion 502 is allowed to set the imaging unit 501 in any line-of-sight direction. The imaging unit 501 constitutes a head portion, and the support portion 502 also functions as a drive unit configured to swing the head portion. Alternatively, in a case where the imaging unit 501 includes an omnidirectional camera, the support portion 502 may be caused to swing not to change a line-of-sight direction of the camera but to represent a direction of a video currently transmitted by a posture of the head portion. However, in a case where the imaging unit 501 is the omnidirectional camera, the support portion 502 may merely support the imaging unit 501. Furthermore, on the right and left sides of the imaging unit 501, microphones 503 and 504 are arranged to constitute a stereo microphone. Use of the stereo microphone enables three-dimensional reconstruction of collected sounds on a reproduction side (i.e., the video-reproducing device). An interval between the microphone 503 and the microphone 504 is substantially the same as an interval between right and left ears of a human, and the video-providing device 500 is allowed to acquire a sound image which a human hears at the installation place of the video-providing device 500.

Figure 6:
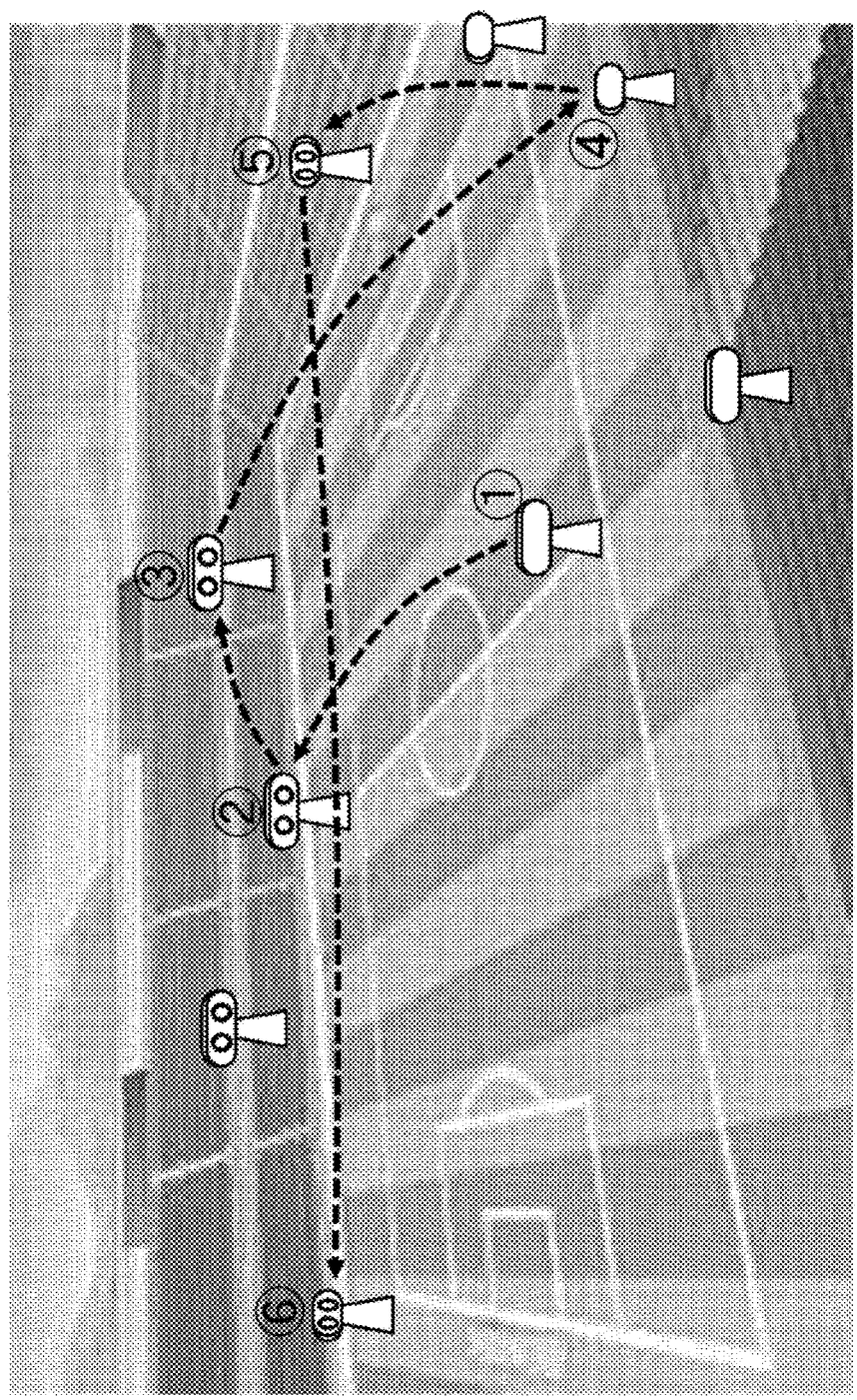
FIG. 6 is an exemplary diagram illustrating installation of a plurality of video-providing devices in a soccer stadium.

Furthermore, FIG. 6 illustrates an example of installation of a plurality of video-providing devices in a soccer stadium. The video-providing devices are configured to image a state in the stadium (e.g., a soccer game) while changing line-of-sight directions with installation places thereof as viewpoint positions. Although not illustrated in FIG. 6, a video-providing device (or an imaging unit thereof) may be mounted to a person on a pitch such as a soccer game player or referee or another mobile body. Furthermore, a camera movement system such as Spidercam configured to move a camera hung down from special ropes may be used as a video-providing device.

Spectators on a stand, viewers at home, and the like are allowed to use a video-reproducing device including a head mount display or a dome display to view a video from any of the video-providing devices installed in the stadium. Furthermore, a line-of-sight direction of each video-providing device is changeable to view a video captured in another line-of-sight direction at the same viewpoint position. For example, in a case where a video-providing device images a ball or a specific player while tracking the movement of the ball or the movement of the specific player at the same viewpoint position, a video in which a line-of-sight direction is changed to track the movement of the ball or the specific player is viewed on the video-reproducing device side.

Furthermore, switching video-providing devices as video transmission sources enables instantaneous movement of the position of a viewpoint from which a video displayed on a video-reproducing device is captured. For example, in a case where a long pass is made, a video is switched to another one captured by a video-providing device which is located nearest to a current ball position. Furthermore, in a case where a dribbling player turns (sudden change in direction), a video is switched to another one captured by a video-providing device which is capable of capturing the front view of the player. In FIG. 6, an exemplary route along which the video-providing devices as the transmission sources are switched (i.e., movement in the viewpoint position) is represented by dashed arrows. The movement in viewpoint will be described later in detail.

A-2. Viewing Restriction on Full-Dome Video

Unrestricted distribution of a video captured by a video-providing device and sound collected by the video-providing device may cause a problem relating to privacy or a secret at an installation place of the video-providing device. Therefore, the number of video-reproducing devices to which the video-providing device transmits a video and audio (i.e., permits viewing) may be limited, or the range of information provided to video-reproducing devices may be limited.

For example, a video-providing device gives viewing authority to a user of a video-reproducing device (i.e., viewer) in accordance with a user attribute, and when receiving a request for transmission of a video or the like from the video-reproducing device, the video-providing device determines whether to transmit an audio or a video or limits the range of information, in accordance with the user attribute.

Here, the user attribute includes, in addition to personal information such as user's age, sex, birthplace, occupation, or qualification, information about viewing records in the past such as an accumulated viewing time, a relationship (family relationship, friendship, or business relationship, or the like) with a user on the video-providing device side (an owner of the video-providing device, a manager of installation place of the video-providing device, or the like), evaluation of a viewer by the user on the video-providing device side, and a reputation (posting, voting result, or the like) by another user on the video-providing device side, or the like.

Furthermore, in a case where a plurality of video-reproducing devices forms one viewing group (the video viewing system 200 having the 1-to-N network topology or the video viewing system 400 having the N-to-N network topology), each user of the video-reproducing device is not restricted in viewing, but viewing authority may be given to each viewing group on the basis of a user attribute as a viewing group, for viewing restriction similar to that as described above to each viewing group.

Alternatively, a full-dome video viewing service may be provided for a price so that viewing authority is set depending on money paid by a user of the video-reproducing device (or viewing group).

Furthermore, a method for limiting information provided from a video-providing device to a video-reproducing device includes transmission of only video (transmission of no audio), transmission of only audio (transmission of no video), limitation of the line-of-sight direction (limitation of a range capturing a full-dome video), video resolution control (including mosaicing or masking partial area of full-dome video or specific object), audio modulation (e.g., modulating voice of a specific person (or a person other than the specific person)), or the like.

For example, as described below, viewing authority may be stepwisely set and applied to a video-reproducing device or to a viewing group in accordance with a user attribute so that a range of information transmitted from a video-providing device is controlled.

(1) Transmission of all video and audio is permitted.
(2) Transmission of only video is permitted.
(3) Transmission of only audio is permitted.
(4) Change in line-of-sight direction to a partial area of a full-dome video is prohibited.
(5) Mosaicing or masking is applied to the whole or part of the area of a full-dome video or a video of a specific object.
(6) Movement in viewpoint position is partially or wholly prohibited.
(7) Modulation is applied to part of audio (e.g., voice of a person other than a registered person).
(8) Transmission of no video and no audio is permitted.

Note that, in (6), the restriction of movement in viewpoint position may be applied to, for example, movement in viewpoint position by switching video-providing devices as video transmission sources in the video viewing system 300 having the N-to-one network topology in which a plurality of video-providing devices forms a video group (restriction of switching to a specific video-providing device) or use of a video-providing device mounted to a mobile body (restriction of movement into a specific area).

There may be a user (viewer) of the video-reproducing device who does not desire to view an audio or a video received from the video-providing device without restriction. Therefore, the video-reproducing device may be configured to restrict reproduction output of a received audio or video in accordance with an attribute of each video-providing device.

Here, the attribute of the video-providing device include, for example, a user attribute of the video-providing device, an installation place of the video-providing device, or the like. The user attribute includes, in addition to personal information such as user's age, sex, birthplace, occupation, or qualification, information about imaging records in the past such as an accumulated imaging time, a relationship (family relationship, friendship, or business relationship, or the like) with a user (viewer) on the video-reproducing device side, evaluation of a video-providing device by a viewer, evaluation (posting, voting result, or the like) by another viewer, or the like.

Furthermore, in a case where a plurality of video-providing devices forms a video group (the video viewing system 300 having the N-to-one network topology or the video viewing system 400 having the N-to-N network topology), reproduction output of an audio or a video on the video-reproducing device side may be controlled not for each video-providing device but on the basis of attribute information as a video group.

Alternatively, viewing restriction may be applied on the basis of not an attribute of each video-providing device but an individual situation of the video-reproducing device side. For example, the video-reproducing device displays only a video without an audio while the viewer talks (including on the phone), and outputs only an audio while the viewer visually performs another operation. Furthermore, when a scene or an object which the viewer does not desire to view (or the viewer is forbidden to view) is found in a screen, the video-reproducing device performs mosaicing, masking, or the like.

In the video-reproducing device, a mode for restricting reproduction output of an audio or a video includes display of only video (output of no audio), output of only audio (display of no video), limitation of a line-of-sight direction (limitation of a range displaying a full-dome video), video resolution control (including mosaicing or masking a specified area of a full-dome video or a specific object in a field of view, or filtering such as parental control), audio modulation (e.g., modulating or muting voice of a specific person (or a person other than the specific person)), or the like.

For example, as described below, viewing restriction may be stepwisely set and applied to a video-providing device or to a video group in accordance with a user attribute so that information viewed on a video-reproducing device is controlled.

(1) All video and audio are reproduced and output.
(2) Only video is displayed.
(3) Only audio is output.
(4) The line of sight is prevented from being directed to a partial area of a full-dome video.
(5) Mosaicing or masking is applied to display a video of the whole or part of the area of a full-dome video or a specific object.
(6) Movement in viewpoint position is partially or wholly prohibited.
(7) No video and no audio are reproduced and output.

Note that, in (6), the restriction of movement in viewpoint position may be applied to, for example, movement in viewpoint position by switching video-providing devices as video transmission sources in the video viewing system 300 having the N-to-one network topology in which a plurality of video-providing devices forms a video group (restriction of switching to a specific video-providing device) or use of a video-providing device mounted to a mobile body (restriction of movement into a specific area).

It can be also said that the viewing restriction is to filter an audio or a video. A method of achieving the viewing restriction includes a method of filtering all information tentatively received from a video-providing device, by a video-reproducing device upon reproduction output, or a method of filtering information on the video-providing device side. In the method of filtering information on the video-providing device side, information amount transmitted from a video-providing device is reduced for efficient use of a communication band, but preliminary processing for setting the viewing restriction is required to start transmission of audio or video information to a video-reproducing device.

A-3. Process of Setting Fixed Number of Video-Reproducing Devices

The video viewing system 200 having the 1-to-N network topology as illustrated in FIG. 2 (including the video viewing system 400 having the N-to-N network topology as illustrated in FIG. 4) requires simultaneously transmission of a video from one video-providing device 201 to a large number of video-reproducing devices 202-1, 202-2, . . . in real time. A larger number of video-reproducing devices cause a problem that video transmission is clearly delayed due to a limited communication band permitted for the video viewing system 200.

Therefore, a fixed number (upper limit) of video-reproducing devices to which a video-providing device simultaneously transmits a video in real time may be set. Here, the fixed number of video-reproducing devices represents, for example, the number of video-reproducing devices defined in accordance with limitation of capacity in the communication band or the like. Alternatively, in consideration of a situation of a user on the video-providing device side, a permissible number of video-reproducing devices as transmission destinations of a video captured at a viewpoint position being a current position of a video-reproducing device may be set to the fixed number (e.g., a smaller number of video-reproducing devices may be set to the fixed number to prevent diffusion of information).

Note that in the video viewing system 300 or 400 having a plurality of video-providing devices as illustrated in FIG. 3 or 4, the fixed number (the number of video-reproducing devices) may be set in common for the system as a whole or the respective video-providing devices may set the fixed number.

In a case where new extra video-reproducing devices making a request for video transmission in addition to the fixed number of video-reproducing devices, a video-providing device excludes as many video-reproducing devices as exceed the fixed number so that the number of video-reproducing devices simultaneously distributing a real-time video falls within the fixed number.

A method of selecting a video-reproducing device to be excluded includes the following methods.

Figure 7:
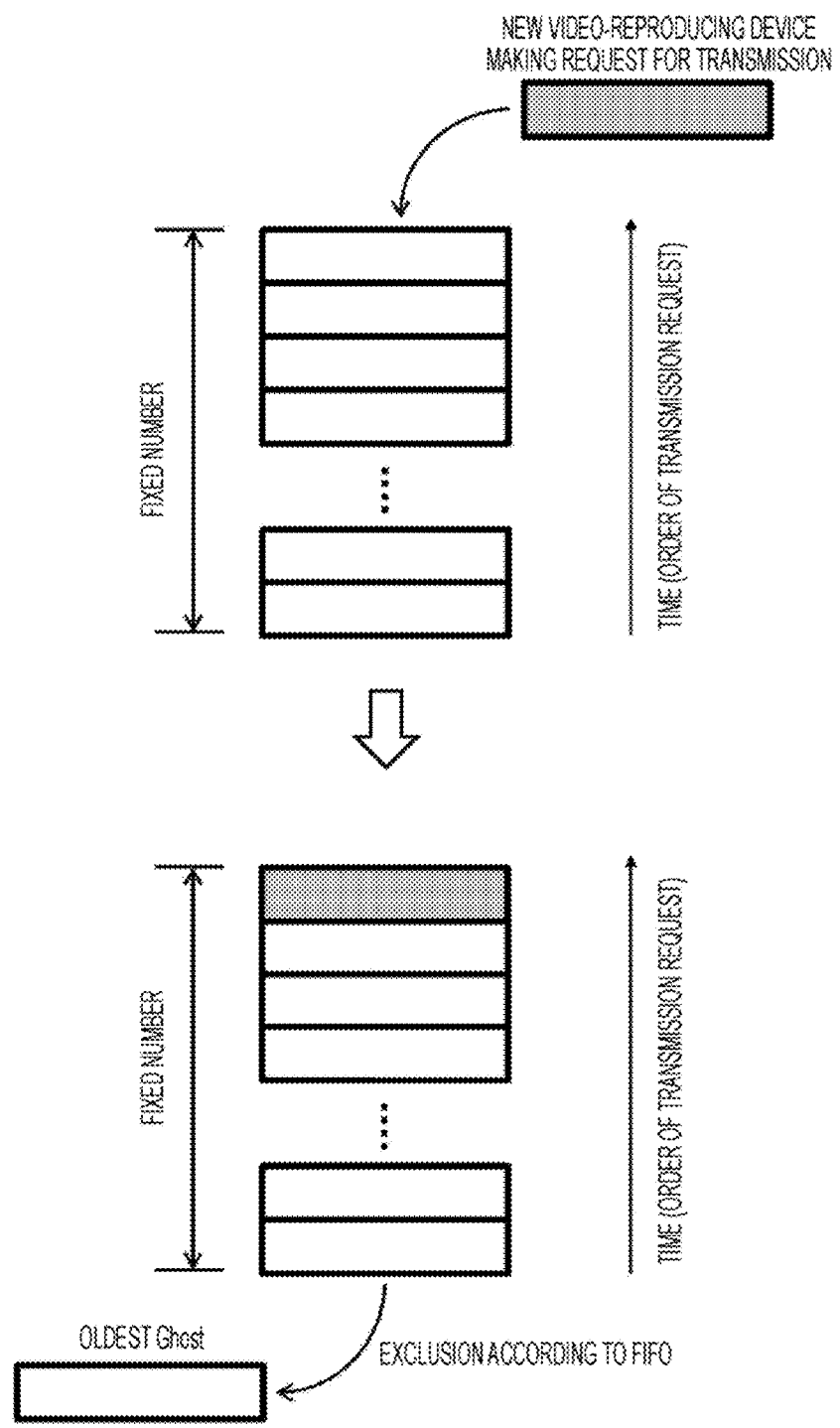
FIG. 7 is an exemplary diagram illustrating a process (FIFO method) of limiting the number of video-reproducing devices to which a video is transmitted from one video-providing device within a fixed number.

(1) First in first out (FIFO) method
(2) Last in first out (LIFO) method
(3) Prioritization method According to the FIFO method, video-reproducing devices making a request earlier for starting transmission are sequentially excluded, enabling a new video-reproducing device to receive a video (see FIG. 7). Therefore, the FIFO method has a merit that the users (viewers) of the video-reproducing devices can equally have an opportunity to view a video captured at a viewpoint position of a video-providing device.

Figure 8:
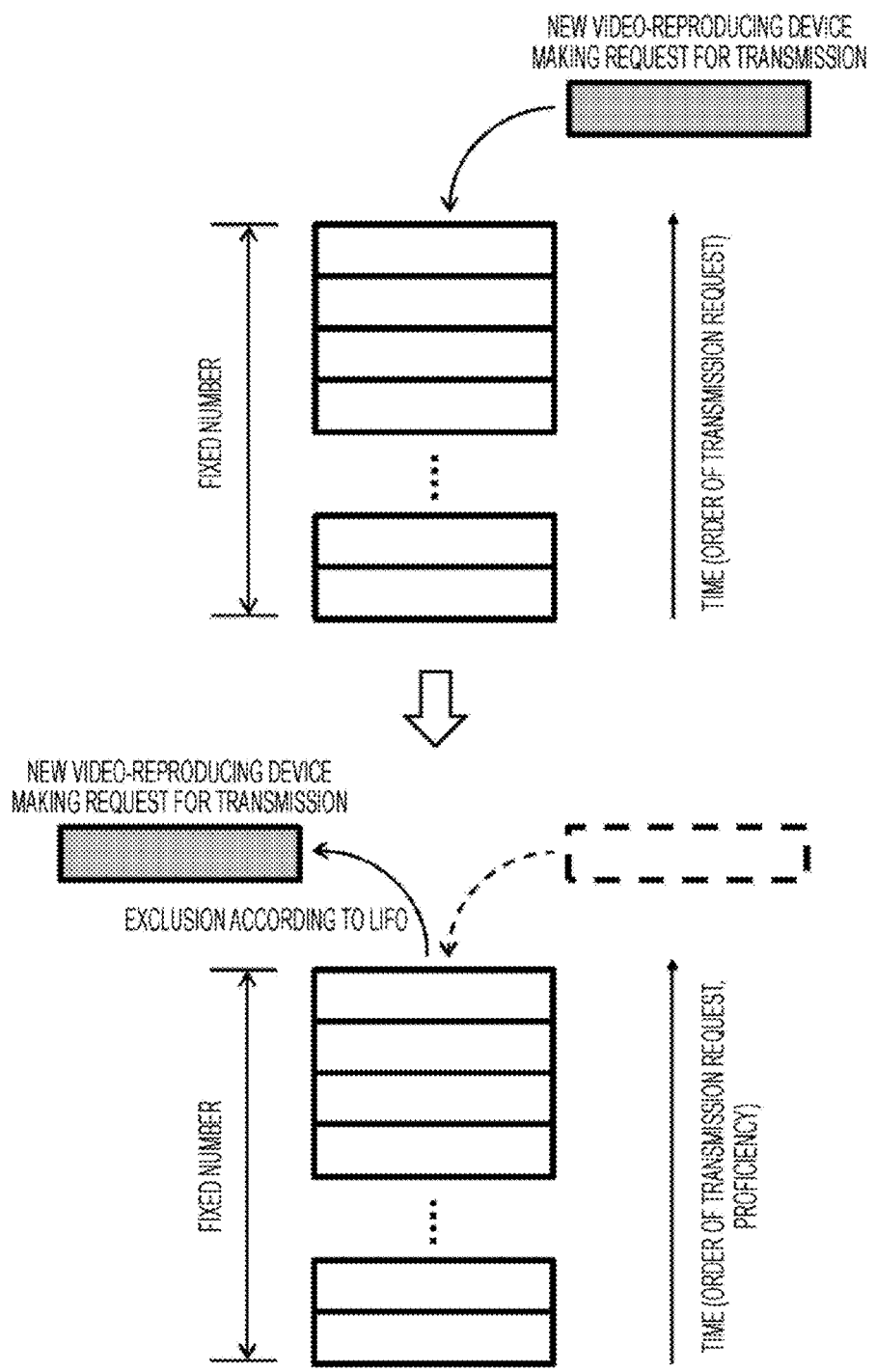
FIG. 8 is an exemplary diagram illustrating a process (LIFO method) of limiting the number of video-reproducing devices to which a video is transmitted from one video-providing device within a fixed number.

In contrast, according to the LIFO method, a video-reproducing device making a request later for starting transmission is excluded (see FIG. 8), and after the number of video-reproducing devices reaches the fixed number, a new video-reproducing device is rejected with no opportunity to view a video. However, the LIFO method has a merit that video-reproducing devices making a request earlier for starting transmission receive a video without interruption, enabling users (viewers) already having viewed a video to keep viewing the video at ease. Furthermore, after a viewing group formed by a plurality of video-reproducing devices starts to receive a video from a video-providing device, some of members of the viewing group are prevented from being moved in the middle.

Figure 9:
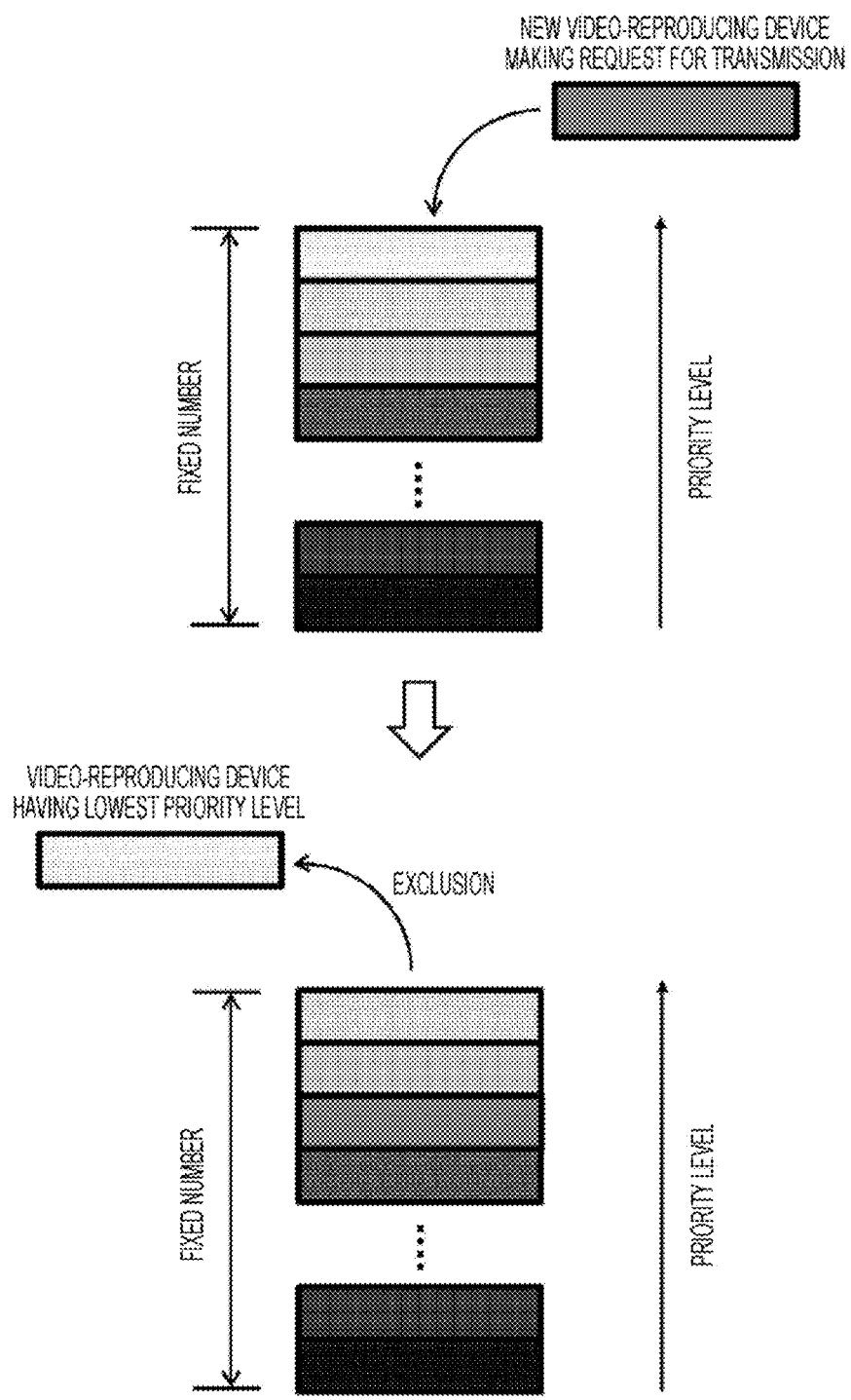
FIG. 9 is an exemplary diagram illustrating a process (prioritization method) of limiting the number of video-reproducing devices to which a video is transmitted from one video-providing device within a fixed number.

FIG. 9 illustrates a process of restricting the number of video-reproducing devices which receives a video transmitted from a video-providing device within a fixed number by using the prioritization method. In FIG. 9, priority levels are represented by color depth (a darker color indicates a higher priority level). In a case where new video-reproducing devices make a request for starting transmission, video-reproducing devices having a lower priority level are sequentially excluded.

In a case where the prioritization method is adopted, the priority level can be assigned to each video-reproducing device by various methods. For example, in accordance with the user attribute (described above) or the like of a user (i.e., viewer) of a video-reproducing device, the priority level may be assigned to each video-reproducing device. Furthermore, in a case where a service for distributing a video from a video-providing device is provided for a price (i.e., monetized), if the priority level is assigned depending on the amount of money paid by a video-reproducing device (or a user thereof), management of the video distribution service is readily supported financially. As a matter of course, the priority levels assigned to the respective video-reproducing devices may be dynamically changed.

Although no video may be transmitted to a video-reproducing device excluded from the fixed number of video-reproducing devices, a video may be distributed to the excluded video-reproducing device by using a method not applying an excessive load to the communication band (not affecting the distribution of a video to video-reproducing devices included within the fixed number of video-reproducing devices).

As an example, a method is considered to transmit a video recorded in the past, instead of a real-time video, to the video-reproducing devices beyond the fixed number of video-reproducing devices is also considered. According to this method, it can be said that the video-reproducing devices beyond the fixed number of video-reproducing devices are not merely excluded but "retrospectively excluded".

Figure 10:
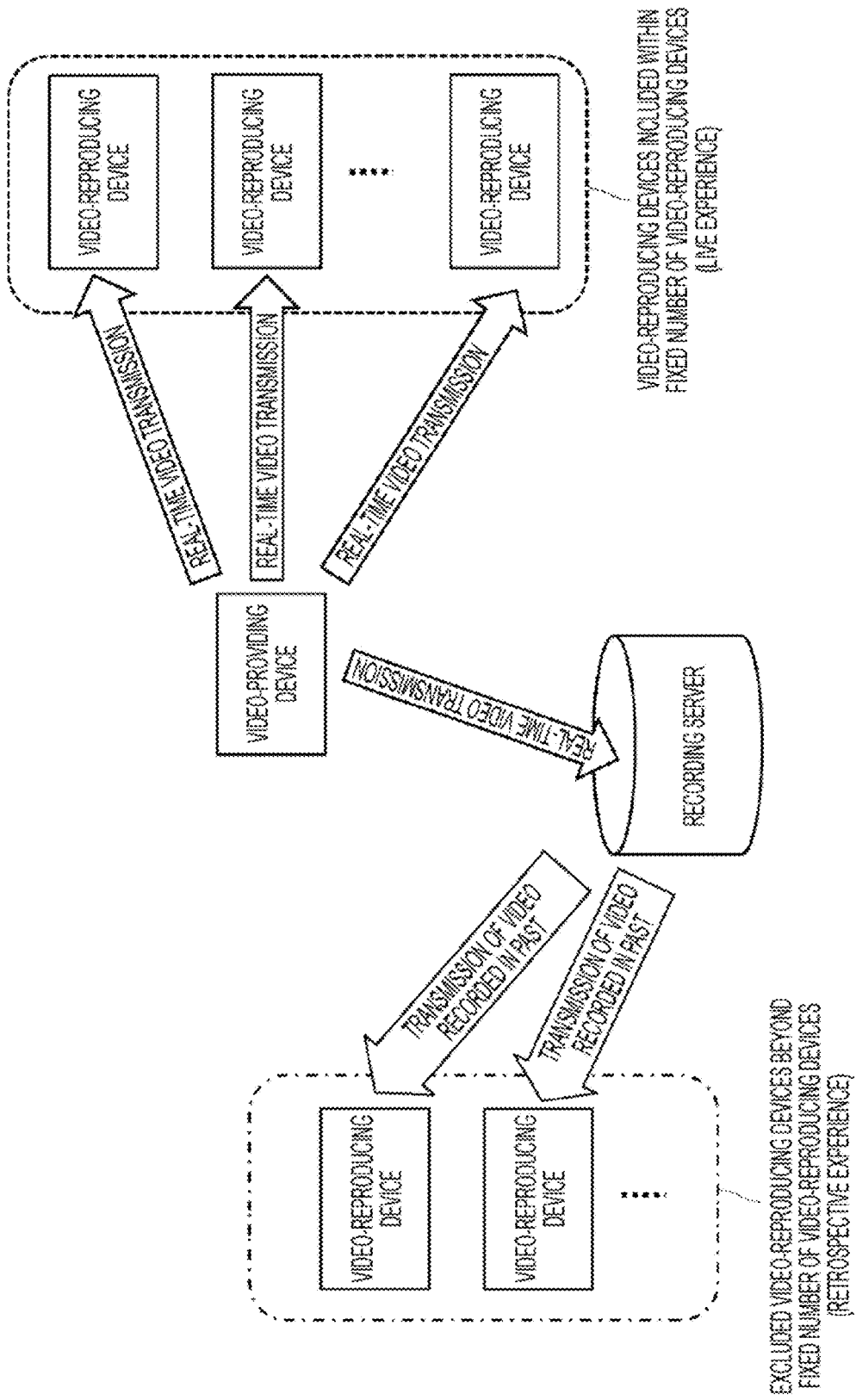
FIG. 10 is a diagram illustrating a system for distributing a video recorded in the past to extra video-reproducing devices.

Specifically, a video-providing device records, in an external device, a real-time video distributed to video-reproducing devices included within the fixed number of video-reproducing devices. Then, for excluded video-reproducing devices, the video-providing device does not directly transmit the real-time video but distribute the video recorded in the past in the external device (see FIG. 10).

Here, the external device is, for example, a recording server installed physically independent of the video-providing device and recording a video. The video is distributed to the excluded video-reproducing devices beyond the fixed number of video-reproducing devices by the recording server, and a load on the video-providing device is distributed. Furthermore, the excluded video-reproducing devices beyond the fixed number of video-reproducing devices are not allowed to view the live video captured at the installation place (viewpoint position) of the video-providing device, but are allowed to have retrospective experience as long as time delay is permitted.

As illustrated in FIG. 6, real-time videos captured by the respective video-providing devices are also transmitted to the recording server. The recording server records each video corresponding to information identifying a video-providing device as a transmission source or information identifying a viewpoint position from which the video is captured (installation place of the video-providing device). The request for starting transmission of a video is apt to concentrate to a video-providing device installed at a viewpoint position from which a ball keeping player can be imaged. In a case where the number of video-reproducing devices transmitting the request for starting transmission of a video to such a video-providing device exceeds the fixed number, not the real-time video is directly transmitted from the video-providing device, but the video recorded in the past in the external device is distributed to excluded video-reproducing devices.

Furthermore, it is also expected that after video-reproducing devices included within the fixed number of video-reproducing devices view a video, the number of video-reproducing devices is reduced below the fixed number (e.g., limitation of capacity in the communication band), video-reproducing devices having been excluded beyond the fixed number of video-reproducing devices are included in the fixed number of video-reproducing devices, and a live video is allowed to be transmitted thereto. In such a case, direct switching of a video to be distributed to a new video-reproducing device, from the video recorded in the past to the real-time video, interrupts video information by a difference in time in the video-reproducing device. Furthermore, sudden switching of a scene from the video recorded in the past to the live video may make a viewer feel strange. Therefore, to switch from distribution of the video recorded in the past to distribution of the real-time video, so-called "chasing reproduction" or "time shift reproduction" (e.g., see Patent Document 4) may be performed so that the video recorded in the past catches up with the real-time video to provide a video to be viewed on the new video-reproducing device. For example, the chasing reproduction at 1.0x speed (x is an integer) enables seamless switching to a real-time video. Thus the viewer is allowed to view the video without a strange feeling while chasing reproduction.

Figure 11:
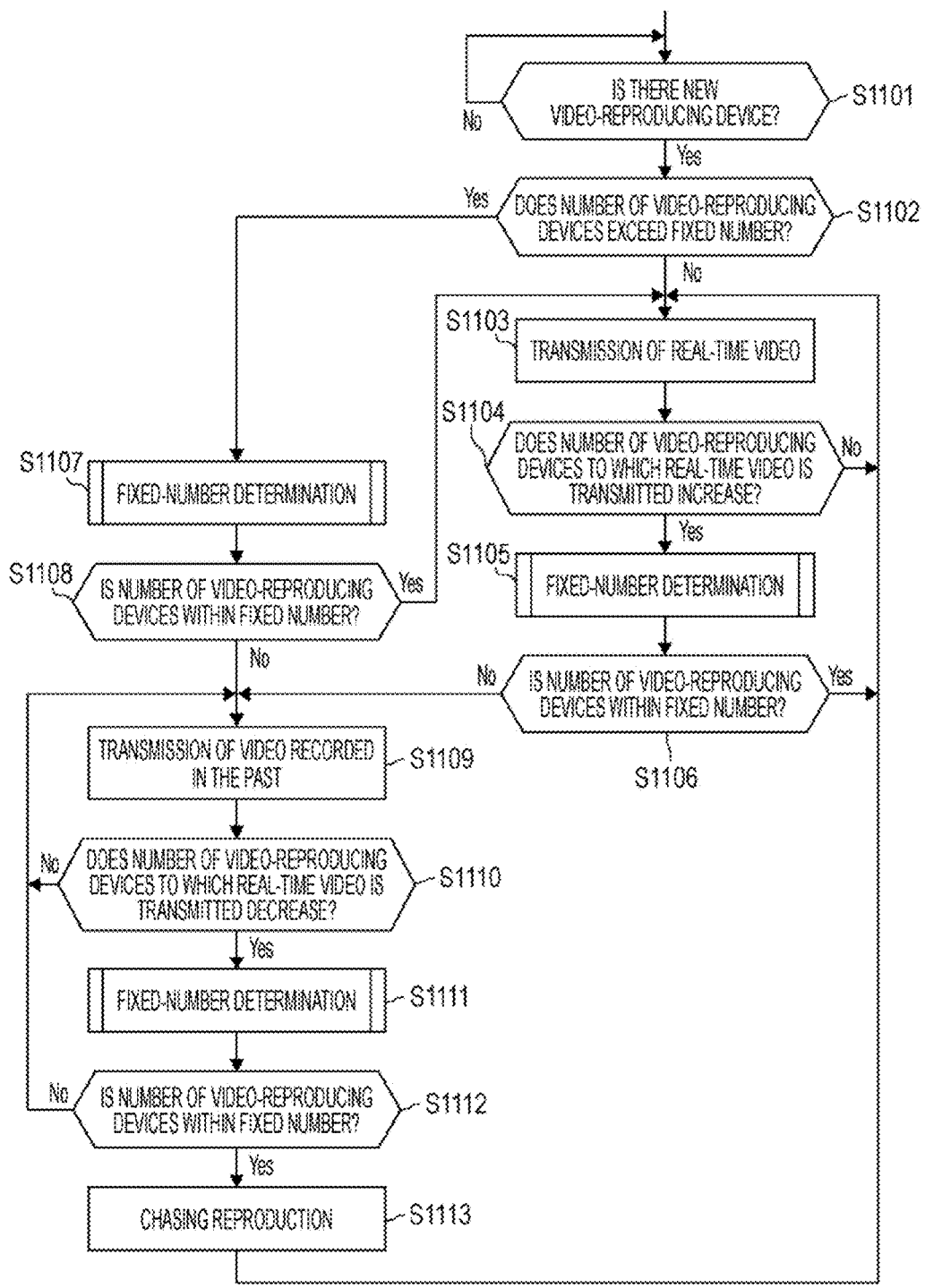
FIG. 11 is a flowchart illustrating a procedure for transmitting a video captured by a video-providing device to a plurality of video-reproducing devices.

FIG. 11 is a flowchart illustrating a procedure for transmitting a video captured by a video-providing device to a plurality of video-reproducing devices.

The video-providing device receiving a request for starting transmission of a video from a new video-reproducing device (Yes in step S1101) checks whether the number of video-reproducing devices to which a video is being transmitted is within the fixed number (step S1102)

Here, in a case where the number of video-reproducing devices does not exceed the fixed number when adding the video-reproducing device making a request for starting transmission in step S1101, (No in step S1102), the video-providing device starts to transmit a real-time video to this video-reproducing device (step S1103).

In contrast, in a case where the number of video-reproducing devices exceeds the fixed number when adding the video-reproducing device making a request for starting transmission in step S1101 (Yes in step S1102), the video-providing device determines whether this video-reproducing device is to be included in the fixed number of video-reproducing devices (i.e., whether this video-reproducing device is to be excluded) for fixed-number determination (step S1107). Whether to exclude this video-reproducing device is desired to be determined, for example, by any of the FIFO method, LIFO method, and prioritization method described above.

In a case where the video-reproducing device making a request for starting transmission in step S1101 is included in the fixed number of video-reproducing devices (Yes in step S1108), the video-providing device starts to transmit the real-time video to this video-reproducing device (step S1103).

Furthermore, in a case where the video-reproducing device making a request for starting transmission in step S1101 is excluded from the fixed number of video-reproducing devices (i.e., determined to be excluded) (No in step S1108), the recording server transmits and distributes a video recorded in the past to this video-reproducing device (step S1109). Instead of the video-providing device, the recording server transmits the video recorded in the past, and a load on the video transmission is distributed (as described above).

Then, in a case where during distribution of the video recorded in the past to the video-reproducing device making a request for starting transmission in step S1101 (step S1109), the number of video-reproducing devices to which the video-providing device distributes the real-time video is reduced below the fixed number (Yes in step S1110), the video-providing device determines again whether to include the video-reproducing device making a request for starting transmission in step S1101 in the fixed number of video-reproducing devices for fixed-number determination (step S1111). Whether to include the video-reproducing device in the fixed number of video-reproducing devices is desired to be determined, for example, by any of the FIFO method, LIFO method, and prioritization method described above.

In a case where the video-reproducing device making a request for starting transmission in S1101 is determined not to be included in the fixed number of video-reproducing devices (i.e., determined to be excluded) (No in step S1112), the video-providing device continuously distributes the video to this video-reproducing device (from the recording server) (step S1109).

Furthermore, in a case where the video-reproducing device making a request for starting transmission in S1101 is to be included in the fixed number of video-reproducing devices (Yes in step S1112), the video-providing device performs chasing reproduction on this video-reproducing device (described above) for switching from the recording server (step S1113), and then transmits the real-time video (step S1103).

Furthermore, in a case where during transmission of the real-time video to the video-reproducing device making a request for starting transmission in step S1101 (step S1103), further another video-reproducing device transmits a request for starting transmission to the same video-providing device and the number of video-reproducing devices exceeds the fixed number (Yes in step S1104), the video-providing device determines whether the video-reproducing device making a request for starting transmission in step S1101 is continuously included in the fixed number of video-reproducing devices (i.e., whether the video-reproducing device is to be excluded) for fixed-number determination (step S1005). Whether to continuously include the video-reproducing device in the fixed number of video-reproducing devices is desired to be determined, for example, by any of the FIFO method, LIFO method, and prioritization method described above.

In a case where the video-reproducing device making a request for starting transmission in S1101 is determined to be continuously included in the fixed number of video-reproducing devices (Yes in step S1106), the video-providing device continuously transmits the real-time video to this video-reproducing device (step S1103).

Furthermore, in a case where the video-reproducing device making a request for starting transmission in S1101 is determined to be excluded (No in step S1106), the video-providing device performs switching to transmit the video recorded in the past (e.g., from the recording server) to this video-reproducing device (step S1109).

According to a procedure illustrated in FIG. 11, in an excluded video-reproducing device beyond the fixed number of video-reproducing devices, for example, the video recorded in the past in the recording server can be viewed with a time delay of five minutes or the like. Then, in a case where reduction or the like of the number of video-reproducing devices below the fixed number enables transmission of the real-time video to a video-reproducing device, the video recorded in the past is not quickly switched to the real-time video, but reproduced at, for example, 1.05 times speed by performing chasing reproduction, and is gradually (i.e., seamlessly) shifted to the real-time video.

Note that, for a video-reproducing device excluded from the fixed number of video-reproducing devices, not a method of transmitting the video recorded in the past from the recording server, but a method of transmitting a real-time video from another video-providing device which is nearest to a desired viewpoint position and where the number of video-reproducing devices is below the fixed number may be employed.

B. Device Configuration

B-1. Configuration of Video-Providing Device

Figure 12:
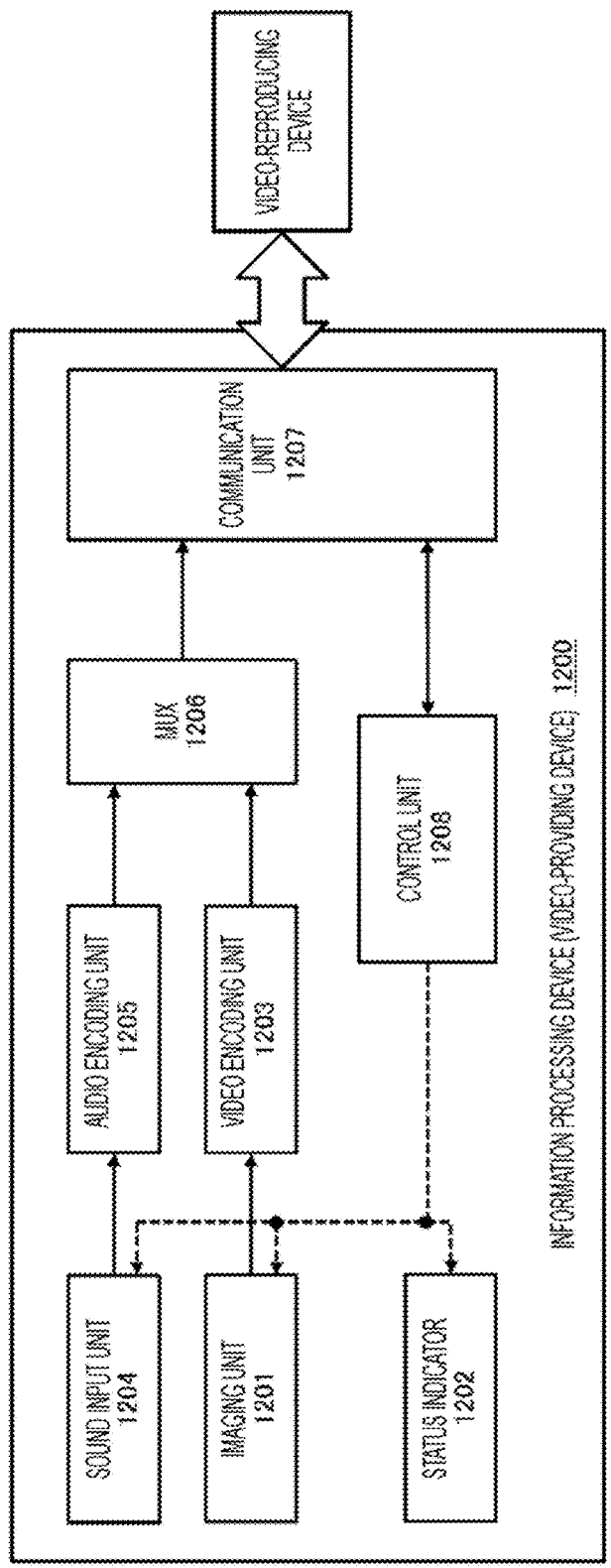
FIG. 12 is a schematic diagram illustrating a functional configuration of an information processing device 1200 capable of functioning as a video-providing device.

FIG. 12 schematically illustrates a functional configuration of an information processing device 1200 capable of functioning as a video-providing device in the video viewing systems 100 to 400. The information processing device 1200 illustrated in FIG. 12 includes an imaging unit 1201, a status indicator 1202, a video encoding unit 1203, a sound input unit 1204, an audio encoding unit 1205, a multiplexer (MUX) 1206, a communication unit 1207, and a control unit 1208. Hereinafter, the respective units 1201 to 1208 will be described.

The imaging unit 1201 includes, for example a multi-lens omnidirectional camera. Alternatively, the imaging unit 1201 may include a single-lens camera (including a wide-angle camera or a fish-eye camera) or a twin-lens stereo camera so that the imaging unit 1201 is mounted, for example, to a support portion including an XYZ table as illustrated in FIG. 5 and the like, and swings and captures a full-dome video in any line-of-sight direction.

The imaging unit 1201 images surroundings at a viewpoint position where the information processing device 1200 is installed. The imaging unit 1201 identifies an image of a full-dome video in a line-of-sight direction according to an instruction given by the control unit 1207, and outputs the image to the video encoding unit 1203. The video encoding unit 1203 encodes a video signal captured by the imaging unit 1201.

Alternatively, a system having a server interposed between a video-providing device and a video-reproducing device may be configured so that a full-dome video captured by the imaging unit 1201 is directly transmitted to the server, and the server extracts an image in a predetermined line-of-sight direction from the full-dome video and distributes the extracted image to the video-reproducing device.

The sound input unit 1204 includes, for example, a small microphone, a stereo microphone, or the like, and arranged together with the imaging unit 1201 to collect sounds in a location where a full-dome video is captured. Use of the stereo microphone enables three-dimensional reconstruction of collected sounds on a reproduction side (i.e., the video-reproducing device). The audio encoding unit 1205 encodes an acoustic signal input from the sound input unit 1204.

The multiplexer 1206 multiplexes an encoded video signal and an encoded acoustic signal encoded respectively by the video encoding unit 1203 and the audio encoding unit 1205, and forms a signal format (packet) transmitted to the video-reproducing device.

The communication unit 1207 communicates with the video-reproducing device, including transmission of an audio or a video. Furthermore, if necessary, communication is made with the recording server (described above) via the communication unit 1207. The communication unit 1207 communicates with the video-reproducing device, the recording server, and another external device via, for example, a wireless or wired LAN or a wide area network such as the Internet.

The control unit 1208 integrally controls the operation of the respective units 1201 to 1207 described above. For example, in accordance with line-of-sight information or posture information received from the video-reproducing device (or a viewing group) being a video transmission destination, the control unit 1208 identifies an image of a full-dome video captured by the imaging unit 120. The image has an area (angle of view) to be displayed on the video-reproducing device. Then, the control unit 1208 transmits the image from the communication unit 1207 to the video-reproducing device. Furthermore, the control unit 1208 may control the resolution of the video captured by the imaging unit 1201 (e.g., may reduce the resolution to suppress visually induced motion sickness or spatial disorientation of the user upon changing the viewpoint position). Furthermore, the control unit 1208 may control zooming (zooming up, zooming down) by the imaging unit 1201. Furthermore, to limit the range of information to be provided, in accordance with attribute information of the video-reproducing device (or the viewing group) being the video transmission destination, the control unit 1208 causes the video-reproducing device (or the viewing group) to turn on/off imaging operation or sound input operation, mosaic or mask a captured video, or modulate an input audio, or the like.

The status indicator 1202 indicates an operation state of the information processing device 1200 as the video-providing device, around the information processing device 1200. Here, the operation state includes, for example, a standby state for video transmission (or a state in which video transmission is stopped), a busy state in which the requests for starting transmission of a video from a large number of video-reproducing devices are concentrated during transmission of a video to some video-reproducing devices, a state in which no service is provided due to suspension of part or whole of operation (described later), or the like. The status indicator 1209 includes, for example, a light such as LED or a display panel such as liquid crystal display.

B-2. Configuration of Video-Reproducing Device

Figure 13:
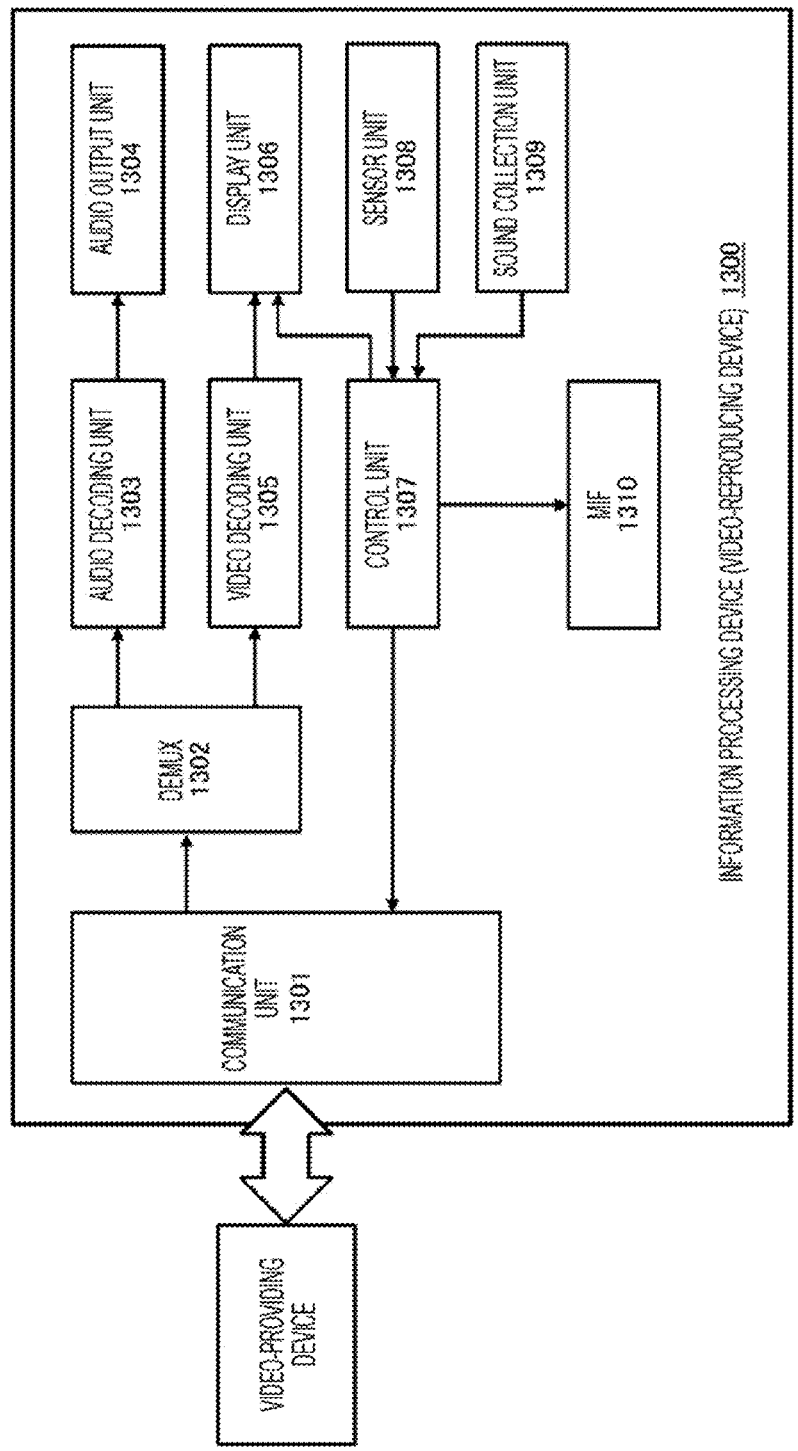
FIG. 13 is a schematic diagram illustrating a functional configuration of an information processing device 1300 capable of functioning as a video-reproducing device.

FIG. 13 schematically illustrates a functional configuration of an information processing device 1300 capable of functioning as a video-reproducing device in the video viewing systems 100 to 400. The information processing device 1300 illustrated in FIG. 13 includes a communication unit 1301, a demultiplexer (DEMUX) 1302, an audio decoding unit 1303, an audio output unit 1304, a video decoding unit 1305, a display unit 1306, a control unit 1307, a line-of-sight direction instruction unit 1308, a sensor unit 1308, and a sound collection unit 1309. Hereinafter, the respective units 1301 to 1309 will be described.

The communication unit 1301 communicates with a video-providing device, including transmission of an audio or a video. Furthermore, if necessary, communication is made with the recording server (described above) via the communication unit 1301. The communication unit 1301 communicates with the video-providing device, the recording server, and another external device via, for example, a wireless or wired LAN or a wide area network such as the Internet.

For example, a request for starting transmission of an audio or a video is transmitted from the communication unit 1301 to a video-providing device installed at a place (i.e., a viewpoint position) from which a desired vide is captured. Then, a transmitted signal formed into a predetermined signal format (packet) and transmitted from the video-providing device is received by the communication unit 1301. Furthermore, in a case where while displaying a video received from a video-providing device (i.e., while the user viewing the video), a video image captured from the viewpoint position and in a different line-of-sight direction is desired to be viewed, a request for changing the line-of-sight direction is transmitted from the communication unit 1301. Furthermore, in a case where switching to a video captured by another video-providing device is desired, a request for stopping transmission is transmitted from the communication unit 1301 to a video-providing device from which an audio or a video is being received, and a request for starting transmission is transmitted from the communication unit 1301 to a video-providing device located as a moving destination.

The demultiplexer 1302 divides a multiplexed signal transmitted from the video-providing device into an encoded video signal and an encoded acoustic signal, and distributes the encoded video signal and the encoded acoustic signal to the audio decoding unit 1303 and the video decoding unit 1305, respectively.

The audio decoding unit 1303 decodes an encoded acoustic signal to generate a baseband acoustic signal, and outputs an audio from the audio output unit 1304. The audio output unit 1304 includes a monaural, stereo, multi-channel speaker, or the like.

The video decoding unit 1305 decodes an encoded video signal to generate a baseband video signal, and displays a video captured by the video-providing device being a transmission source on the display unit 1306. The display unit 1306 (or a main body of the information processing device 1300) includes, for example, a head mount display, a dome display, or a large-screen (or normal) monitor display.

The control unit 1307 controls output of a video and an audio received from the video-providing device. Furthermore, the control unit 1307 controls display of a UI, an on-screen display (OSD), or the like on a screen of the display unit 1306, or performs operation which is input by a user (viewer) to the UI or OSD.

The sensor unit 1308 measures a line-of-sight direction, a head position, or a posture of the user (the viewer viewing a video displayed on the screen of the display unit 1306). The sensor unit 1308 is configured by, for example, combining a plurality of sensor elements, such as a gyro sensor, an acceleration sensor, and a geomagnetic sensor (e.g., a sensor configured to detect a total of nine axes of a three-axis gyro sensor, a three-axis acceleration sensor, and a three-axis geomagnetic sensor). The sensor unit 1308 may be integrated with the main body of the information processing device 1300 (head mount display or the like) or may be an accessory component or the like externally mounted to the main body.

Alternatively, the sensor unit 1308 may measure the line-of-sight direction, head position, or posture of the user, on the basis of a result of video recognition using a camera (not illustrated) configured to image the user. Alternatively, the movement of a body and limbs of the user, in addition to the head of the user, may be recognized on the basis of a captured image to be input as a gesture. Furthermore, the sensor unit 1308 may measure a load applied to a chair on which the user sits or a pressure acting between a user's foot and a ground surface with which the user's foot makes contact, such as a load (pressure) applied to a shoe sole of a user's shoe. Furthermore, the sensor unit 1308 may parallelly detect biological information, such as user's brain wave, muscle potential, or body temperature. The sensor unit 1308 compositely uses sensors to prevent wrong determination based on a detection result of the sensor unit 1308.

Movement in the line-of-sight direction, head position, posture, or the like of the user (or a gesture motion of the body and limbs, in addition to the head) detected by the sensor unit 1308 may represent operation to the UI or OSD displayed on the display unit 1306 or an instruction for the line-of-sight direction in which a displayed video is captured. For example, horizontal and vertical movements of the user's head (facing to the right or left, looking up, looking down, or the like) may be handled as an instruction for changing a line-of-sight direction. Furthermore, a forward or backward inclination of the user's body may be handled as an instruction for zoom operation of a camera in a current line-of-sight direction (e.g., forward inclination represents zooming in, backward inclination represents zooming out). Then, a detection result of the sensor unit 1308 is output to the control unit 1307.

The sound collection unit 1309 includes a microphone or the like, collects user's voice or the like, and outputs the voice or the like to the control unit 1307. The user's voice may include impressive or emotional feeling caused by a video displayed on the display unit 1306 or voice instruction (e.g., change of a line-of-sight direction in which a full-dome video is captured, and the like) to the control unit 1307 (or the video-reproducing device).

The control unit 1307 transmits, via the communication unit 1301, an instruction for changing the line-of-sight direction in which a full-dome video is viewed to the video-providing device from which a video is being received, on the basis of a change in line-of-sight direction, horizontal and vertical movements of the head (facing to the right or left, looking up, looking down, or the like), or the posture of the user. Furthermore, the control unit 1307 transmits a user's voice instruction collected by the sound collection unit 1309 as an audio or the voice instruction converted into text information or command information, to the video-providing device via the communication unit 1301.

Furthermore, in a case where movement in the line-of-sight direction, the head, or the posture of the user (or a gesture motion of the body and limbs, in addition to the head) represents operation to the UI or OSD on the screen, the control unit 1307 performs processing on a video displayed on the display unit 1306 in accordance with the operation. For example, in a case where operation is performed to the UI by the user to give an instruction to switch a viewpoint position, the control unit 1307 transmits a request for stopping transmission to the video-providing device from which an audio or a video is being received, and a request for starting transmission to a video-providing device as a switching destination, via the communication unit 1301. The instruction for switching the viewpoint positions is made by, for example, a "jumping movement" of the user, which will be described later in detail.

Note that the information processing device 1300 may further include a well-known input device, such as keyboard or mouse, touch panel, joystick, or game controller (which are not illustrated). This kind of input device may be used for input operation to the UI or OSD on the screen of the display unit 1306 or an instruction for changing the line of sight or switching the viewpoint positions.

Furthermore, the information processing device 1300 may include a multimodal interface (MIF) 1310, as a unit for freely controlling a spatial environment in which a video is viewed. The multimodal interface 1310 may include, for example, at least one drive unit, such as an air blowing unit, a temperature control unit and a moisture control unit, a smell generation unit, a tactile control unit, or a vibration control unit. The air blowing unit applies air (breeze, headwind, air blast) or water spray (water blast) to the user, the temperature control unit and the moisture control unit controls ambient temperature and humidity around the user, the smell generation unit applies a smell or fragrance to the user, the tactile control unit causes the user to feel as if his/her body is touched (effect as if the back is poked, feeling as if something touches the neck or foot, and the like), and the vibration control unit vibrates the user's body. The control unit 1307 drives some drive units of the multimodal interface 1310 in accordance with, for example, the content of a video received from a video-providing device positioned at a remote place, reproducing (or feeding back) feeling or experience at a location where the video-providing device is installed to capture a video, making the user to experience realistic feeling as in the location where the video-providing device captures a video.

Figure 47:
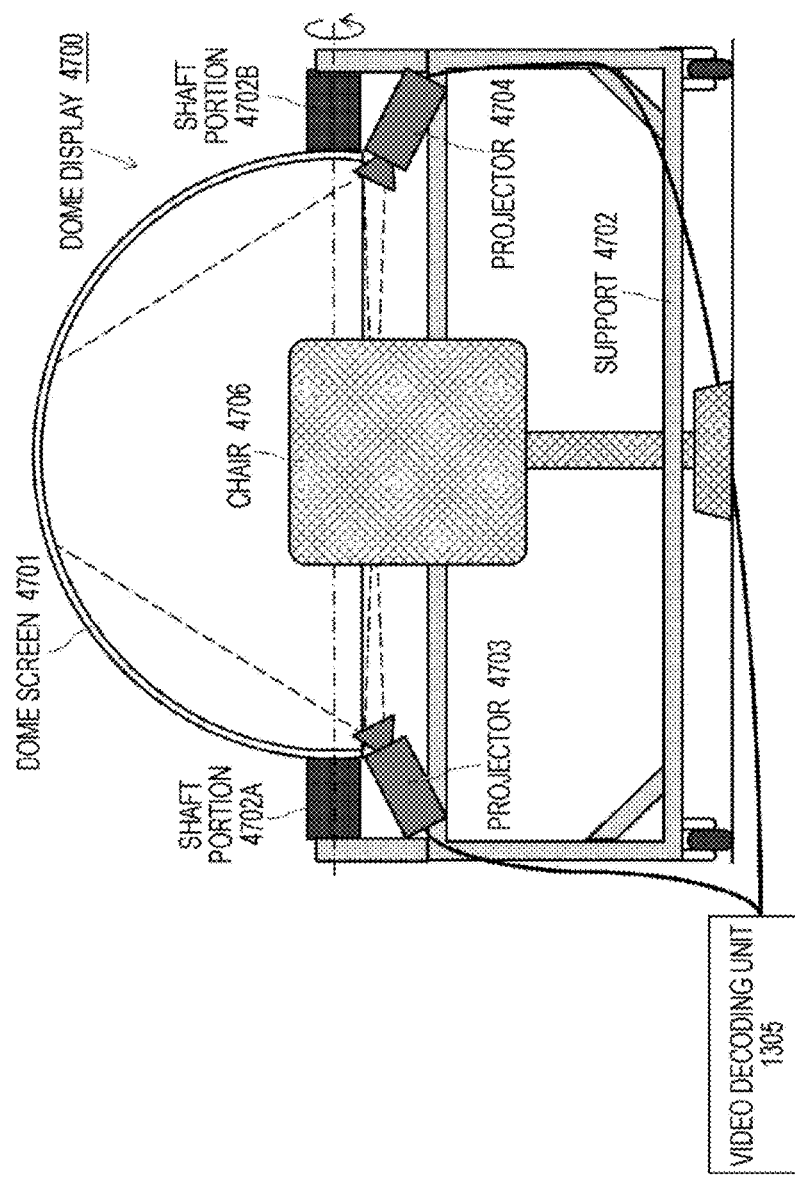
FIG. 47 is a diagram illustrating an exemplary configuration of a dome display 4700.
Figure 48:
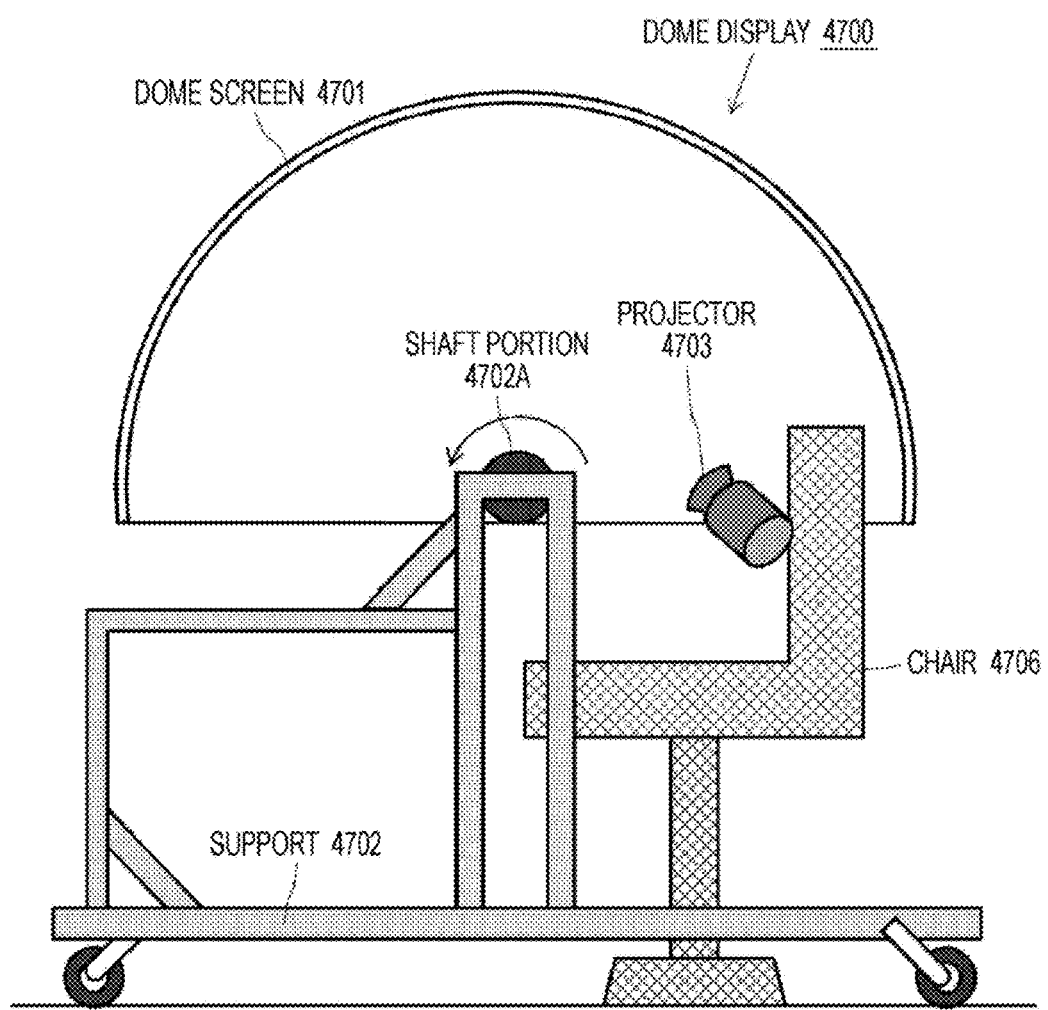
FIG. 48 is a diagram illustrating an exemplary configuration of the dome display 4700.

FIGS. 47 and 48 illustrate an exemplary configuration of a dome display 4700 applicable as the display unit 1306 in the information processing device 1300 as a video-reproducing device. A viewer in the dome is allowed to observe a projected video. However, FIG. 47 is a cross-sectional view of a dome screen 4701 taken along a frontal plane, and FIG. 48 is a cross-sectional view of the dome screen 4701 taken along a sagittal plane.

The dome display 4700 illustrated in FIGS. 47 and 48 includes the dome screen 4701, a support 4702 configured to support the dome screen 4701, and two projectors 4703 and 4704. Each of the projectors 4703 and 4704 projects a video to the dome screen 4701 on the basis of a baseband video signal decoded by the video decoding unit 1305. Furthermore, in a space formed by the dome screen 4701, a chair 4706 on which the viewer observing a projected video sits is installed.

The dome screen 4701 has an inner periphery formed as a display surface for a projected image. The dome screen 4701 includes, for example, a resin such as light-weight, fiber reinforced plastics (FRP), a metal, glass, or the like. The dome screen 4701 preferably has an inner peripheral surface to which painting or coating for preventing diffuse reflection of light (projected video) or another surface treatment is applied. The inner periphery of the dome screen 4701 has a spherical or hemispherical shape. Use of the dome screen 4701 having the spherical or hemispherical shape enables projection of a realistic video having a horizontal and vertical wide viewing angle. Note that an outer surface of the dome screen 4701 is not particularly limited.

A projected video to the dome screen 4701 enables the viewer to feel the sense of scale of an object, compared with observation of an enlarged virtual image using a head mount display. For example, the dome screen 4701 having an inner diameter set approximately 1.5 to 2 m enables display of a video representing a further realistic object (person or the like) making the viewer feel that the object has an actual size. For example, projection of a video showing a person looking into the camera enables the viewer to have a strong realistic experience as if the viewer and the person in the video are looking at each other (as if having eye contact). Furthermore, the dome display 4700 has a sense of spaciousness compared with the HMD, but display of a full-dome video extending 360 degrees horizontally increases a feeling of immersion.

The support 4702 includes a pair of shaft portions 4702A and 4702B having rotation axes coinciding with each other, and this pair of shaft portions 4702A and 4702B rotatably supports the dome screen 4701 around a horizontal axis on a sagittal plane. However, as long as the dome screen 4701 is rotatably supported around the horizontal axis on the sagittal plane, the support 4702 is not limited to a structure supported by the pair of shaft portions 4702A and 4702B. Furthermore, the support 4702 may include a mechanism configured to rotatably support the dome screen 4701 around a vertical axis. Furthermore, the support 4702 may have a structure configured to support the dome screen 4701 so that the dome screen 4701 also has a freedom degree, such as vertical movement, in addition to the rotation.

Each of the two projectors 4703 and 4704 projects a video signal (video signal having wide viewing angle) supplied from the video decoding unit 1305 to the inner periphery of the dome screen 4701. Each of the projectors 4703 and 4704 uses a laser or an LED for a light source and projects, to the dome screen 4701, an image having high color saturation and excellent color reproducibility.

The projectors 4703 and 4704 each have a position and a posture relative to the dome screen 4701 which are fixed near an end edge of the dome screen 4701 so that projected images projected from the projectors 4703 and 4704 cover the whole display surface on the inner periphery of the dome screen 101. Each of the projectors 4703 and 4704 is fixed to the dome screen 4701, for example, via a table (not illustrated) having six freedom degrees in three axes directions and around the three axes to finely adjust an optical axis (projected direction) of each projector. Rotation of the dome screen 4701 around the horizontal axis (described later) integrally moves the respective projectors 4703 and 4704.

For example, a seam between images projected from the respective projectors 4703 and 4704 to the dome screen 4701 is stitched, and a wide viewing angle video is displayed on the dome screen 4701. To the stitching, any algorithm is allowed to be applied. A projected video image from each of the projectors 4703 and 4704 is assumed to have a 4K (approximately horizontal 4,000×vertical 2,000 pixels) resolution. Furthermore, distortion of a wide viewing angle video caused by optical distortion of the projectors 4703 and 4704, distortion (including temporal change) of the inner periphery of the dome screen 4701, or the like may be corrected by image processing. For example, a test pattern having a known shape is desirably projected from each of the projectors 4703 and 4704 to the dome screen 4701, performing image processing to cancel the distortion of the projected image of the test pattern. Furthermore, the distortion of the projected image caused by positioning error of each of the projectors 4703 and 4704 fixed to the dome screen 4701 may be also corrected by image processing. Furthermore, a GUI including a menu, a button, or the like may be displayed over a full-dome video projected from the respective projectors 4703 and 4704.

The dome display 4700 is assumed to be installed indoor to use but, as a matter of course, may be installed outdoor to use. Furthermore, the support 4702 has a lower end to which a mobile component such as a caster is mounted to facilitate movement in installation place. Furthermore, one dome display 4700 is considered to be used by not only one person but also a plurality of persons or is considered to be used for business to business (B2B).

Figure 49:
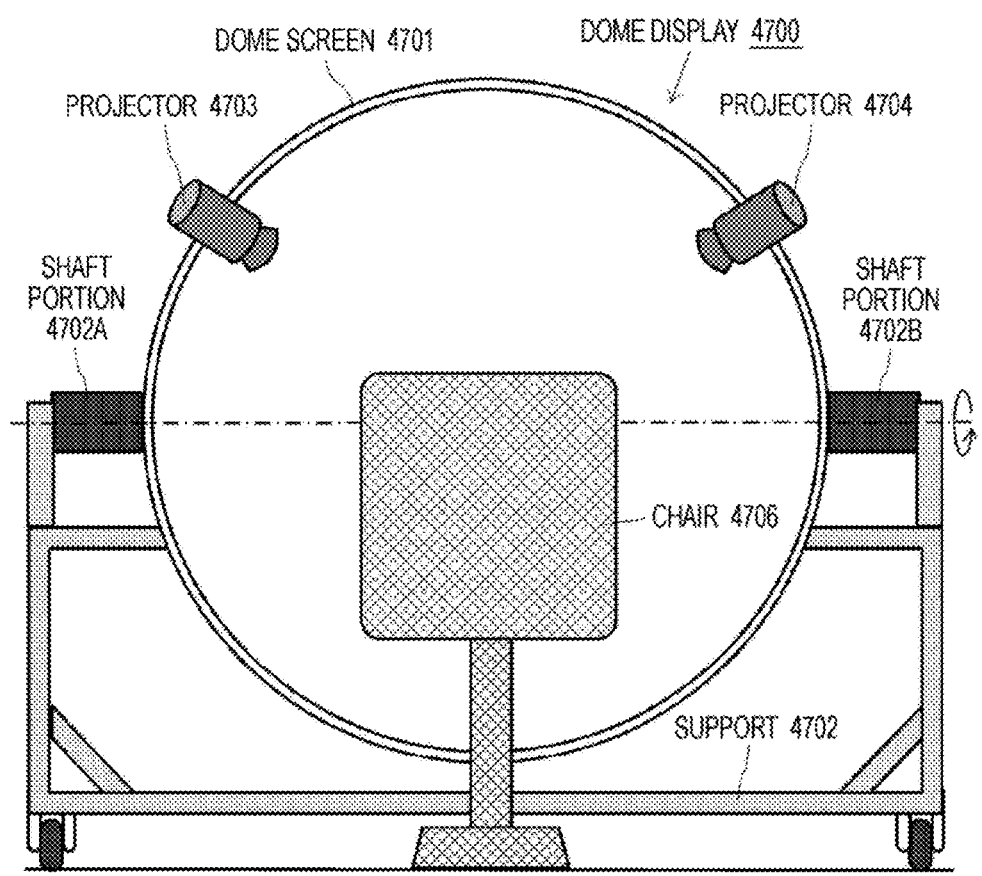
FIG. 49 is a diagram illustrating an exemplary configuration of the dome display 4700.
Figure 50:
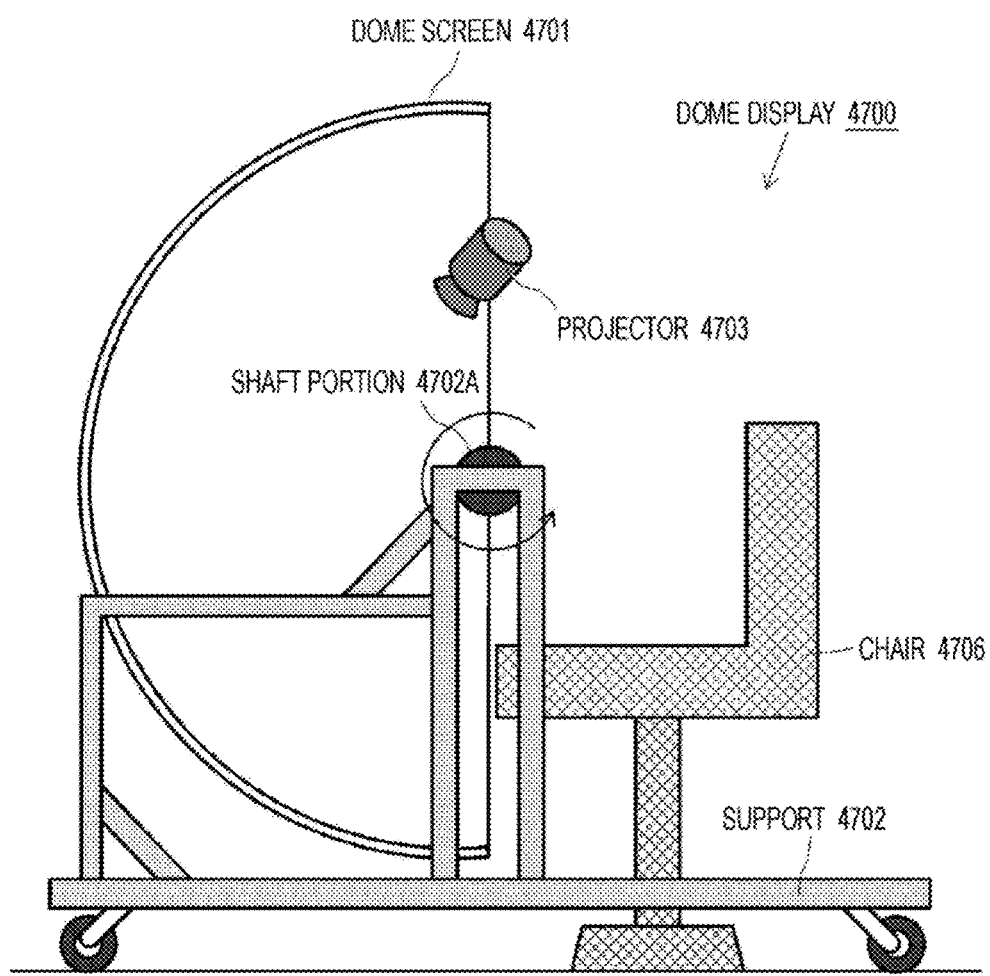
FIG. 50 is a diagram illustrating an exemplary configuration of the dome display 4700.
Figure 51:
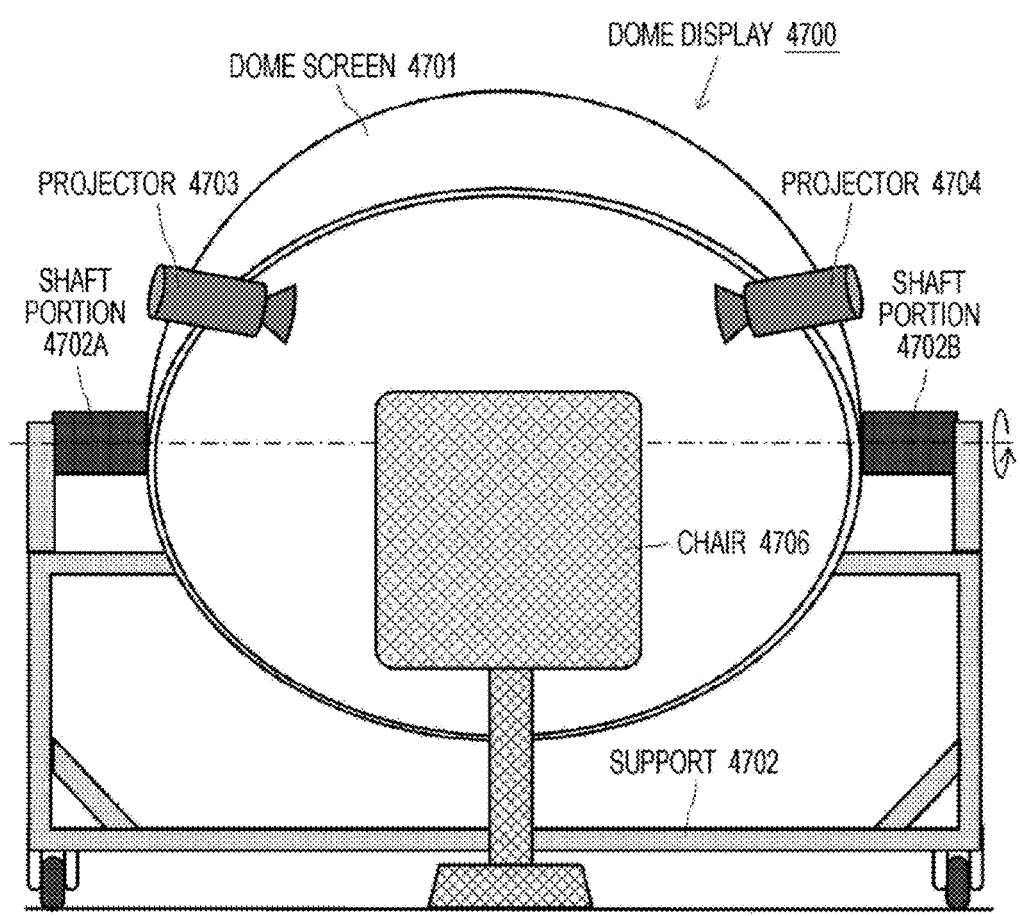
FIG. 51 is a diagram illustrating an exemplary configuration of the dome display 4700.
Figure 52:
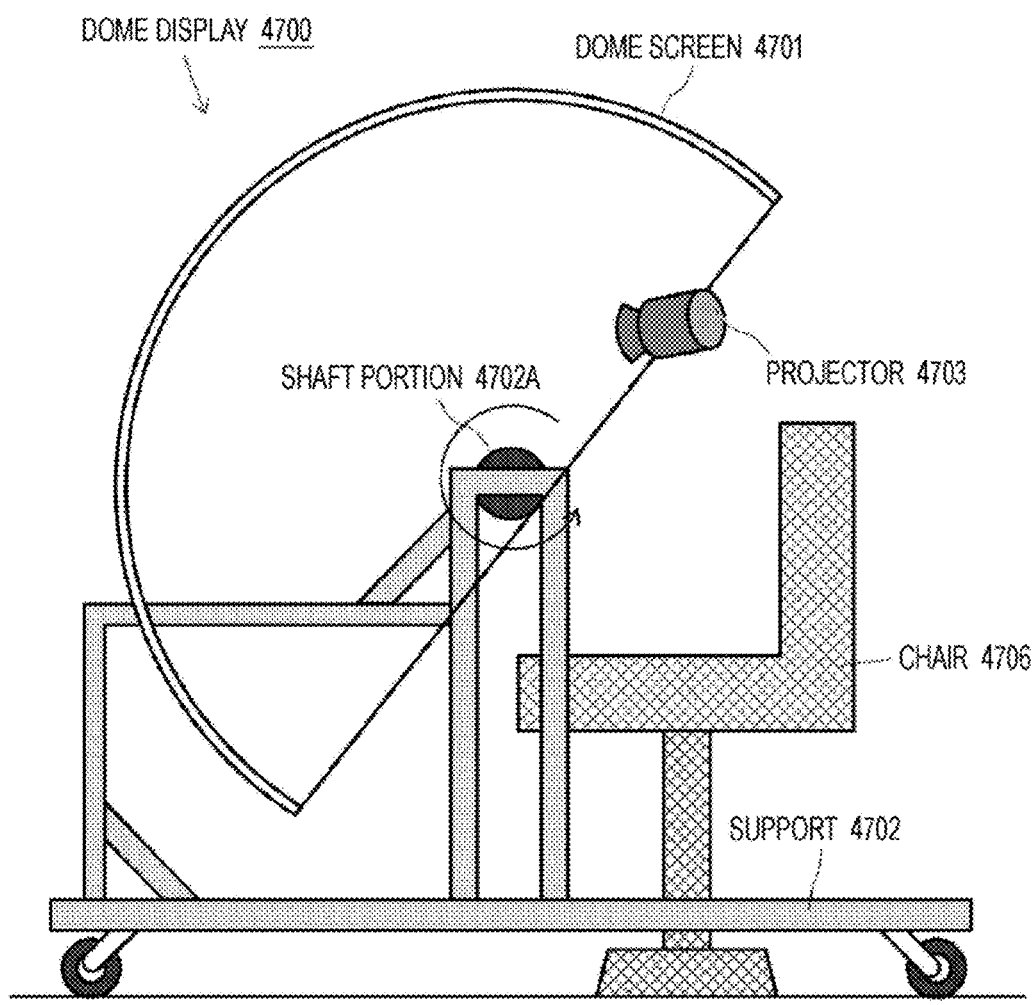
FIG. 52 is a diagram illustrating an exemplary configuration of the dome display 4700.

The dome screen 4701 is rotatably supported. As illustrated in FIGS. 47 and 48, the dome screen 101 supported substantially horizontally is configured to display, on the display surface of the dome screen 101, a 360 degree video extending 360 degrees horizontally. In contrast, as illustrated in FIGS. 49 and 50, the dome screen 4701 rotated horizontally axially by 90 degrees on the sagittal plane, around the rotation axes of the shaft portions 4702A and 4702B is configured to display, on the display surface of the dome screen 4701, a 360 degree video extending 360 degrees vertically. For example, is a case where a wide viewing angle video imaginarily showing the sky, a high-rise building, or the like is observed, rotating the dome screen 4701 by 90 degrees as illustrated in FIGS. 49 and 50 enables display of a video showing a lower side (e.g., ground surface). Furthermore, the dome display 4700 is allowed to be used not only by setting the dome screen 4701 in the horizontal direction or the vertical direction, as illustrated in FIGS. 47 to 50, but also by tilting the dome screen 4701 at an angle of 0 to 90 degrees on the sagittal plane, around the horizontal axis, as illustrated in FIGS. 51 and 52.

Figure 53:
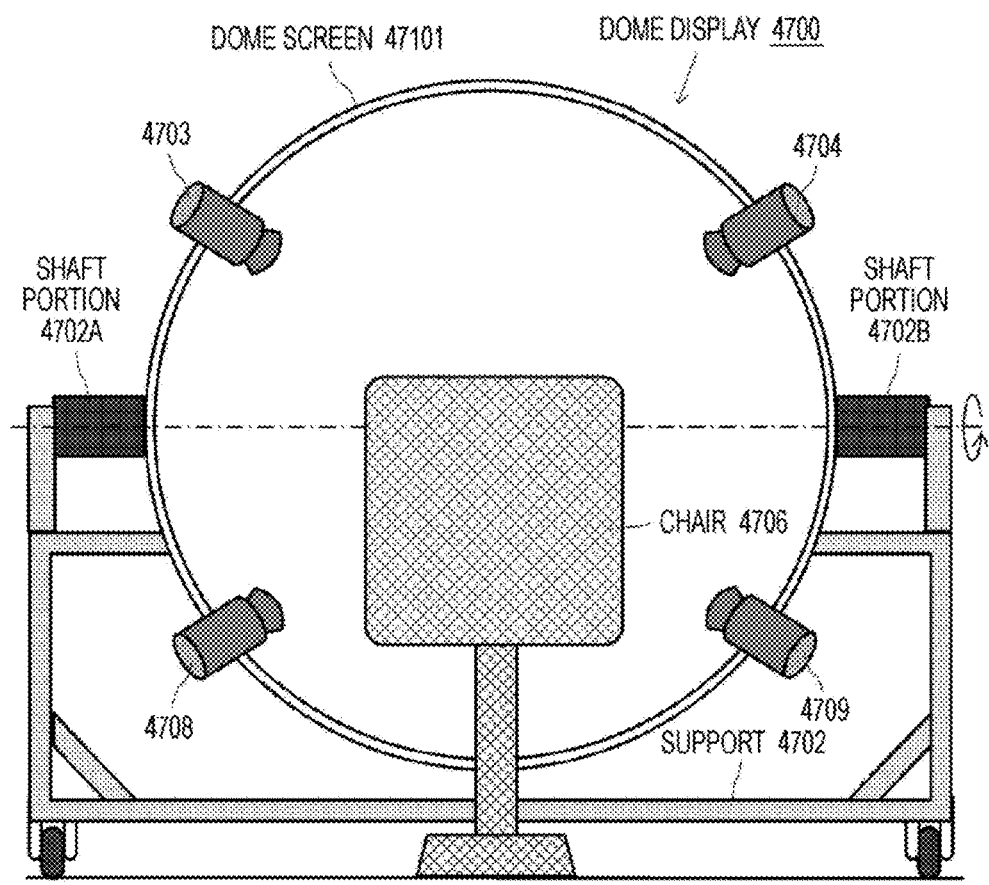
FIG. 53 is a diagram illustrating an exemplary configuration of the dome display 4700.

Furthermore, in the exemplary configuration illustrated in FIGS. 47 to 52, the dome display 4700 includes the two projectors 4703 and 4704, but three or more of projectors may be installed. FIG. 53 illustrates an exemplary configuration of the dome display 4700 further including two projectors 4708 and 4709 mounted to the dome screen 4701, in addition to the projectors 4703 and 4704.

Figure 54:
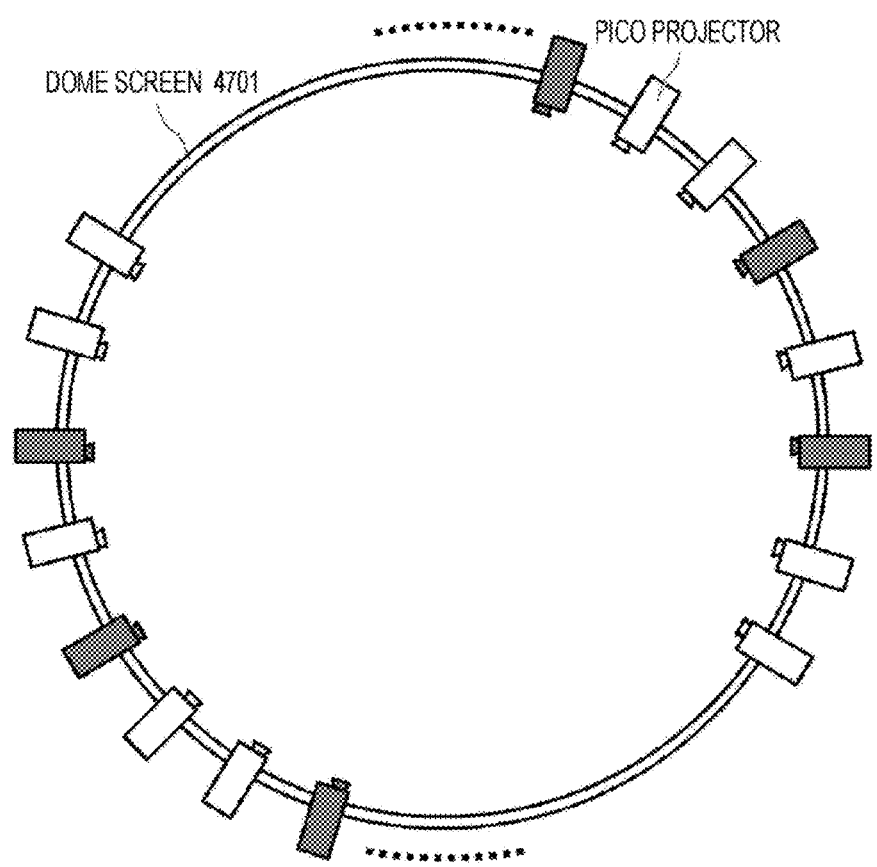
FIG. 54 is a diagram illustrating an exemplary configuration of the dome display 4700.

As a projector configured to project a video to the dome screen 4701, for example, a pico projector may be employed which has a palm-size and high resolution. The pico projector requires less installation area, and the number of pico projectors mounted to the dome screen 4701 may be increased. FIG. 54 illustrates a state in which a large number of pico projectors are mounted to the dome screen 4701. With increasing number of projectors installed, the brightness, contrast, and resolution of a projected video are improved. Furthermore, for example, during a gesture motion of the viewer in the dome screen 4701, a projected video from a projector may be blocked by the viewer's hand stretched out, but the blocked video is compensated for with a projected video from another projector. In a case where a large number of projectors are turned on, power consumption is increased. Therefore, only required number of projectors may be operated appropriately partially without driving all installed projectors. For example, the control unit 1307 desirably controls a projector to be partially driven in accordance with the posture of the viewer's body, position of the viewer's hand, or the like. A camera, a distance sensor, or the like is desirably installed for each projector to detect whether an obstruction is between each projector and a surface of the screen 4701 or whether a projected video has a shadow, and then a projector projecting an insufficient video is turned off and an adjacent projector is turned on instead. In FIG. 54, white pico projectors are turned on, and gray-colored pico projectors are turned off.

C. UI Relating to Movement in Viewpoint (Switching of Videos)

As illustrated in FIG. 3 or 4, in configurations of the video line-of-sight systems 300 and 400 in which a video-reproducing device is configured to selectively receive a video from a plurality of video-providing devices, switching of video-providing devices as a video transmission source enables instantaneous movement of the position of a viewpoint from which a video is viewed on the video-reproducing device to an installation place of a selected video-providing device after switching (e.g., see FIG. 6).

For example, in a technical field of content, switching of displayed content, such as reproduction of video content of clicked one of a plurality of thumbnails representing viewable video content is performed (e.g., see Patent Document 5).

However, display of a plurality of thumbnails during virtual experience of a full-dome video captured from a viewpoint position being a current installation place of a video-providing device as a transmission source makes it difficult for the user of a video-reproducing device (viewer) to view the video partially hidden by the thumbnails, and realistic feeling of the user is obstructed.

Furthermore, regardless of selection of a video of any thumbnail, it is difficult to understand which viewpoint position the video is moved to next. As illustrated in FIG. 6, in a case where a long pass is made, even if the viewer desires to switch to a video captured from a video-providing device nearest to a current ball position, the place where the long pass is made is need to be determined on the basis of thumbnailed videos, and viewpoint position nearest to the ball is cannot be directly selected.

Therefore, herein, a technology relating to a UI is proposed which achieves switching the display of a video by direct selection of a viewpoint position by the user of a video-reproducing device (viewer) without obstructing a realistic feeling of a full-dome video.

C-1. Display of Target Mark

Figure 14:
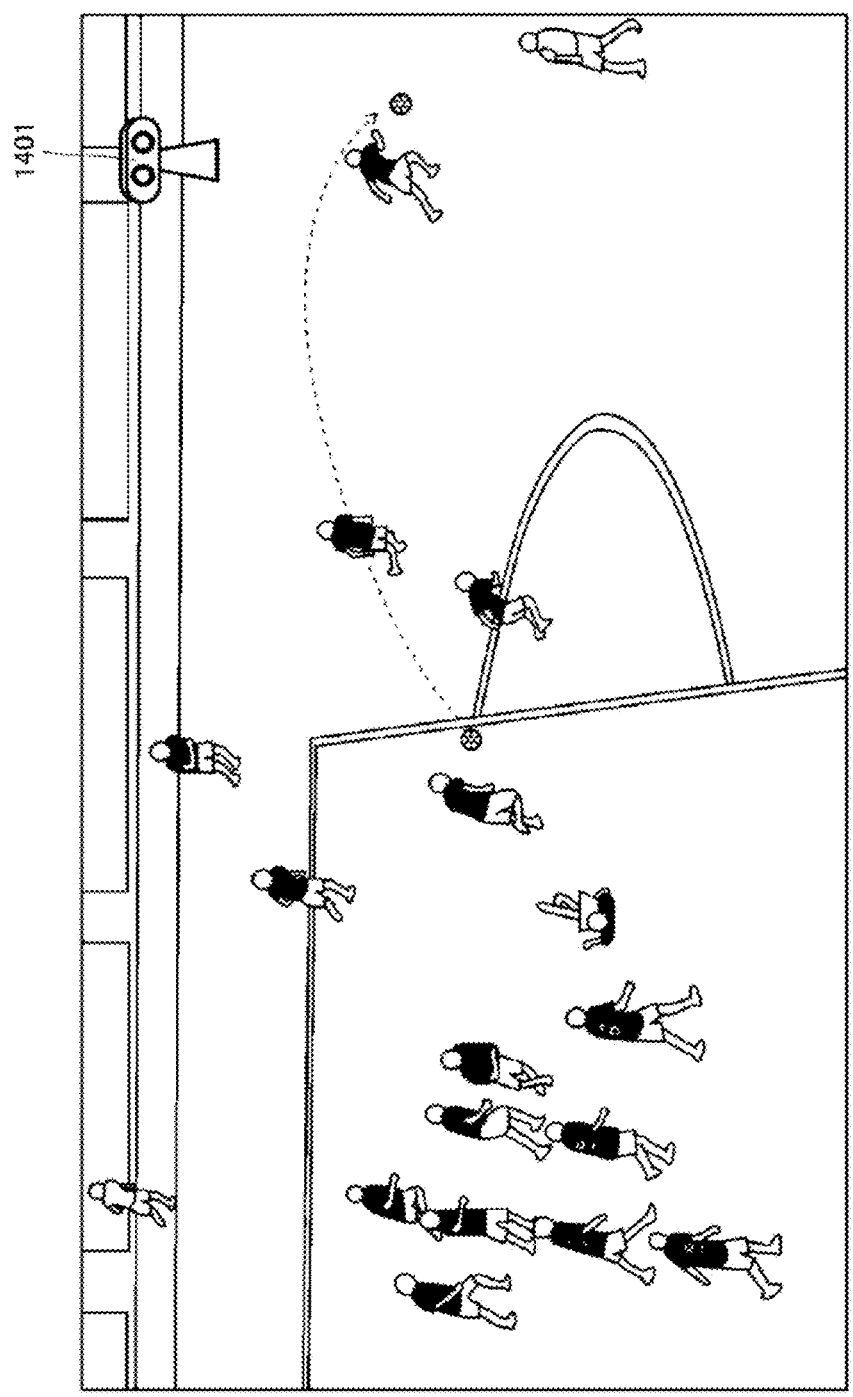
FIG. 14 is a diagram illustrating a display example of a UI achieving movement in viewpoint.

FIG. 14 illustrates a display example of a screen of a video-reproducing device on which a viewpoint video captured from a video-providing device is viewed. In the screen of FIG. 14, a video-providing device 1401 different from the video-providing device being transmitting this video is also shown.

Figure 15:
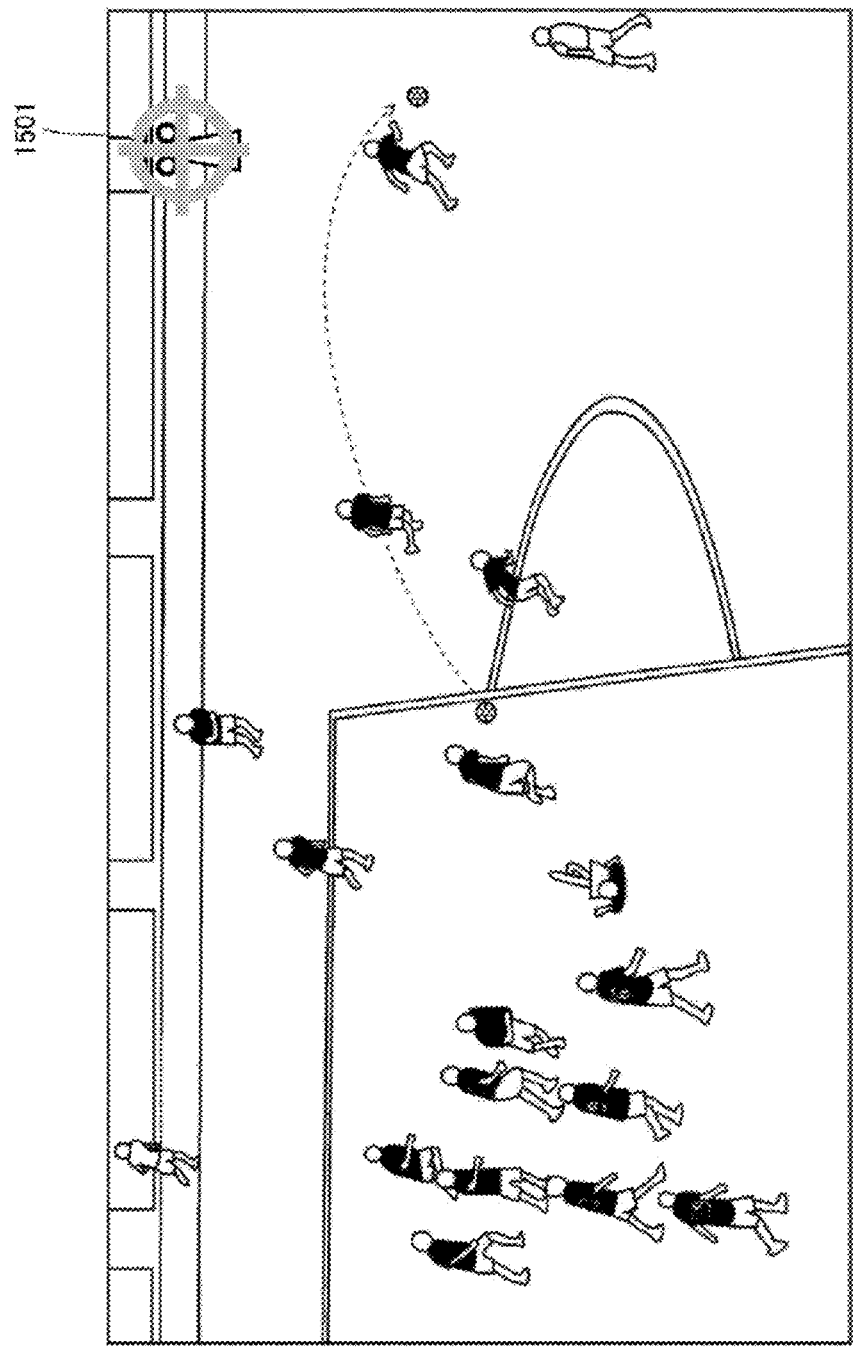
FIG. 15 is a diagram illustrating a display example of a UI achieving movement in viewpoint.

The other video-providing device 1401 found in the display screen of the video-reproducing device is a candidate for a moving destination of a next viewpoint position. Therefore, when the other video-providing device 1401 is found in the display screen, a target mark 1501 indicating the presence of a candidate for a moving destination of a viewpoint position is displayed overlaid on the video-providing device, as illustrated in FIG. 15.

In the example illustrated in FIG. 14, the other video-providing device 1401 is installed at a position near a position to which a long pass ball falls. In a case where the user (viewer) desires to move a viewpoint position to an installation place of the video-providing device 1401 which gives a good view of the ball, the user makes a "jumping movement" of slightly moving the head or body up and down to give an instruction to move the viewpoint position. When the jumping movement of the user is detected on the basis of a measurement result of the sensor unit 1308 of the video-reproducing device (see FIG. 13), it is determined that an instruction is given to move the viewpoint position to a place where the target mark 1501 is displayed. Then, a request for stopping transmission is transmitted to a video-providing device as a transmission source of a currently displayed video, and a request for starting transmission is transmitted to the video-providing device 1401 as the moving destination. When transmission of a video from the video-providing device 1401 is started, the movement in viewpoint is achieved, and a video captured from a new viewpoint position is allowed to be viewed on the video-reproducing device.

Any method is employed to detect a video-providing device being a candidate for a moving destination of a next viewpoint position in the screen. For example, image recognition may be performed on a displayed video by using, for example, the control unit 1307 of the video-reproducing device to detect a video-providing device included in the screen. For ease of detection, a video-providing device may have a standardized form factor, and visible information such as a two-dimensional bar code or a visual marker may be arranged on a surface of each video-providing device.

Alternatively, a position management server configured to manage the installation places of all video-providing devices to which a video-reproducing device is accessible may be provided so that the video-reproducing device makes an inquiry about a video-providing device positioned in a display angle of view and an installation place thereof whenever a viewpoint position or a line-of-sight direction is changed. Furthermore, a video-providing device movably mounted to a mobile body or the like is desirably notifies the position management server of positional information of the video-providing device itself whenever the video-providing device moves the position thereof (or periodically).

Alternatively, each video-providing device may intermittently transmit a beacon signal in which positional information of the video-providing device itself is described so that the video-reproducing device determines a video-providing device positioned in a display angle of view on the basis of a received beacon signal. In contrast, a video-reproducing device may intermittently transmit a position notification request to surrounding video-providing devices so that a video-providing device receiving this positional information notification request returns the positional information of the video-providing device to the video-reproducing device.

Figure 16:
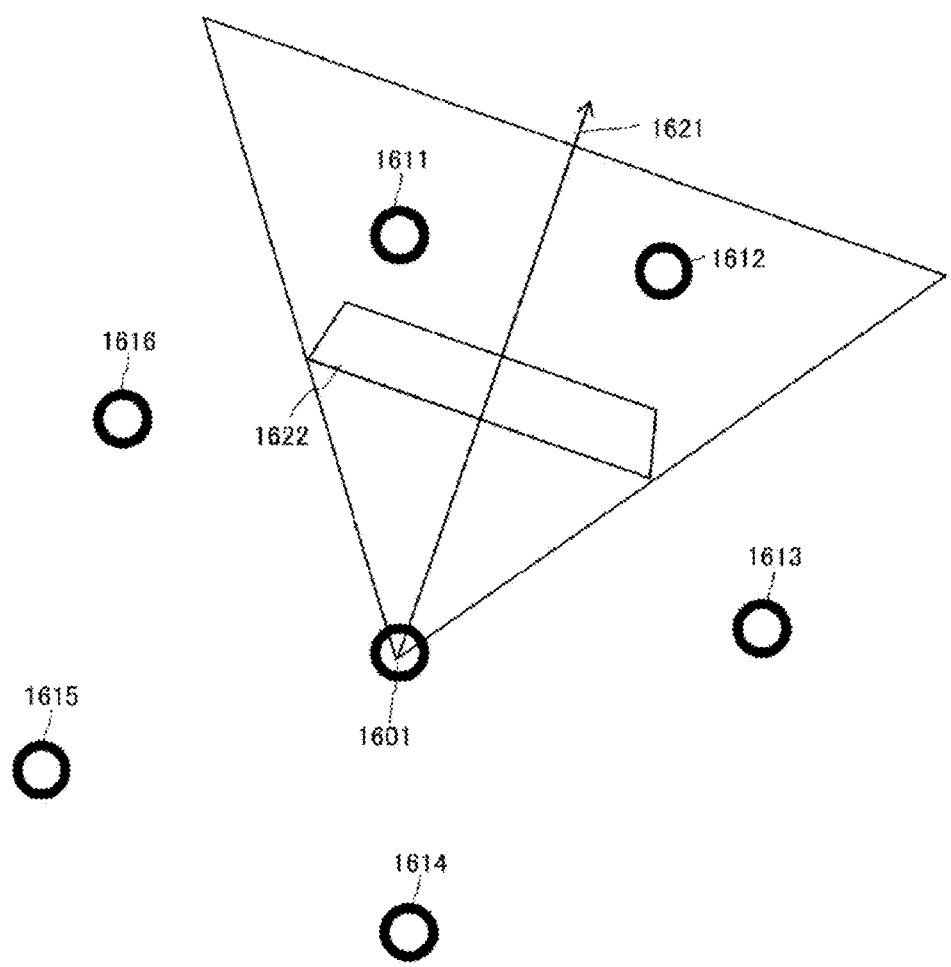
FIG. 16 is a diagram illustrating a process of detecting video-providing devices shown in a screen of a video-reproducing device.

FIG. 16 is an aerial view of a space in which a plurality of video-providing devices to which a video-reproducing device is accessible (a request for starting transmission of a video is transmitted) is scattered. In FIG. 16, a reference number 1601 represents a video-providing device being transmitting a video to the video-reproducing device, and reference numbers 1611 to 1616 represent video-providing devices to which the video-reproducing device is accessible but which are not transmitting videos (or put on standby for video transmission to the video-reproducing device). An appropriate method, such as management of the respective video-providing devices 1601 and 1611 to 1616 by the position management server, reception of the beacon signal from each of the video-providing devices 1601 and 1611 to 1616 by the video-reproducing device, or making an inquiry to the respective video-providing devices 1601 and 1611 to 1616 by the video-reproducing device, is used to acquire positional information of the respective video-providing devices 1601 and 1611 to 1616. Then, on the basis of the positional information of the video-providing device 1601 and line-of-sight direction of an imaging unit of the video-providing device 1601, zooming, and the like, an angle of view 1622 displayed on the video-reproducing device is calculated, and the presence of the video-providing devices 1611 and 1612 in the screen is detected.

Such a detection process is performed, for example, whenever the video-reproducing device starts to display a video, line-of-sight direction is changed, or viewpoint positions are switched. The detection process may be performed by the video-reproducing device, or may be performed by the position management server and give notice thereof to the video-reproducing device. Alternatively, in the video-reproducing device, image recognition may be performed on a video displayed in the screen to detect video-providing devices (or two-dimensional bar codes, visual markers provided on the video-providing devices, or the like) so that the video-providing devices 1611 and 1612 shown in the screen are detected.

Figure 17:
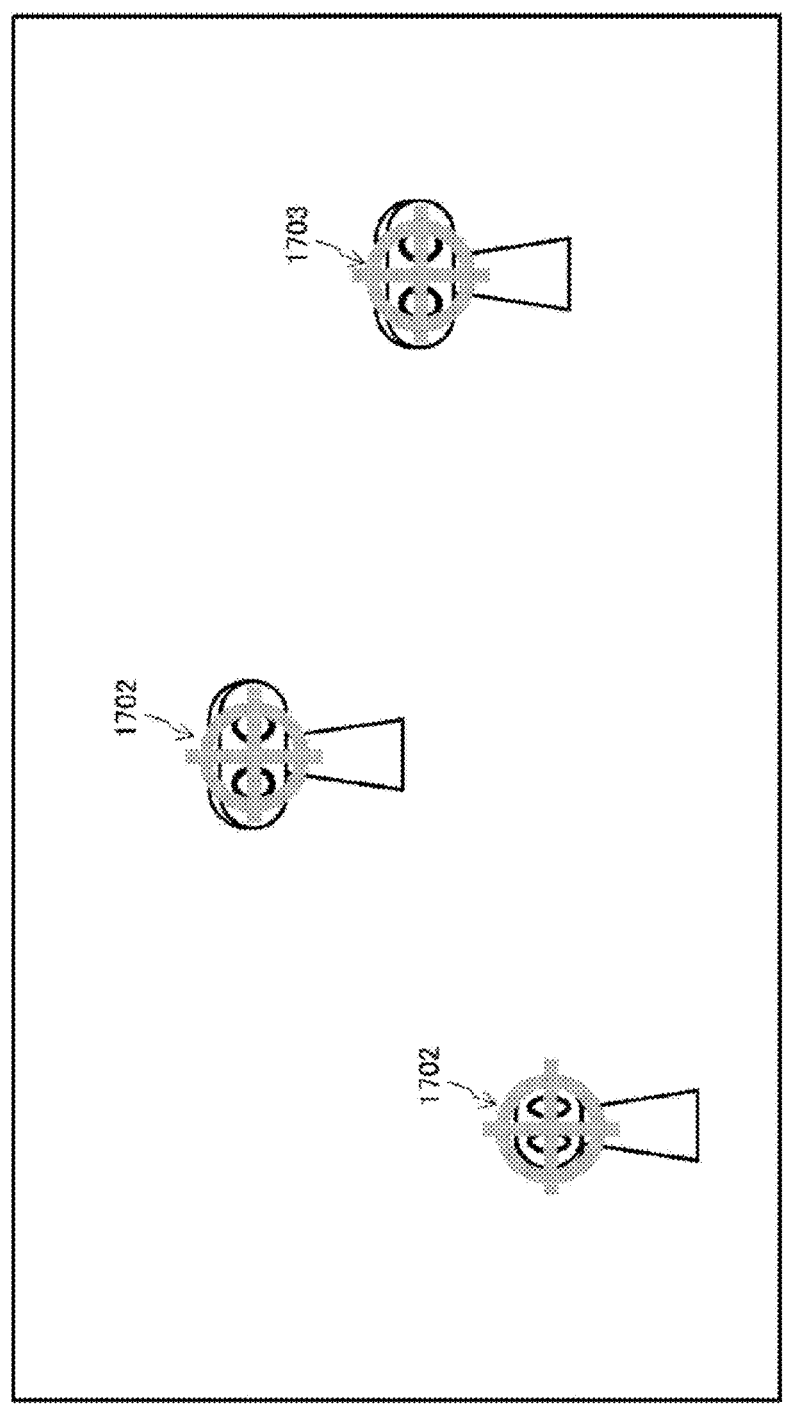
FIG. 17 is a diagram illustrating a display example of a UI achieving movement in viewpoint.

In FIGS. 14 and 15, a display example is illustrated in which, for ease of description, only one video-providing device is positioned on the screen and the target mark is displayed on the one video-providing device. Actually, two or more of video-providing devices are considered to be positioned on the display screen of the video-reproducing device, and in such a case, the target mark is displayed overlaid on each video-providing device. FIG. 17 illustrates a state in which target marks 1701, 1702, and 1703 are displayed overlaid on a plurality of video-providing devices positioned on a display screen.

As illustrated in FIG. 17, in a case where there is a plurality of target marks, any of the target marks needs to be selected as a moving destination of a viewpoint position. For example, user's (viewer's) gaze at (or gazes at for a certain time) a target mark on a viewpoint position from which a video is desired to be captured enables selection of the target mark.

Figure 18:
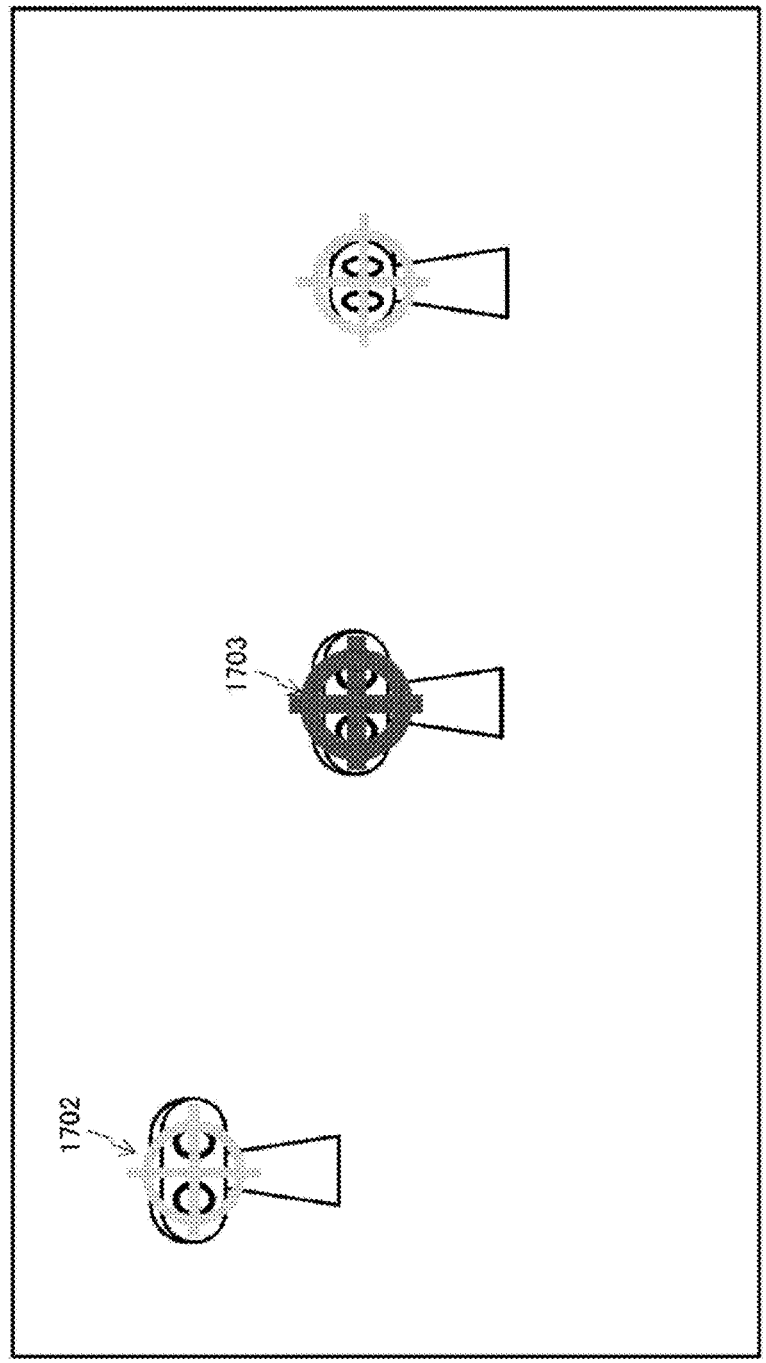
FIG. 18 is a diagram illustrating a display example of a UI achieving movement in viewpoint.

It is assumed that, in the display screen illustrated in FIG. 17, the user has an interest in the target mark 1703 on the periphery of the screen and gazes at the target mark 1703. Due to movement of the line of sight of the user to the target mark 1703, the display screen transitions to a display screen showing the video-providing device on which the target mark 1703 is overlaid, at the center, as illustrated in FIG. 18. In addition, the selected target mark 1703 may be highlighted or the other target marks 1701 and 1702 may be grayed to visually indicate selection of the target mark 1703.

In such a screen state, when the user makes a "jumping movement" of slightly moving the head or body of the user, selection of the target mark 1703 is determined. Then, the video-reproducing device is instructed to move the viewpoint to the target mark 1703, a process of switching viewpoint positions is performed, and switching is made to a video captured by the video-providing device on which the target mark 1703 is overlaid.

FIG. 17 illustrates a display example in which the target marks are arranged on a video captured in a horizontal direction. In such a display mode, even if the target marks are spatially separated from each other, sometimes target marks positioned closer in a line-of-sight direction from a current viewpoint position are overlapped and difficult to see. Therefore, a video captured not in a horizontal direction but from above may be used to display the target marks. For example, an aerial view may be obtained by combining a plurality of videos captured in a horizontal direction. Alternatively, a map, a floor plan view of a building, or the like may be used instead of the aerial view.

Figure 40:
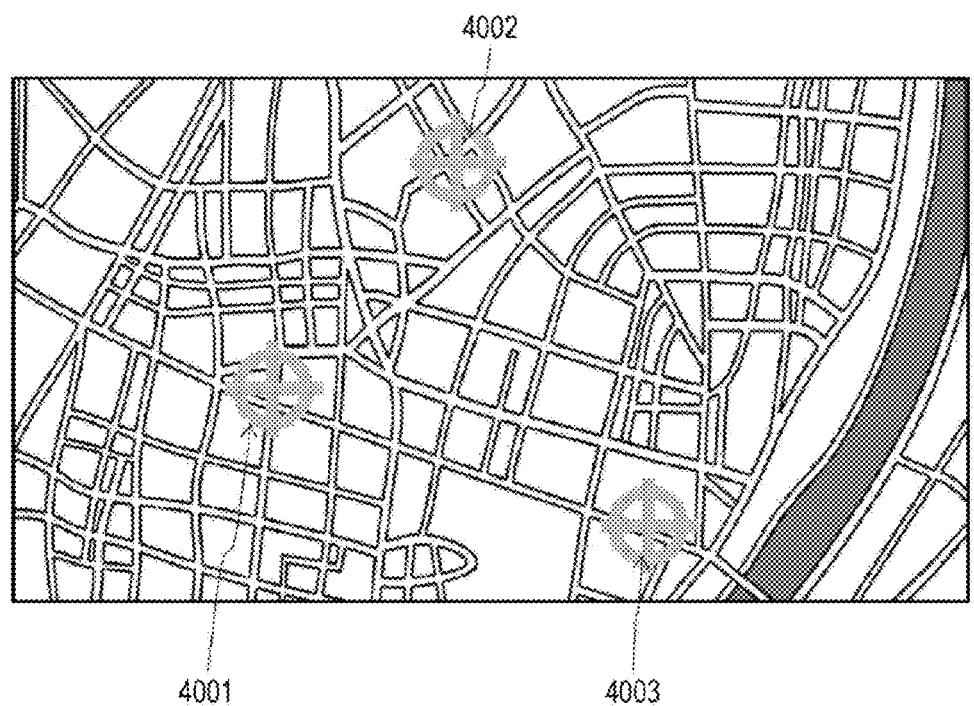
FIG. 40 is an exemplary diagram illustrating target marks displayed on a video representing an aerial view of land.

FIG. 40 illustrates a display example in which target marks 4001, 4002, and 4003 which indicate installation places of video-providing devices are displayed on a video showing an aerial view of land. The user (viewer) is allowed to select a next viewpoint position as if the user (viewer) in a helicopter and the like hovering in the air comes down to the ground.

An exemplary UI operation to move a viewpoint position through hovering in the air will be described with reference to FIGS. 41 to 44.

Figure 41:
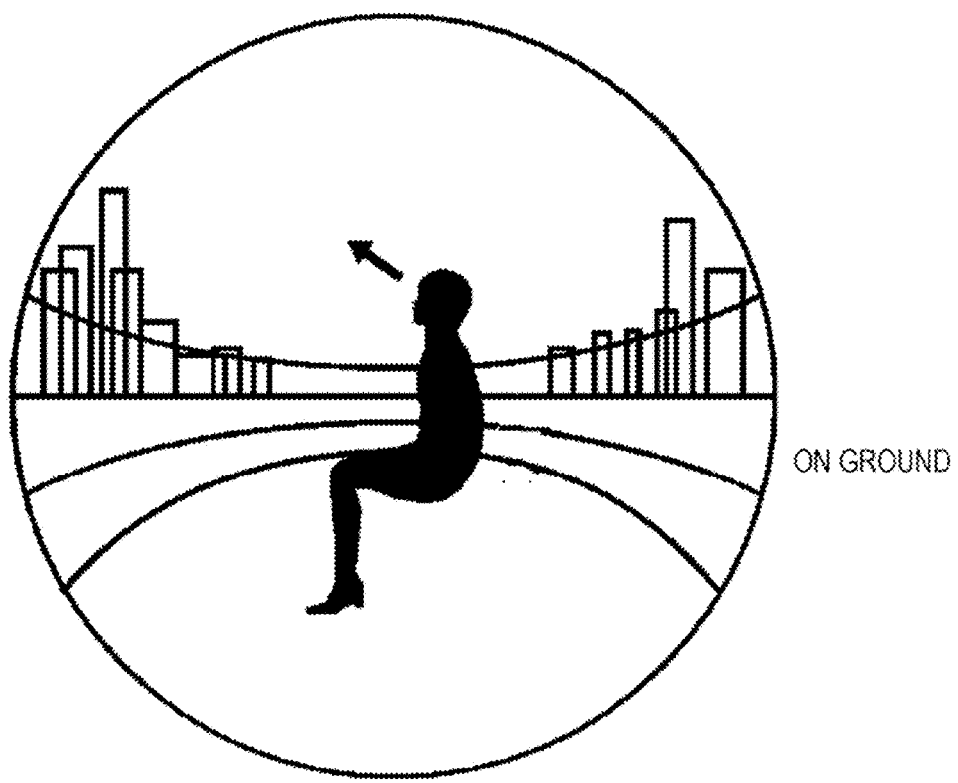
FIG. 41 is a diagram illustrating exemplary UI operation to move a viewpoint position through hovering in the air.
Figure 42:
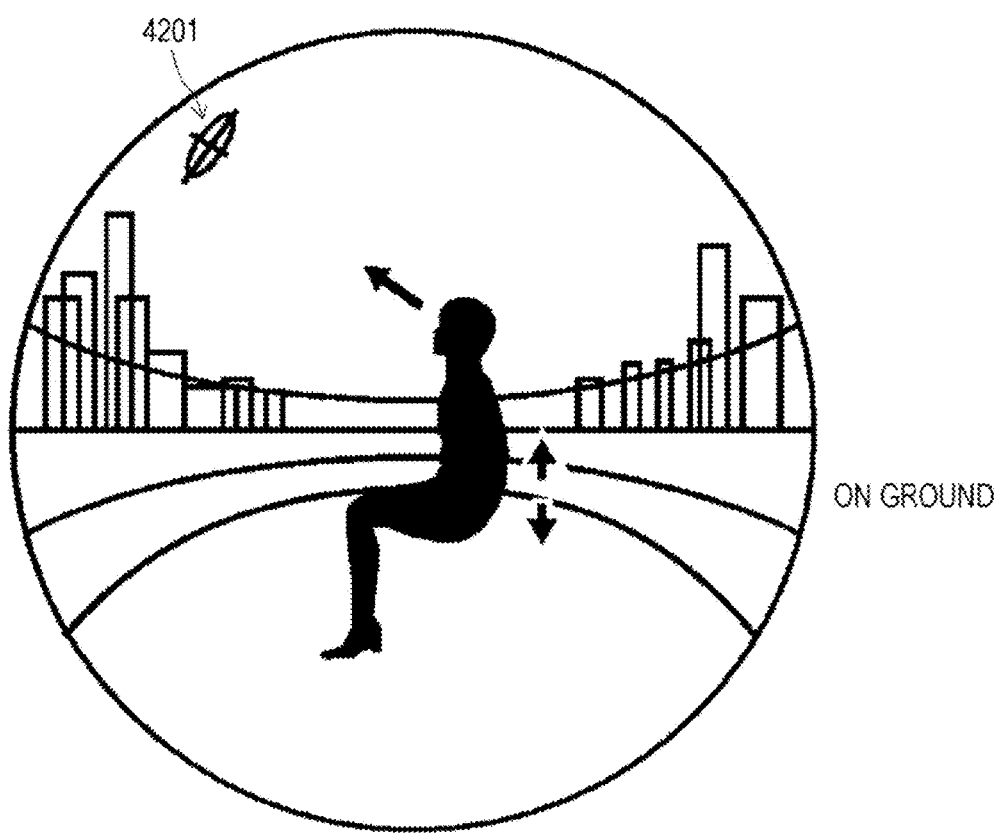
FIG. 42 is a diagram illustrating exemplary UI operation to move a viewpoint position through hovering in the air.
Figure 43:
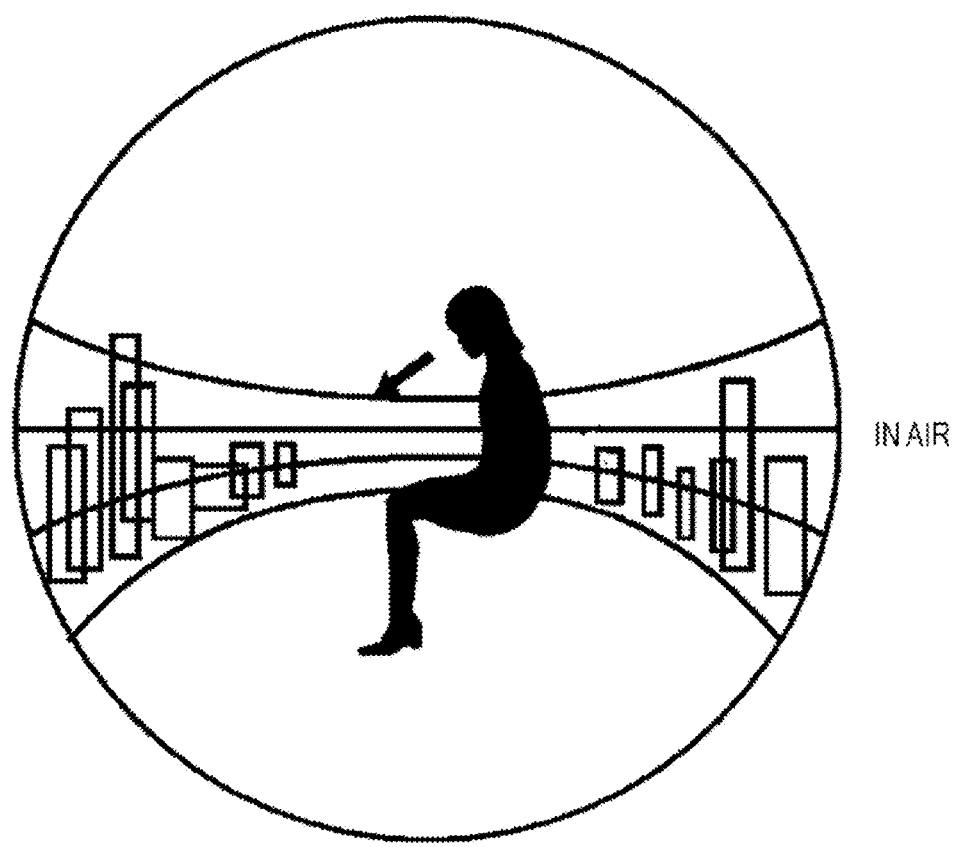
FIG. 43 is a diagram illustrating exemplary UI operation to move a viewpoint position through hovering in the air.

As illustrated in FIG. 41, the user (viewer) keeps looking up for a certain time (e.g., for a few seconds). Then, as illustrated in FIG. 42, a target mark 4201 appears in the air (in a line-of-sight direction of the user). When the user makes a "jumping movement" of slightly moving the body up and down while the target mark 3201 is displayed, switching is made to a video of an aerial view making the user feel as if the user is hovering in the air and looking down the ground, as illustrated in FIG. 43. Although illustration is omitted, target marks are displayed on the ground as illustrated in FIG. 40, and user can look down the target marks.

Figure 44:
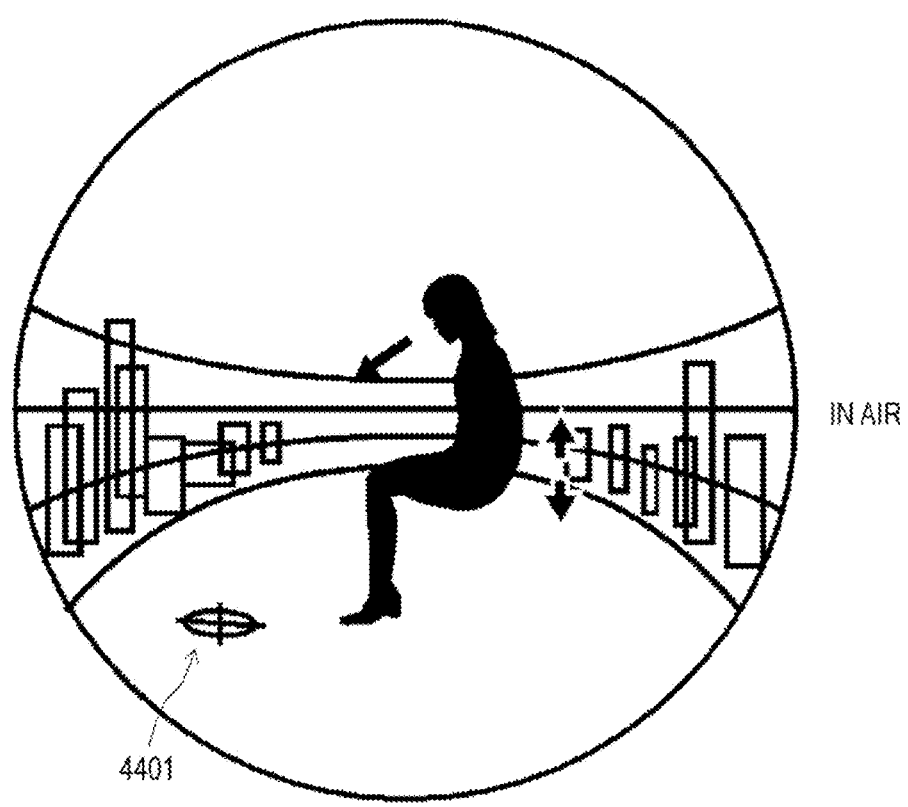
FIG. 44 is a diagram illustrating exemplary UI operation to move a viewpoint position through hovering in the air.

Next, when the user looks down the ground and gazes at a target mark at a desired viewpoint position, the target mark 4401 is highlighted as illustrated in FIG. 44. As described above, in a case where the user further makes a "jumping movement" of slightly moving the body up and down, while the target mark 4401 is selected, and a video of falling down to a point on the ground indicated by the target mark 4401 is displayed, and switched to a video on the ground (not illustrated) captured from that point as the viewpoint position.

C-2. Communication Sequence for Switching Viewpoint Position

In a video-reproducing device, a process of switching viewpoint positions includes transmission of a request for stopping transmission to a video-providing device as a transmission source of a currently displayed video, and transmission of a request for starting transmission to a video-providing device positioned as a moving destination.

Figure 39:
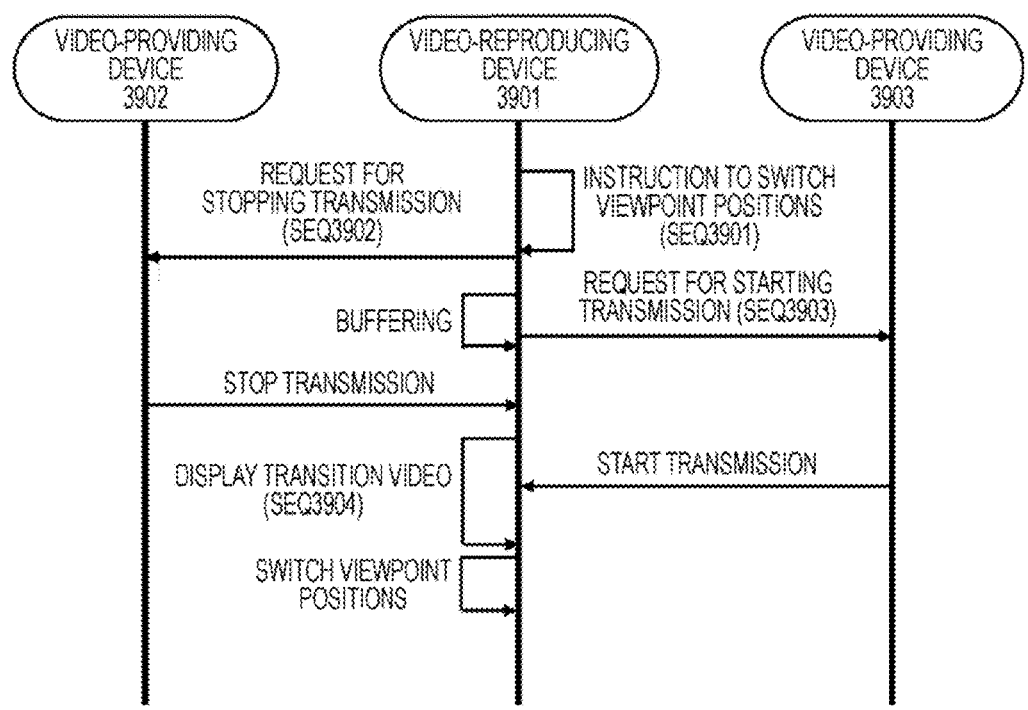
FIG. 39 is a diagram illustrating an exemplary communication sequence to switch viewpoint positions in a video-reproducing device.

FIG. 39 illustrates an exemplary communication sequence to switch viewpoint positions in a video-reproducing device.

In a video-reproducing device 3901, when the user (viewer) makes a jumping movement or the like to give an instruction to switch viewpoint positions (SEQ3901), a request for stopping transmission is transmitted to a video-providing device 3902 as a transmission source of a currently displayed video (SEQ3902).

Furthermore, the video-reproducing device 3901 transmits a request for starting transmission to a video-providing device 3903 as a moving destination (SEQ3903).

Information relating to a current line-of-sight direction of the video-reproducing device 3901 is added to the request for starting transmission, and then the request for starting transmission is transmitted. Therefore, a video transmitted from the video-providing device 3903 also maintains the same line-of-sight direction as that before the movement in viewpoint, and the spatial disorientation (described later) of the user (viewer) can be suppressed.

In the example illustrated in FIG. 39, the request for stopping transmission is transmitted firstly, and then, the request for starting transmission is transmitted, but the video-reproducing device may transmit the request for stopping transmission and the request for starting transmission simultaneously or transmit the request for starting transmission firstly.

Furthermore, in the video-reproducing device, it is considered that a time is required from stopping video transmission from the video-providing device as the transmission source of a current video to switching to a video from the video-providing device as the moving destination. Therefore, a video from the video-providing device as the transmission source of the current video may be buffered, and on the basis of the buffered video, a transition video displayed before switching to the video from the moving destination may be displayed (SEQ3904).

The transition video is preferably a video effectively suppressing the spatial disorientation of the user (viewer) before and after switching the videos, but the description thereof will be described later in detail.

Although illustration is omitted in FIG. 39, when the user gives an instruction to change a line-of-sight direction by moving the head of the user during viewing a video, the video-reproducing device 3901 sequentially transmits a request for changing a transmission direction to the video-providing device 3901 or 3902 being transmitting the video.

C-3. Indication of Status of Video-Providing Device

Figure 19:
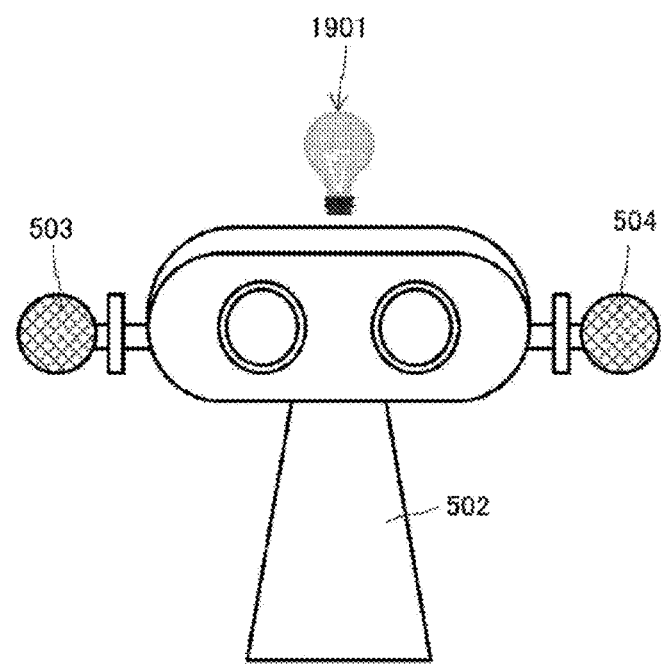
FIG. 19 is a diagram illustrating a video-providing device 1900 including an indicator.

The target mark also serves as an indicator configured to indicate a movable viewpoint position to the user (viewer) of a video-reproducing device. On a screen of the video-reproducing device, in addition to the target mark, the video-providing device 1900 may turn on a light 1901 such as LED to announce of the existence of the video-providing device 1900, as illustrated in FIG. 19. Illumination light from the light 1901 is allowed to clearly show the existence of the video-providing device 1900 in the screen of the video-reproducing device, announce the existence of the video-providing device 1900 at an installation place thereof, and be also used for indication of an operation state of the video-providing device 1900. Alternatively, a display panel such as liquid crystal panel may indicate the operation state without turning on the light 1901. The light 1901 corresponds to the status indicator 1209 of the information processing device 1200 illustrated in FIG. 12.

For example, the video-providing device 1900 may change the color or intensity of illumination light from the indicator 1901, in accordance with a video transmission state, such as a standby state for video transmission (or a state in which video transmission is stopped), a state in which a video is being transmitted to a few video-reproducing devices, a busy state in which requests for starting transmission of a video from a large number of video-reproducing devices are concentrated during transmission of a video to some video-reproducing devices, or a state in which no service is provided due to suspension of part or whole of operation. Furthermore, the indicator 1901 may be blinked or a blinking pattern may be changed, in accordance with the video transmission state.

Furthermore, the video-providing device 1900 is an advantageous information source for a remote video-reproducing device, but the video-providing device 1900 may give people around the installation place the impression that they are watched or they are secretly shot. Therefore, the video-providing device 1900 transmitting no video may turn off the indicator 1901 or may have an appearance relaxing the people around the video-providing device 1900.

Figure 24:
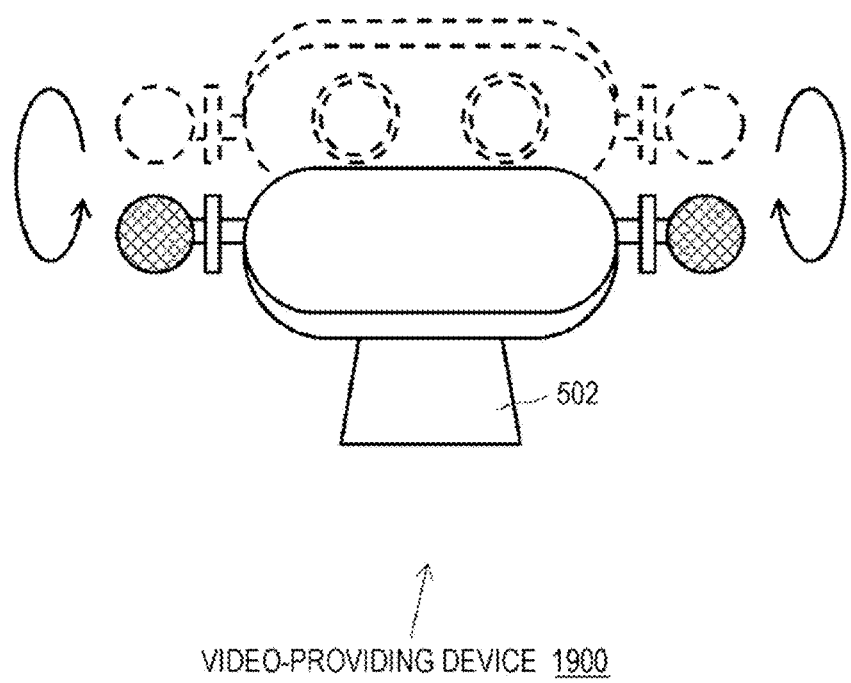
FIG. 24 is an exemplary diagram illustrating a video-providing device put on standby for video transmission.

For example, in a case where a support portion 502 has a structure to rotatably support a twin-lens stereo camera around a pitch shaft, the video-providing device 1900 in a standby state takes a posture clearly showing that the line of sight of the stereo camera is not fixed to the surrounding people by, for example, turning down a head of a robot as illustrated in FIG. 24. Turning down the stereo camera makes the surrounding people feel that they are not shot and relaxes them. Note that, even in the standby state, for quick response to the request for starting transmission, the video-providing device 1900 preferably holds the camera or an actuator in an active state.

Furthermore, in a case where the video-providing device being in a posture as illustrated in FIG. 24 and put on standby receives the request for starting transmission from any video-reproducing device and starts imaging, drive of the pitch shaft is started again, and the robot restores the posture by lifting the head as illustrated in FIG. 19. To restore the posture, for example, a yaw shaft is desirably driven to turn the stereo camera in a line-of-sight direction specified by the video-reproducing device from which the request for starting transmission is transmitted. Maintaining the line-of-sight direction before and after moving the viewpoint position can suppress the spatial disorientation (described later) of the user (viewer).

Figure 38:
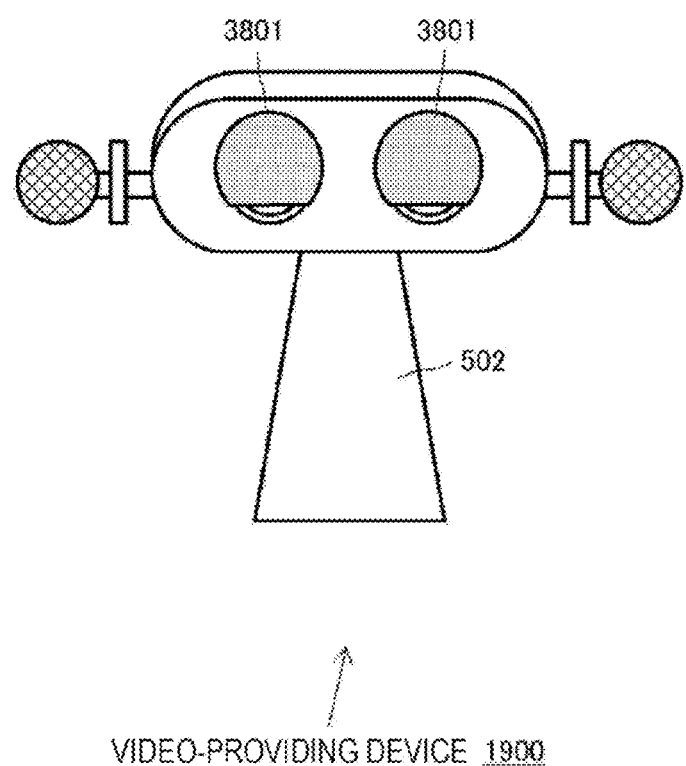
FIG. 38 is an exemplary diagram illustrating a video-providing device capturing no image.

Furthermore, as a modification, as illustrated in FIG. 38, the stereo camera may include a lens at which an openable/closable lid 3801 is provided, and the lid 3801 is closed to show that no shooting is performed, giving a relaxing feeling.

C-4. Movement in Viewpoint Position by Jumping Movement

Methods of giving an instruction (or indicating intension) on movement to a next viewpoint position (place on which a target mark is applied) by the user (viewer) can be also considered, in addition the method using the jumping movement. For example, a method including use of a well-known input device, such as keyboard or mouse, touch panel, joystick, or game controller, and a method including gesture input can be provided.

However, in a video-reproducing device which includes a head mount display, the field of view of the user is blocked by a displayed video, and operation of the input device is sometimes difficult, disabling intuitive operation. Furthermore, the gesture input requires the user to switch manual functions while the user operates an input device, interrupting input operation. In contrast, the "jumping movement" of slightly moving the head or body up and down does not hinder other input operations, and the "jumping movement" is considered intuitive to understand.

An instruction method using not the jumping movement but walking or running toward a next viewpoint position can be performed intuitively, but movement made during wearing the head mount display or in the dome display may cause contact or collision with surrounding equipment. The jumping movement can be safely performed by the user being in a sitting posture or being at a current position.

The sensor unit 1308 of the video-reproducing device (see FIG. 13) is configured by, for example, combining a plurality of sensor elements, such as a gyro sensor, an acceleration sensor, and a geomagnetic sensor, and detects the jumping movement of the user on the basis of a result of measuring the movement of the head. Alternatively, the sensor unit 1308 may detect the jumping movement, on the basis of a result of video recognition using a camera (not illustrated) configured to image the user. Furthermore, the sensor unit 1308 may measure a load applied to a chair on which the user sits or a pressure acting between a user's foot and a ground surface with which the user's foot makes contact, such as a load (pressure) applied to a shoe sole of a user's shoe. Furthermore, the sensor unit 1308 may parallelly detect biological information, such as user's brain wave, muscle potential, or body temperature. The sensor unit 1308 compositely uses sensors to prevent wrong determination based on a detection result of the sensor unit 1308.

Note that a movement differs considerably between individuals in imagination. Even the same value of movement data detected on the basis of a result of analyzing an image captured by a sensor or a camera is often taken as an upward movement of the head by one person, but taken as other movements by the others. Furthermore, a movement such as moving the head up and down or moving the body up and down in a sitting posture similarly differs between individuals. Therefore, to achieve a comfortable user interface, the movement of a target viewer, such as moving the head upward, moving the head downward, or slightly moving the body up and down in a sitting posture, is preferably measured at a predetermined number of time to preliminarily perform matching between an intended movement and movement data, that is, machine learning.

C-5. Induction or Guide to Viewpoint Position

The target mark is a UI displayed overlaid on a video-providing device found in a screen of a video-reproducing device (described above), and serves as an indicator configured to indicate a movable viewpoint position to the user (viewer) of the video-reproducing device.

On individual video-providing devices, in addition to the target mark, a heat map indicating a distribution of viewpoint positions obtained by calculation of other video-reproducing devices may be displayed. The target mark and the heat map commonly have a role of induction or guide to a viewpoint position. The heat map visually represents a popular viewpoint position effectively In a case where a large number of video-providing devices are on a displayed image and a large number of video-reproducing devices are also used for viewing videos at the same place (in the same viewing space) (the video viewing system 400 having the N-to-N network topology, etc.), a current of other video-reproducing devices may have reference information or a key to determine a next viewpoint position.

Figure 20:
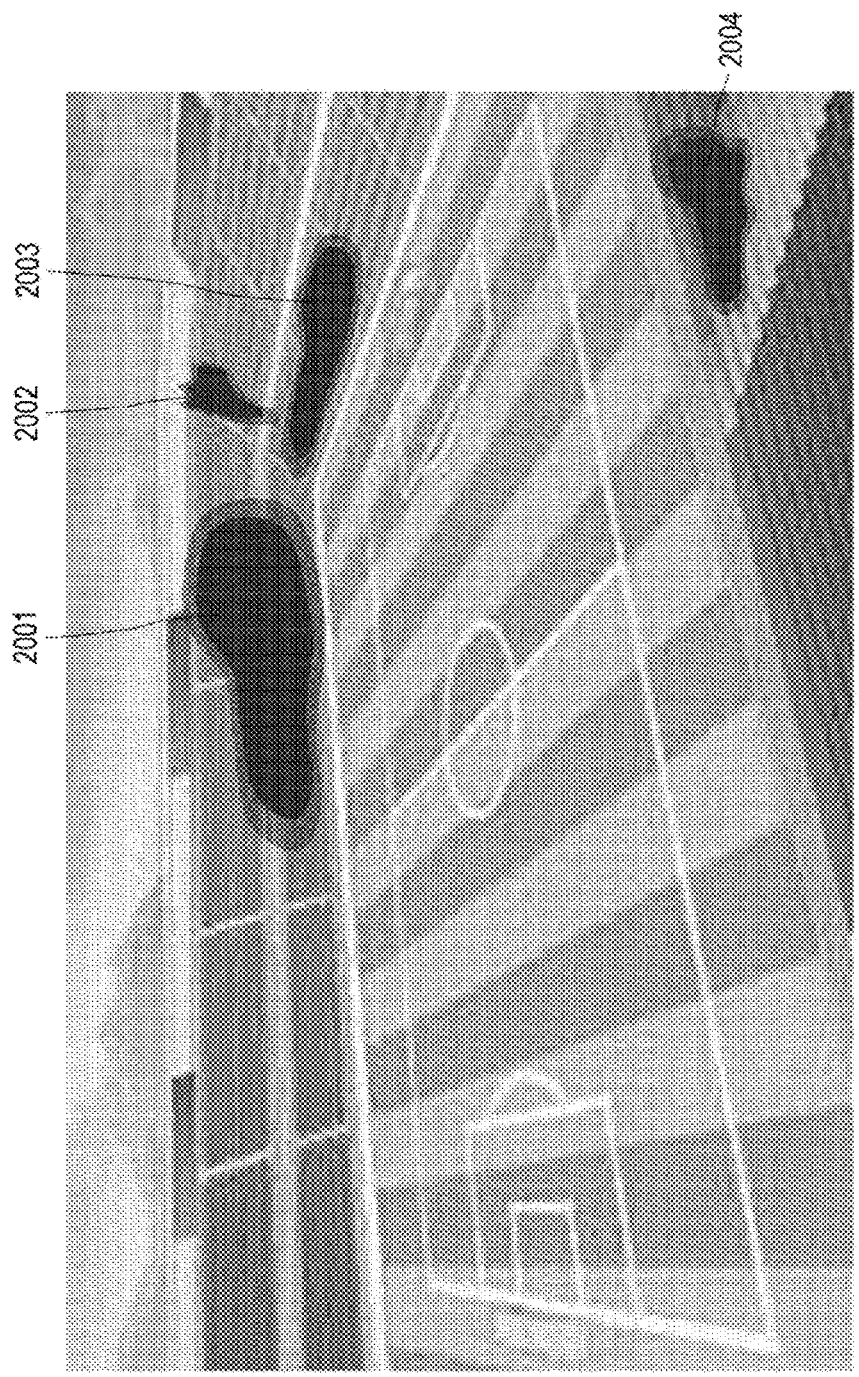
FIG. 20 is a diagram illustrating a display example of distribution of viewpoint positions of video-reproducing devices in the form of heat map.

FIG. 20 illustrates a state in which heat maps 2001 to 2004 are displayed overlaid on a displayed video of a soccer stadium. The user (viewer) of the video-reproducing device is allowed to have easy visual contact with a place which a larger number of video-reproducing devices specify (or prefer) through a screen illustrated in FIG. 20, and determine which viewpoint position to move to.

The heat map can be also referred to as a collective pointer display. Note that the heat map is not mapped to a pixel position on a display screen, but to an actual three-dimensional space. Therefore, even if the user changes the line-of-sight direction, the heat map remains displayed on the same place in the three-dimensional space.

Figure 21:
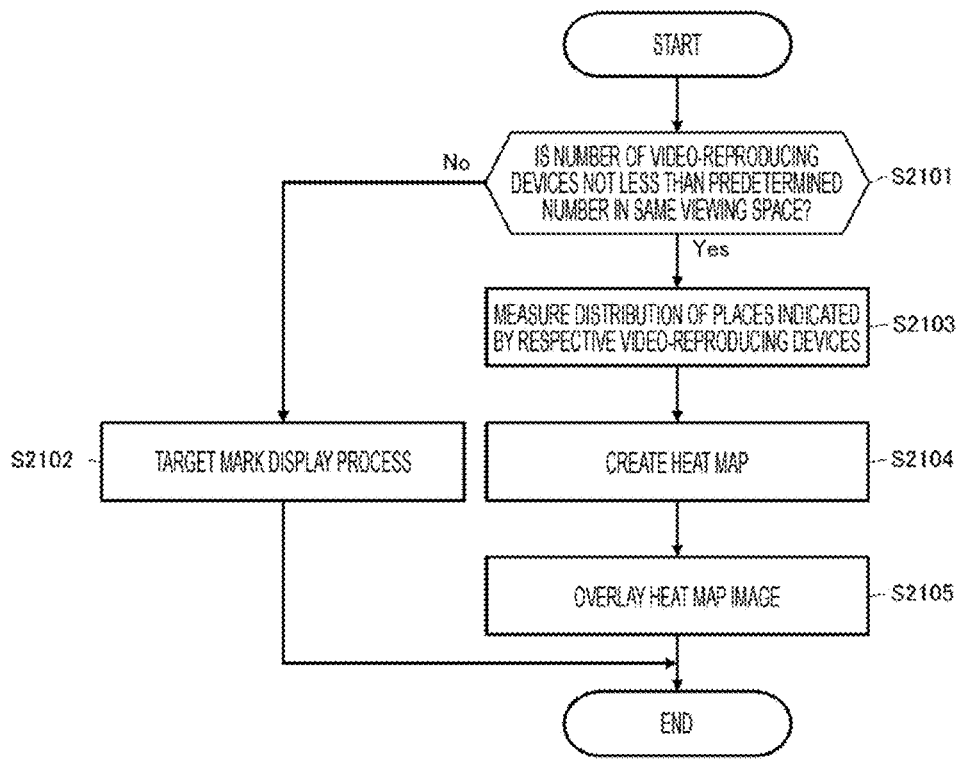
FIG. 21 is a flowchart illustrating a procedure for displaying a target mark or a heat map.

FIG. 21 is a flowchart illustrating an exemplary procedure for displaying a target mark or a heat map on a video-reproducing device.

First, whether the number of other video-reproducing devices used to view videos captured in the same space in which this video-reproducing device is located exceeds a predetermined number is checked (step S2101).

Here, in a case where the number of the other video-reproducing devices is less than the predetermined number (No in step S2101), a normal target mark display process is performed in this video-reproducing device (step S2102), and this processing routine ends. That is because in a case where the number of the other video-reproducing devices is less than the predetermined number, the distribution of the other video-reproducing devices is considered to provide no advantageous information for inducing and guiding the viewpoint position of the viewer. After the normal target mark display process, for example, as illustrated in FIG. 17, target marks are displayed overlaid on video-providing devices found in a current display screen.

In contrast, in a case where the number of the other video-reproducing devices exceeds the predetermined number (Yes in step S2101), this video-reproducing device displays a heat map. Specifically, a distribution of places indicated by the other video-reproducing devices is measured in a three-dimensional space of a field of view of this video-reproducing device (step S2103), and a heat map is created by plotting the distribution in accordance with a color scale or a gray scale (step S2104). Then, this video-reproducing device displays the created heat map overlaid on the screen (step S2105).

C-6. Prevention of Spatial Disorientation Caused by Movement in Viewpoint

In the above description, the UI operation has been described in which a next viewpoint position is indicated by a target mark, and instantaneous switching is made to a video captured from the viewpoint position using the jumping movement of the user.

However, in a case where videos are instantaneously switched, the concerns rise about spatial disorientation, such as loss in camera view, including the viewer's not understanding where he/she is in a space for a moment (loss in spatial recognition), and the viewer's not understanding in which direction he/she faces (loss in orientation recognition).

Therefore, to prevent spacial displacement upon movement in viewpoint position by the jumping movement, the following measures may be taken.

(1) Switching is made to a video captured from a next viewpoint position while maintaining a line-of-sight direction.

(2) A visual effect line such as concentrated linework are displayed in a direction in which the viewer jumps (e.g., a point at which the target mark is found) or other cartoony expression is adopted for a projected video to prevent loss in camera orientation.

(3) Videos are blurred (motion blur) upon switching the videos in response to the jumping movement to reduce uncomfortable feeling or prevent loss in camera orientation.

(4) Wind (headwind) is applied in a direction in which the viewer jumps (e.g., a point at which the target mark is found) to prevent loss in camera orientation.

(5) Objects such as leaves or paper chips are blown in a direction in which the viewer jumps (e.g., a point at which the target mark is found) to prevent loss in camera orientation by visual effect.

Figure 22:
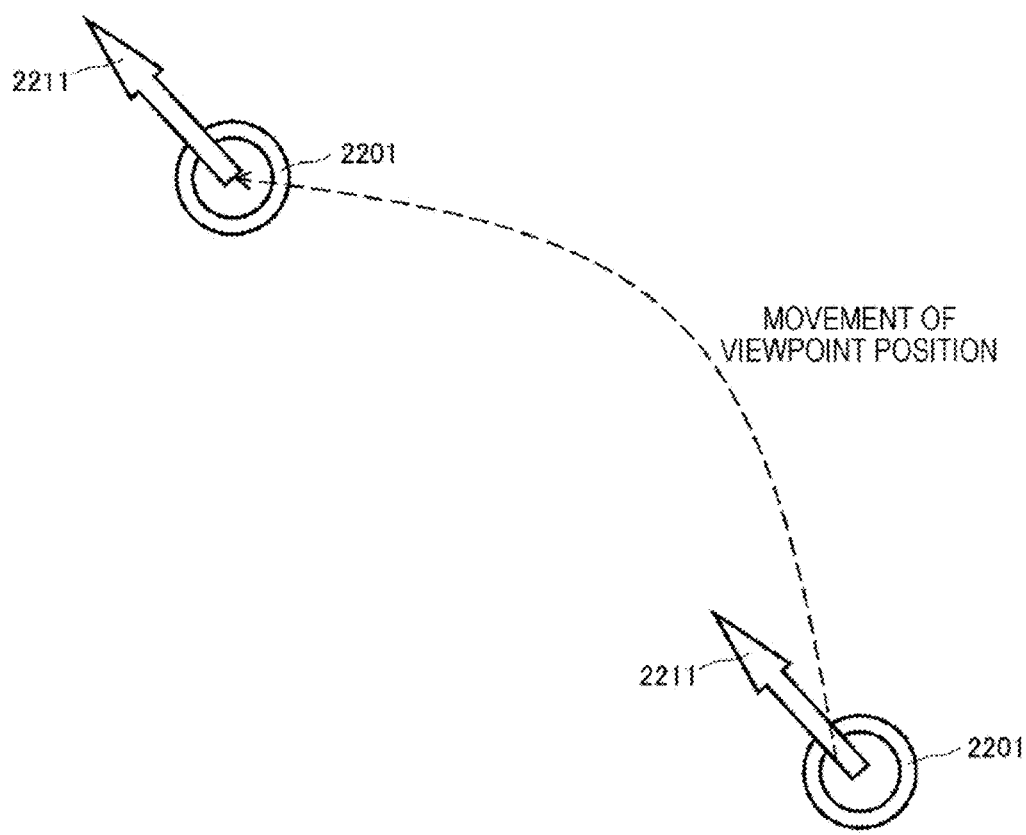
FIG. 22 is a diagram illustrating switching to a video captured from a next viewpoint position while maintaining a line-of-sight direction.

FIG. 22 is an aerial view of switching to a video captured from a next viewpoint position while maintaining a line-of-sight direction, according to (1). In FIG. 22, a reference number 2201 represents a viewpoint position before moving, and a reference number 2211 represents a line-of-sight direction before moving at this viewpoint position 2201. That is, before movement, a video captured in the line-of-sight direction 2211 by a video-providing device installed at the viewpoint position 2201 is displayed on a video-reproducing device.

Furthermore, a reference number 2202 represents a viewpoint position after moving (i.e., selected using a target mark), and a reference number 2212 represents a line-of-sight direction after moving at this viewpoint position 2202. That is, immediately after moving the viewpoint position, the video displayed on the video-reproducing device is switched to a video captured in the line-of-sight direction 2212 by a video-providing device installed at the viewpoint position 2202. The next viewpoint position 2202 represents a position located ahead of the previous line of sight. Then, when switching is made to a video captured from the next viewpoint position 2202 while maintaining the line-of-sight direction, the user (viewer) of a video-reproducing device can readily understand that only instantaneous forward movement is made without changing the line-of-sight direction, and loss in orientation recognition can be prevented.

If the video-reproducing device is configured to transmit, to a video-providing device installed at the viewpoint position 2202, a request for starting transmission of a video together with information relating to a current line-of-sight direction, a video captured from a viewpoint after moving can maintain the line-of-sight direction as illustrated in FIG. 22, preventing the spatial disorientation of the user (viewer).

Figure 23:
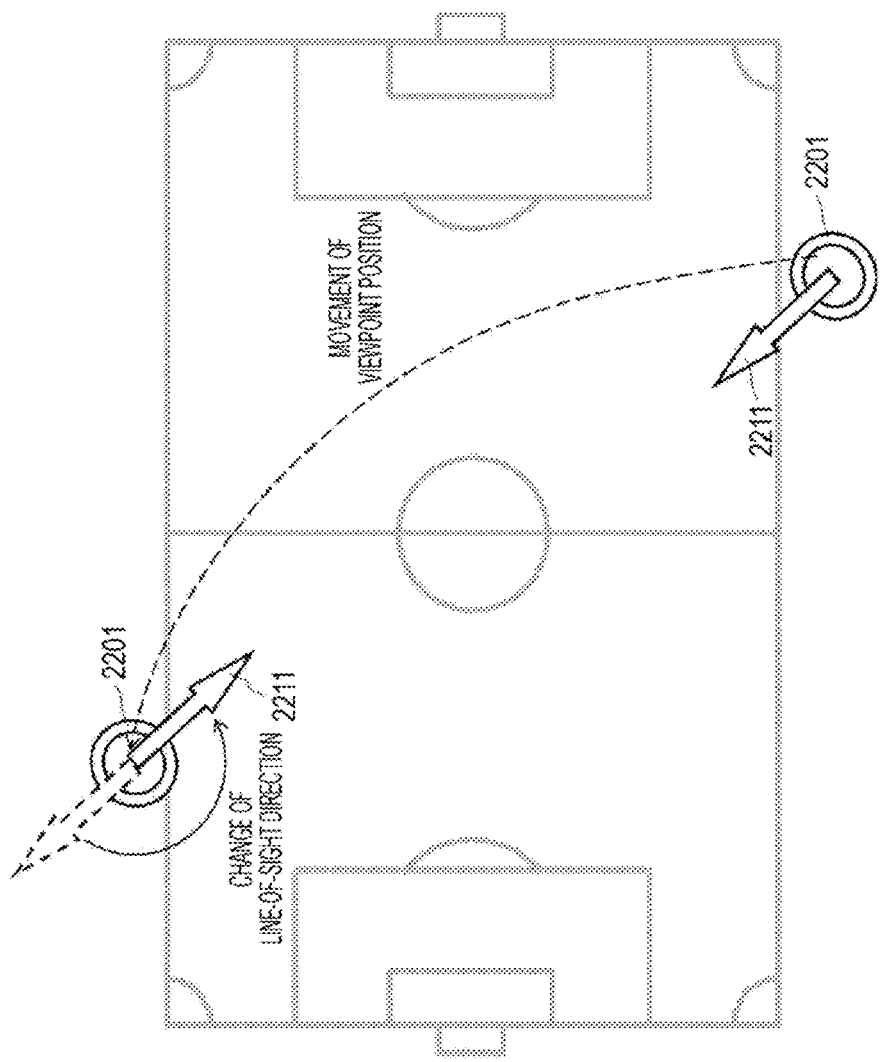
FIG. 23 is a diagram illustrating changing a line-of-sight direction after moving a viewpoint position.

For example, as illustrated in FIG. 23, in a case where a viewpoint position is moved across a pitch in a soccer stadium, switching is made to a video captured from a next viewpoint position while maintaining a line-of-sight direction, releasing the user from the loss in orientation recognition. However, the video displays a stand, and the user cannot watch a game. Therefore, as a process after switching the viewpoint positions, the user desirably changes the line of sight toward the pitch at a new viewpoint position.

Alternatively, in watching sports or concert appreciation, change in viewpoint position causes low possibility of loss in orientation recognition. Therefore, it is sometimes preferable to continuously show the same object (specific player, performer, or the like) before and after movement in viewpoint position, even though the line-of-sight direction is changed.

Furthermore, a line-of-sight direction immediately after movement in viewpoint position may be controlled in accordance with a state of the video-reproducing device side as a transmission destination. For example, the possibility of the spatial disorientation differs between a state in which the user of a video-reproducing device is viewing a video while standing, a state in which the user is viewing a video while sitting, and a state in which the user is viewing a video while walking (or running).

Furthermore, not the line-of-sight direction immediately after movement in viewpoint position (or with the control of the line-of-sight direction) but the resolution of a video may be controlled to control the spatial disorientation. Reduction of resolution unlikely causes the visually induced motion sickness of the user. Furthermore, while the viewer is running, identification of detailed portion of a video is difficult, and even if the resolution is reduced, no bad effect is produced.

Figure 25:
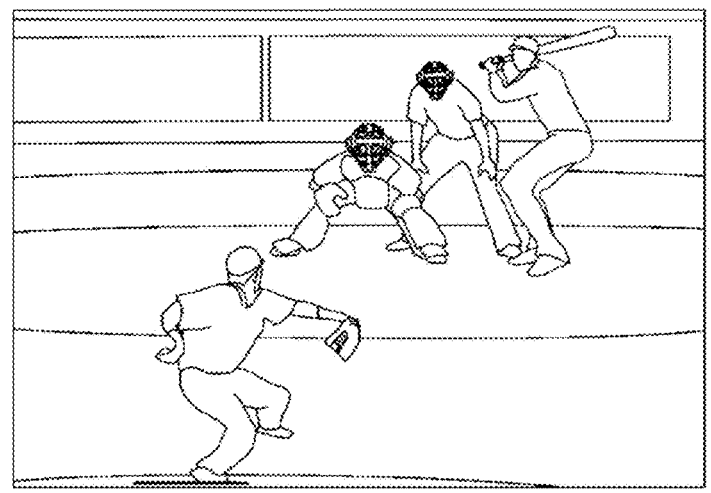
FIG. 25 is a diagram illustrating an example of using a visual effect, such as animation, to switch viewpoint positions.
Figure 26:
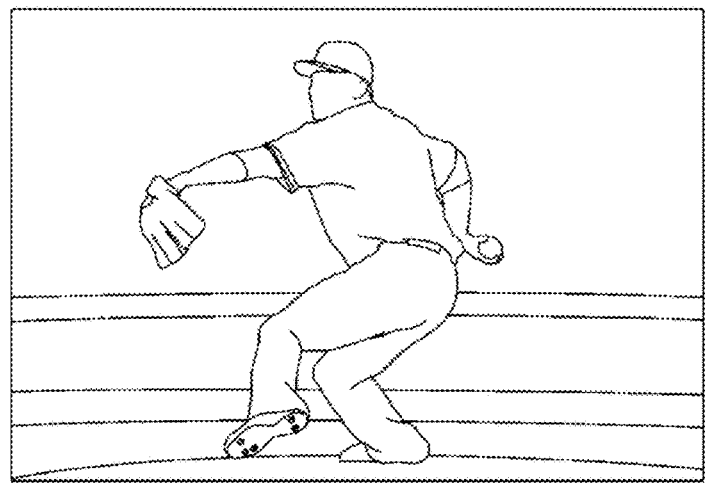
FIG. 26 is a diagram illustrating an example of using a visual effect, such as animation, to switch viewpoint positions.

The visual effect line according to (2) and the motion blur according to (3) are achieved by adding visual effects using animation or the like to videos displayed before and after movement in viewpoint position. Examples of visual effects are illustrated in FIGS. 27 to 36, as an example of watching baseball. The visual effects are inserted when switching viewpoint positions from a video showing the back of a pitcher captured by a video-providing device installed behind a center field (center field screen) as illustrated in FIG. 25, to a video displaying an image of the front side of the pitcher captured by a video-providing device installed behind a catcher as illustrated in FIG. 26. A visual effects, such as blur animation, following a jumping movement in a direction of a viewpoint position as a moving destination are inserted between videos displayed before and after switching viewpoint positions to delay the next video display time, and the spatial disorientation is prevented.

Figure 27:
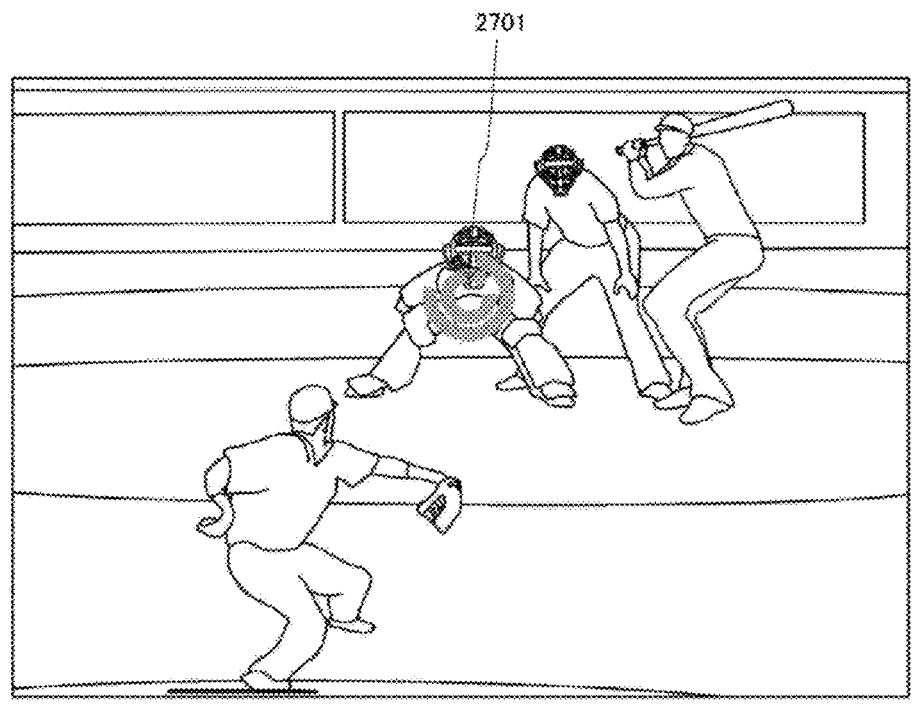
FIG. 27 is a diagram illustrating an example of using a visual effect, such as animation, to switch viewpoint positions.
Figure 28:
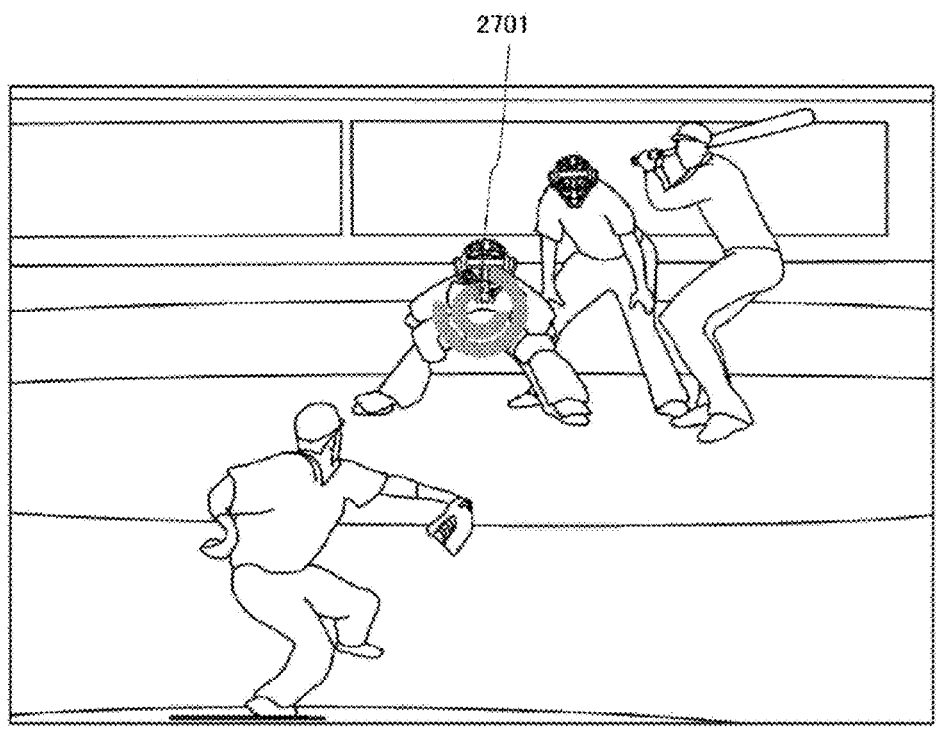
FIG. 28 is a diagram illustrating an example of using a visual effect, such as animation, to switch viewpoint positions.
Figure 29:
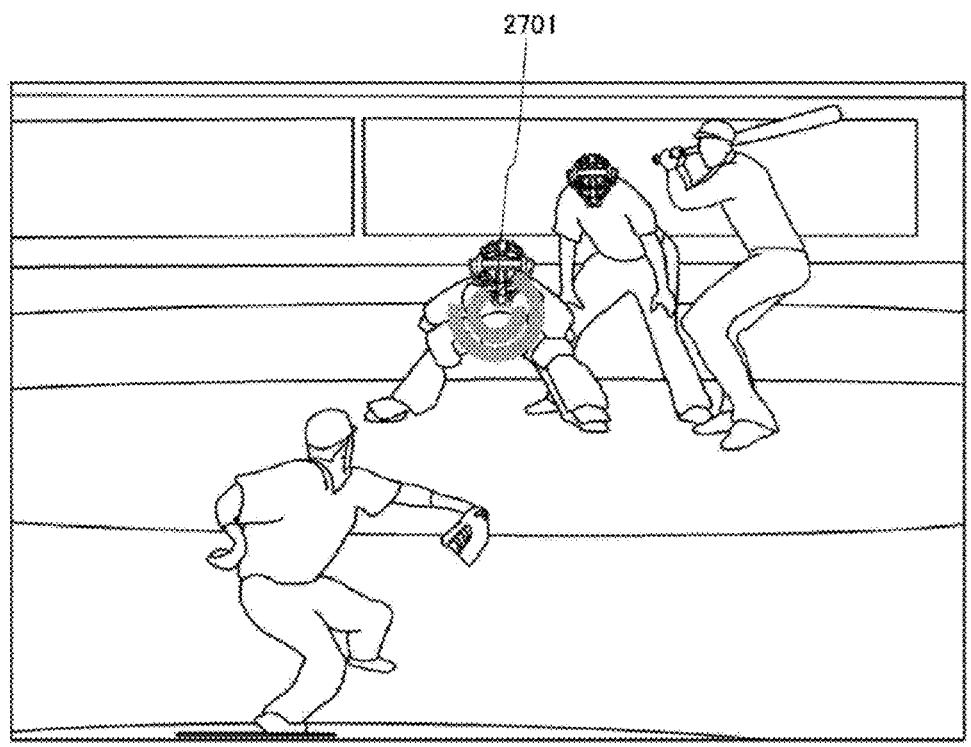
FIG. 29 is a diagram illustrating an example of using a visual effect, such as animation, to switch viewpoint positions.

First, as illustrated in FIG. 27, a cylindrical focus 2701 is displayed at a viewpoint position as a moving destination. As described above, in a case where a target mark is selected, the target mark is switched to display of the focus 2701. As illustrated in FIGS. 27 to 29, this focus 2701 may be animation indicating an elapsed time from the start of switching viewpoint positions (or a remaining time to the end of the switching viewpoint positions).

Figure 30:
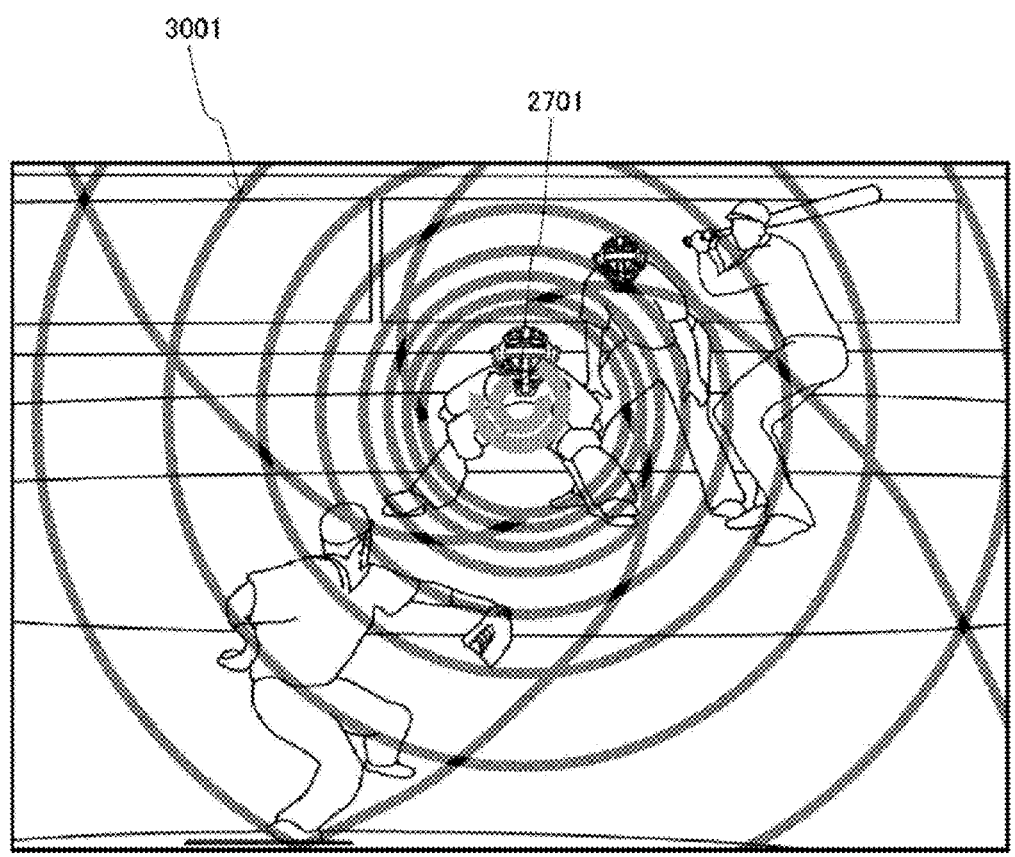
FIG. 30 is a diagram illustrating an example of using a visual effect, such as animation, to switch viewpoint positions.

Furthermore, as illustrated in FIG. 30, visual effect lines 3001 are displayed extending from a point at which the focus 2701 appears. The visual effect lines 3001 of FIG. 30 include an infinite number of concentric circles having intervals gradually reduced toward the viewpoint position as the moving destination (or the center of the focus 2701), visually expressing movement toward the center of the circles. As a matter of course, another visual effect line, such as "concentrated linework" having an infinite number of lines extending from the periphery to the viewpoint position as the moving destination, may be used.

The visual effect line 3001 has a visual effect of guiding (or inducing viewer's line of sight) to the viewpoint position as the moving destination (to a place in which the focus 2701 is disposed), and the spatial disorientation or the visually induced motion sickness can be suppressed.

Figure 31:
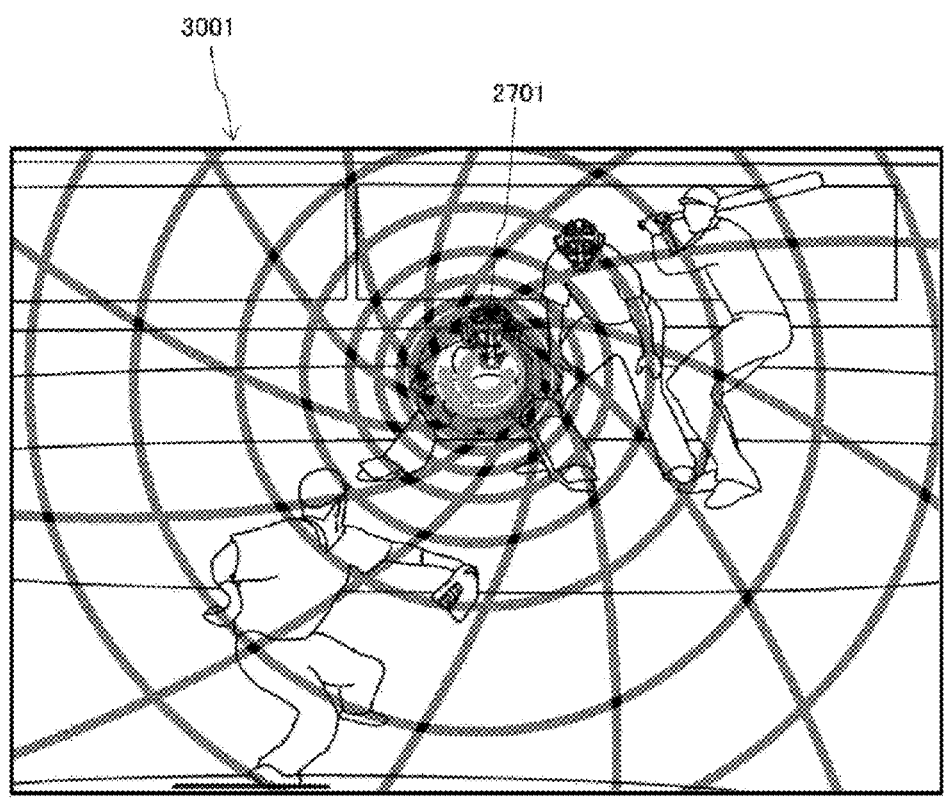
FIG. 31 is a diagram illustrating an example of using a visual effect, such as animation, to switch viewpoint positions.
Figure 32:
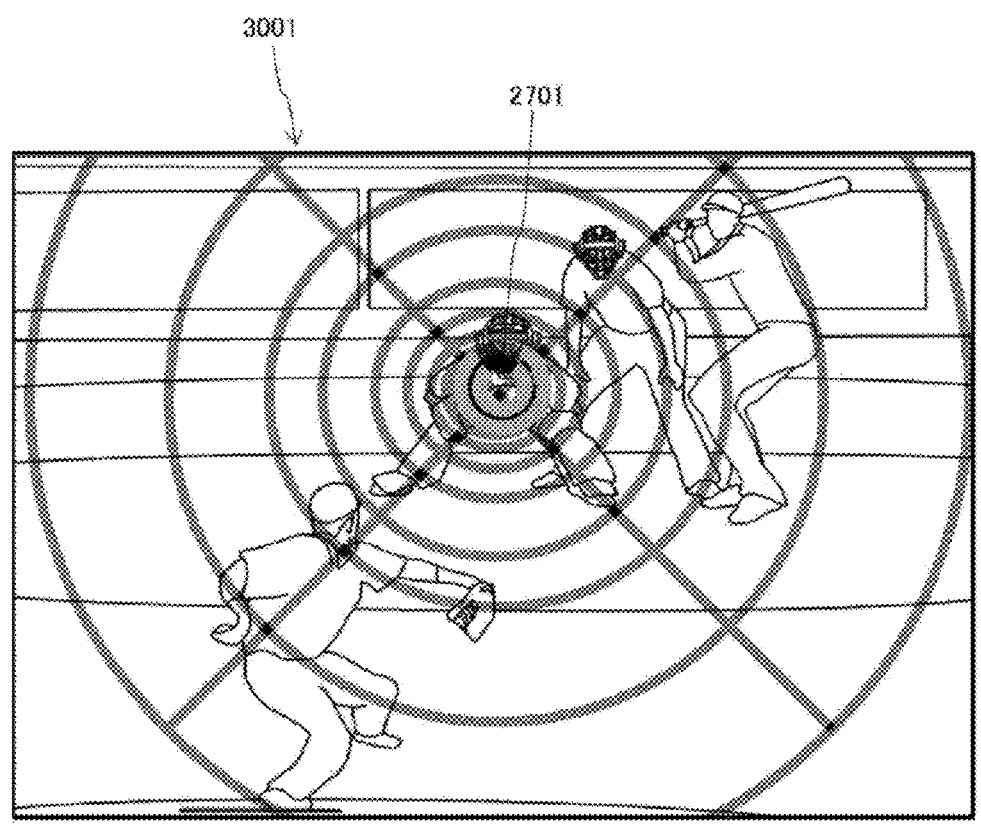
FIG. 32 is a diagram illustrating an example of using a visual effect, such as animation, to switch viewpoint positions.

Then, as illustrated in FIGS. 30 to 32, animation reducing the diameters of circles constituting the visual effect lines 3001 may be displayed to visually express movement to the center of the circles. Here, animation using the visual effect lines 3001 is synchronized with the acceleration of movement to the viewpoint position, and the motion sickness of the user (viewer) can be suppressed.

Figure 33:
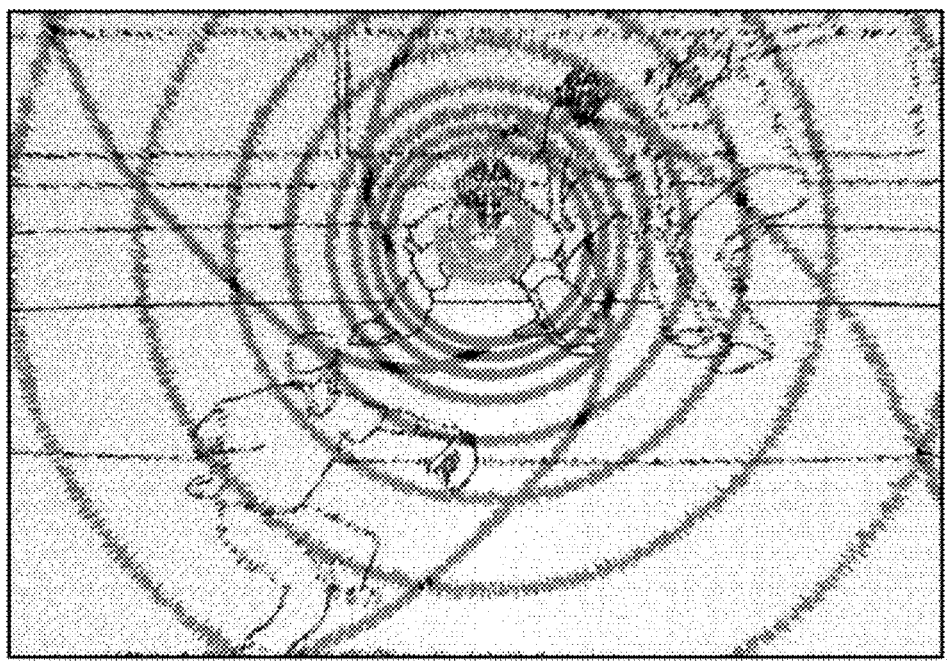
FIG. 33 is a diagram illustrating an example of using a visual effect, such as animation, to switch viewpoint positions.
Figure 34:
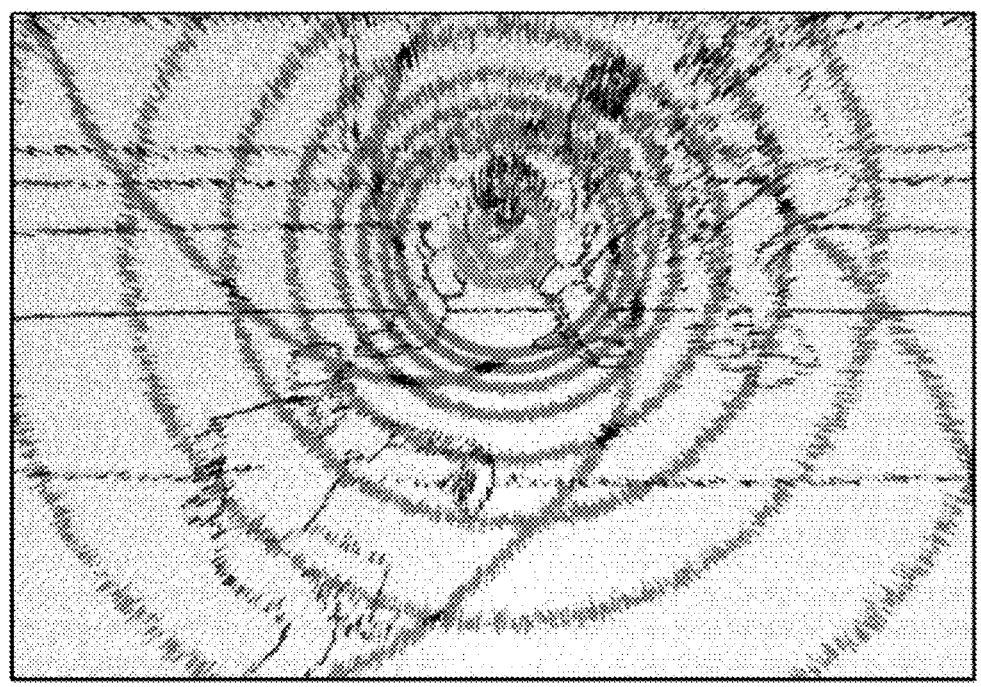
FIG. 34 is a diagram illustrating an example of using a visual effect, such as animation, to switch viewpoint positions.
Figure 35:
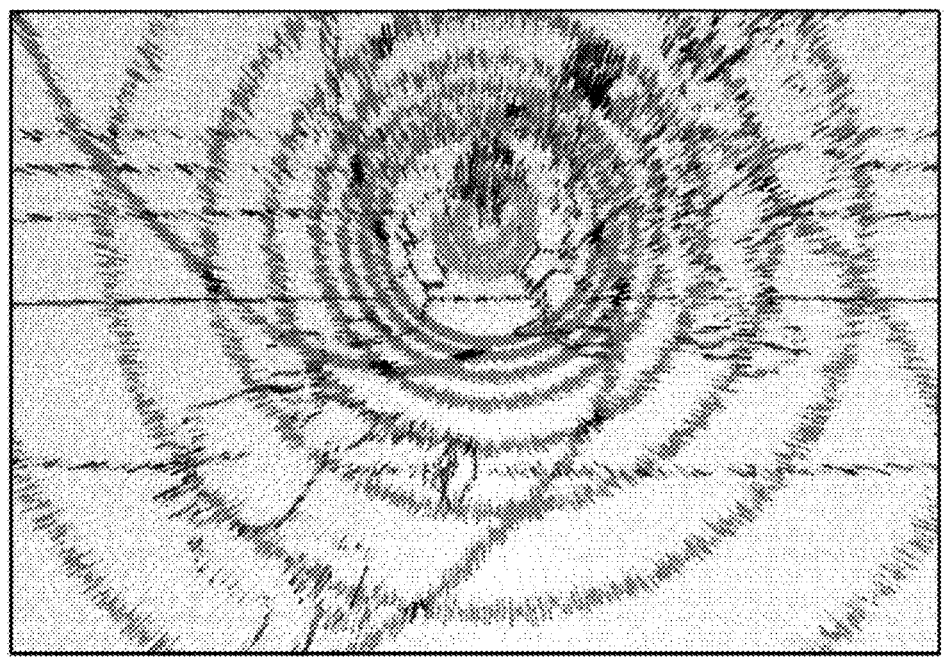
FIG. 35 is a diagram illustrating an example of using a visual effect, such as animation, to switch viewpoint positions.
Figure 36:
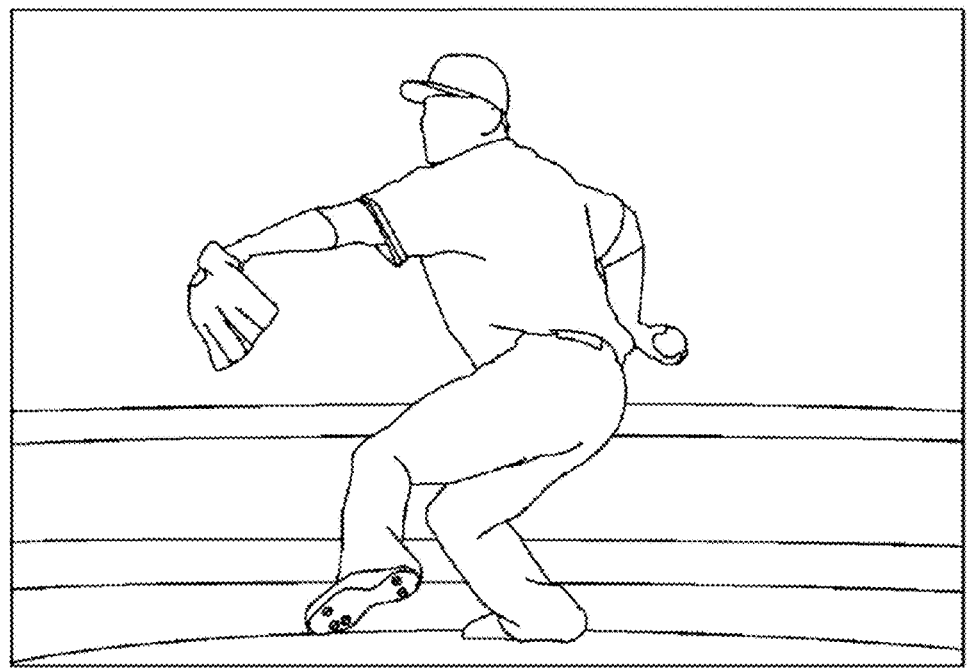
FIG. 36 is a diagram illustrating an example of using a visual effect, such as animation, to switch viewpoint positions.

Furthermore, as illustrated in FIGS. 33 to 35, after blur animation following a jumping movement toward the center of the circles (focus 2701) is inserted, switching is made to a video captured at the viewpoint position as the moving destination, as illustrated in FIG. 36. When the viewpoint positions are switched, a transition video using the visual effect line or blur is inserted, as illustrated in FIGS. 27 to 35. The blur also effectively reduces the resolution of an original video, and the spatial disorientation or the visually induced motion sickness of the user (viewer) can be suppressed. Furthermore, a display time of the transition video effectively buys time until switching the video-providing devices as the transmission sources is completed.

While the transition video using animation such as a visual effect line or blur is displayed as illustrated in FIGS. 27 to 35, the video-reproducing device transmits a request for stopping transmission to the video-providing device as the transmission source of a currently displayed video, and transmits a request for starting transmission to the video-providing device as the moving destination.

Furthermore, in a video-reproducing device including a multimodal interface (described above), effects such as application of wind (headwind) according to (4) or blowing objects such as leaves or paper chips according to (5) are used, and the spatial disorientation of the user (viewer) can be suppressed.

C-7. Procedure for Movement in Viewpoint

Figure 37:
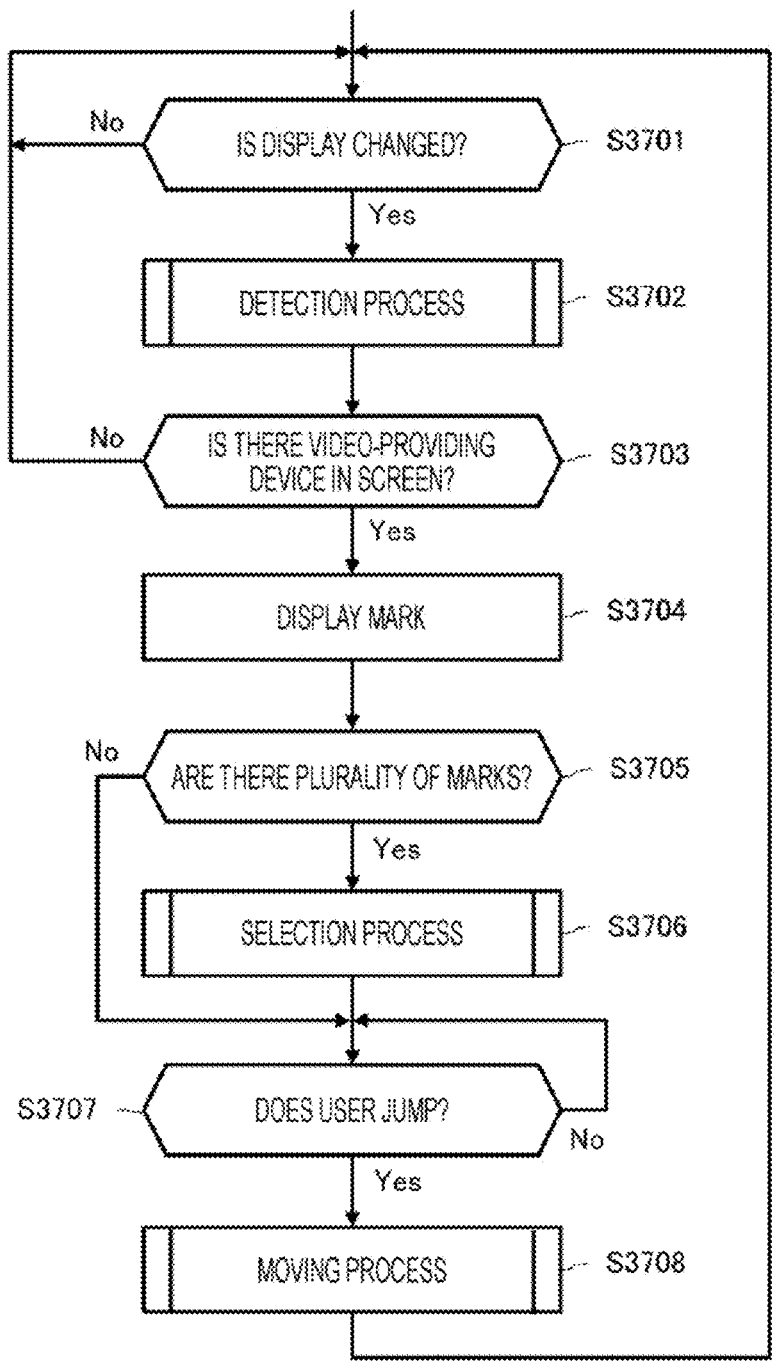
FIG. 37 is a flowchart illustrating a procedure for moving a viewpoint from which a displayed video is captured, in a video-reproducing device.

FIG. 37 is a flowchart illustrating a procedure for moving a viewpoint from which a displayed video is captured, in a video-reproducing device. In FIG. 37, the procedure can be achieved, for example, in a mode executing a predetermined program code in the control unit 1307 in the information processing device 1300 illustrated in FIG. 13.

In the video-reproducing device, whenever displayed videos are switched, including switching viewpoint positions, switching line-of-sight directions at the same viewpoint position, or the like (Yes in step S3701), video-providing devices in a current display screen is detected (step S3702).

In step S3702, the video-reproducing device may perform image recognition on a displayed video to detect video-providing devices included in a screen, may inquire of the external position management server, or may acquire positional information through direct communication with video-providing devices to determine the existence of video-providing devices in the screen (described above).

Then, whether a video-providing device is detected in the current display screen is checked (step S3703).

Here, in a case where no video-providing device is in the current display screen (No in S3703), the process returns to step S3701 into a standby state until the displayed video is switched next.

Furthermore, in a case where the existence of video-providing devices is confirmed on the current display screen (Yes in S3703), a target mark is displayed over each video-providing device in the display screen, for example, as illustrated in FIG. 17 (step S3704).

Places on which the target marks are applied (i.e., installation places of corresponding video-providing devices) are candidates for a moving destination of the viewpoint position. In a case where a plurality of video-providing devices, that is, a plurality of target marks are in the display screen (Yes in step S3705), the user (viewer) gazes at (or gazes at for a certain time) any one target mark from which a video is desired to be captured, and selects the viewpoint position (a video-providing device installed at the viewpoint position) (step S3706).

Then, when the user makes a jumping movement to give an instruction to move the viewpoint position to a place on which a target mark is applied (Yes in step S3707), a process of moving the viewpoint position to a video captured from the viewpoint position as the moving destination is started, in the video-reproducing device (step S3708).

The jumping movement of the user can be detected, for example, by the sensor unit 1308 in the video-reproducing device. The sensor unit 1308 includes a plurality of sensor elements, such as a gyro sensor, an acceleration sensor, and a geomagnetic sensor, a camera, and the like. Furthermore, the sensor unit 1308 may measure a load applied to a chair on which the user sits or a pressure acting between a user's foot and a ground surface with which the user's foot makes contact, such as a load (pressure) applied to a shoe sole of a user's shoe to detect the jumping movement. Furthermore, the user's brain waves or the like may also be measured in parallel to detect the jumping movement. As a matter of course, the user may give an instruction to move the viewpoint position via not the jumping movement but a normal input device, such as a keyboard or a mouse.

In the process of moving the viewpoint position in step S3708, the video-reproducing device transmits a request for stopping transmission to the video-providing device as the transmission source of a currently displayed video, and transmits a request for starting transmission to the video-providing device as the moving destination.

Furthermore, the process of moving the viewpoint position in step S3708 includes a display transition process of switching display to a video captured at the viewpoint position as the moving destination. In the display transition process, the video-reproducing device displays a transition video using animation such as a visual effect line or blur, as illustrated in FIGS. 27 to 35. The transition video effectively buys time until switching the viewpoint positions, and the spatial disorientation of the user is prevented.

Furthermore, in a video-reproducing device including a multimodal interface (described above), the display transition process in step S3708 includes application of wind in a direction of the moving destination or blowing objects such as leaves or paper chips, and the spatial disorientation of the user may be suppressed.

A video signal from the video-providing device as the moving destination reaches the video-reproducing device to start to display a video captured from the new viewpoint position, the movement in viewpoint position in step S3708 is finished. Then, the process returns to step S3701, and whenever the displayed video is switched by the video-reproducing device, a similar process as described above is repeatedly performed.

Figure 45:
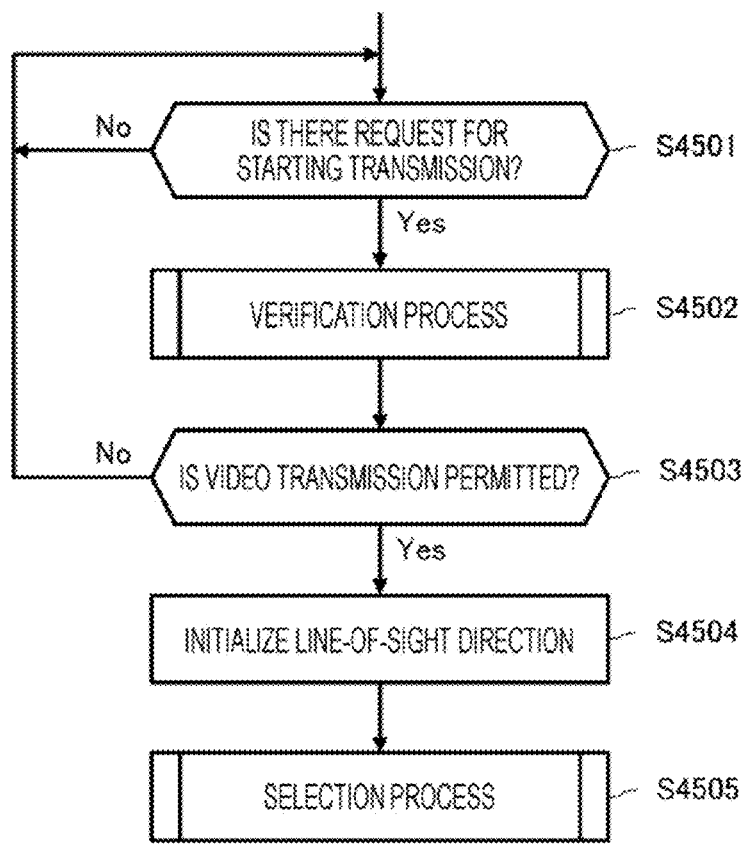
FIG. 45 is a flowchart illustrating a procedure for starting video transmission in a video-providing device put on standby.

FIG. 45 is a flowchart illustrating a procedure for starting video transmission in a video-providing device put on standby. In FIG. 45, the procedure can be achieved, for example, in a mode executing a predetermined program code in the request for starting transmission 1208 in the information processing device 1200 illustrated in FIG. 12.

When the video-providing device put on standby receives a request for starting transmission from any video-reproducing device during a standby state (Yes in step S4501), the video-providing device performs verification of user attributes or the like of the video-reproducing device as a request source (step S4502), and checks whether video transmission to the video-reproducing device is restricted (step S4503). The viewing restriction on the video-reproducing device has been described in section A-2.

In a case where video transmission is not permitted to the video-reproducing device as the request source (No in step S4503), the process returns to step S4501 into a standby state again until receiving a next request for starting transmission.

In contrast, in a case where video transmission is permitted to the video-reproducing device as the request source (Yes in step S4503), a line-of-sight direction is initialized as specified in the request for starting transmission received in step S4501 (step S4504), and transmission of a captured video is performed (step S4505).

Figure 46:
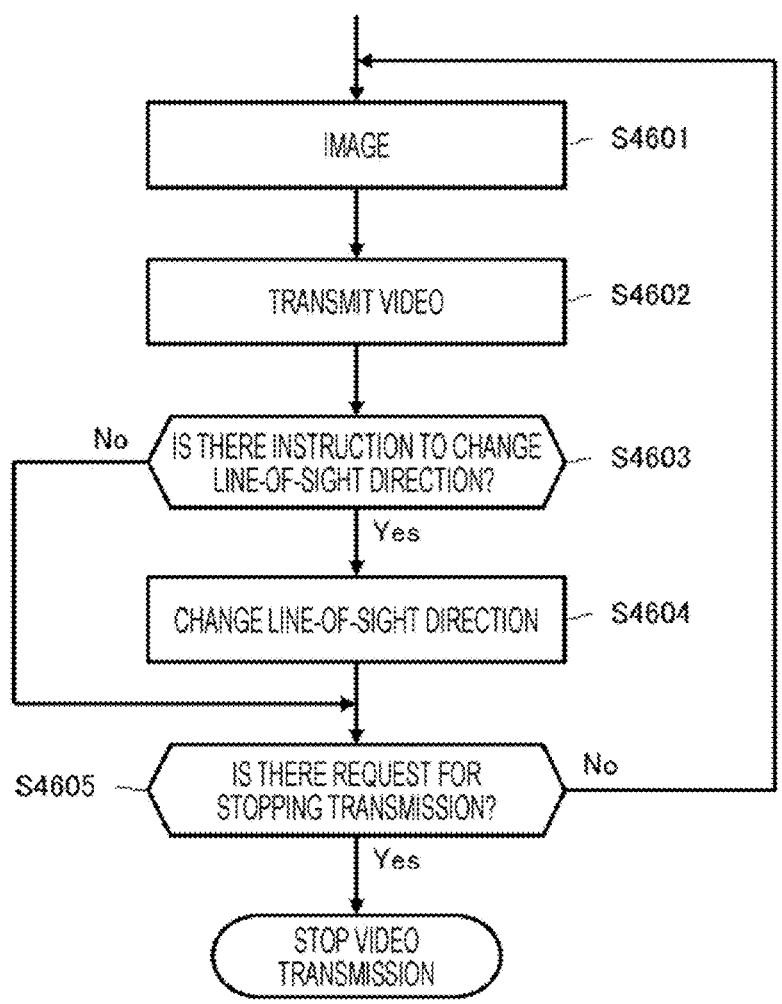
FIG. 46 is a flowchart illustrating a procedure performed during video transmission in a video-providing device.

Furthermore, FIG. 46 is a flowchart illustrating a procedure performed during video transmission in a video-providing device. In FIG. 45, the procedure can be achieved, for example, in a mode executing a predetermined program code in the request for starting transmission 1208 in the information processing device 1200 illustrated in FIG. 12.

The video-providing device performs imaging by the imaging unit 1201 (step S4601), encodes a video signal, and transmits the video signal to the video-reproducing device as the request source (step S4602).

Here, when a request for changing the line-of-sight direction is received from the video-reproducing device as a video transmission destination (step S4603), a line-of-sight direction is changed (step S4604). Change in line-of-sight direction is achieved by a method of physically changing the line-of-sight direction of the imaging unit 1201 itself, a method using an image processing to change a position at which a video to be transmitted is extracted from a full-dome video captured by the imaging unit 1201, or the like.

Before a request for stopping transmission of a video is received from the video-reproducing device as the video transmission destination (No in step S4605), the process returns to step S4601, and imaging and transmission of a capture video are repeatedly performed.

Then, when a request for stopping transmission of a video is received from the video-reproducing device as the video transmission destination (Yes in step S4605), this processing routine ends, and video transmission is finished.

INDUSTRIAL APPLICABILITY

Hereinbefore, a technology disclosed herein has been described in detail with reference to specific embodiments. However, it is obvious that those skilled in the art can make modifications and substitutions of the embodiments without departing from the spirit and scope of the technology disclosed herein. That is, the technology described herein has been disclosed by way of example, and the contents of the description of the present specification should not be construed in a limited manner. Claims are to be considered to determine the spirit and scope of the present technology.

Note that the technology disclosed herein also may have the following configurations.

(1) A display device includes
a spherical display unit,
a reception unit configured to receive an image from an external device, a sensor unit configured to measure a line of sight, a head position, or a posture of a user, and a control unit, in which when a first image received from a first external device is displayed on the display unit, the control unit receives a second image from a second external device included in the first image, on the basis of at least one of a line of sight, a head position, and a posture of a user measured by the sensor unit, and the control unit causes the display unit to display the second image.

(2) The display device according to (1) further includes a transmission unit configured to transmit information to the external device, in which the control unit transmits information measured by the sensor unit to the second device to display the second image.

(3) The display device according to any of (1) and (2), further includes a sound collection unit, in which the control unit transmits audios collected by the sound collection unit to the external device.

(4) The display device according to any of (1) to (3) further includes at least one of an air blowing unit, a temperature control unit, a moisture control unit, a tactile control unit, a vibration control unit, and a scent generation unit, in which the control unit controls the air blowing unit, the temperature control unit, the moisture control unit, the tactile control unit, the vibration control unit, and the scent generation unit, depending on a content of an image received from the external device and displayed on the display unit.

(5) The display device according to any of (1) to (4) further includes a measurement unit configured to measure pressure acting between a user's foot and a ground surface with which the user's foot makes contact, in which the control unit switches the first image and the second image to control display according to a result of measurement by the measurement unit.

(6) The display device according to (1) to (5) further in which the display unit includes a plurality of projection units configured to project images on a screen, and the control unit controls the projection unit to prevent generation of a shadow on the screen.

(7) An information processing terminal device includes an imaging unit, a transmission unit configured to transmit an image captured by the imaging unit, a reception unit configured to receive a predetermined signal from an external device, and a control unit, in which the control unit controls transmission of an image captured by the imaging unit to the external device, on the basis of line-of-sight information or posture information contained in the predetermined signal.

(8) The information processing terminal device according to (7), in which the imaging unit captures a full dome image, and the control unit controls identification of a predetermined image from the full dome image and transmission of the predetermined image, on the basis of the line-of-sight information or the posture information.

Alternatively, that the technology disclosed herein also may have the following configurations.

(11) An information processing device including a communication unit configured to communicate with a reproducing device, a line-of-sight direction changing unit configured to change a line-of-sight direction in which a video transmitted to the reproducing device is captured, and a control unit configured to control video transmission to the reproducing device.

(12) The information processing device according to (11), further including a status indicator configured to indicate a state of the information processing device.

(13) The information processing device according to (12), in which the status indicator indicates whether a video is being transmitted to the reproducing device.

(14) The information processing device according to any of (11) to (13), further including an imaging unit, in which the line-of-sight direction changing unit changes a line-of-sight direction of the imaging unit or changes an area in which a video to be transmitted is extracted from a full-dome video captured by the imaging unit.

(15) The information processing device according to (14), further including a support configured to support the imaging unit, in which the control unit causes the support to support the imaging unit to have a predetermined posture, in a standby state for video transmission.

(16) The information processing device according to any of (11) to (15), in which the control unit starts video transmission in accordance with a request for starting transmission from the reproducing device, and stops video transmission in accordance with a request for stopping transmission from the reproducing device.

(17) The information processing device according to (16), in which the line-of-sight direction changing unit sets a line-of-sight direction in which a video is captured, as specified in the request for starting transmission.

(18) The information processing device according to any of (11) to (17), in which the line-of-sight direction changing unit changes a line-of-sight direction in which a video is captured, in accordance with an instruction from the reproducing device.

(19) An information processing method including a line-of-sight direction changing step for changing a line-of-sight direction in which a video transmitted to a reproducing device is captured, and a control step for controlling video transmission to the reproducing device.

(20) An information processing device including a communication unit configured to communicate with an imaging device, and a control unit configured to control display of a video received from the imaging device, and give an instruction about a line-of-sight direction in which the imaging device performs imaging, in which the control unit detects a second viewpoint position included in a first video captured at a first viewpoint position, and causes the first video on which a mark indicating the second viewpoint position is overlaid to be displayed.

(21) The information processing device according to (20), further including
a detection unit configured to detect operation to the mark,
in which the control unit controls switching to display of a second video captured at the second viewpoint position, in accordance with a detection result of the detection unit.

(22) The information processing device according to (21), in which
the detection unit detects the operation on the basis of operation of a user viewing a displayed video.

(23) The information processing device according to (22), in which
the detection unit detects the operation on the basis of at least one of or a combination of at least two of an acceleration sensor configured to detect acceleration of a head of the user, an image showing the user, a load applied to a chair on which the user sits, and a load or pressure applied to a shoe sole of a shoe of the user.

(24) The information processing device according to any of (21) to (23), in which
in accordance with a detection result of the detection unit, the control unit causes a request for stopping video transmission to be transmitted to a first imaging device imaging at the first viewpoint position, and causes a request for starting transmission of a video to be transmitted to a second imaging device imaging at the second viewpoint position.

(25) The information processing device according to (24), in which
the control unit specifies a line-of-sight direction for the second imaging device to have the same direction as that of the first imaging device.

(26) The information processing device according to any of (21) to (25), in which
the control unit causes a transition video to be displayed while the first video is switched to the second video.

(27) The information processing device according to (26), in which
the control unit causes the transition video including at least one of a visual effect line and blur to be displayed,
the visual effect line is configured to induce a line of sight to the second viewpoint position in the first video, and the blur is configured to follow a jumping movement in a direction of the second viewpoint position.

(28) The information processing device according to any of (20) to (27), further including
a detection unit configured to detect a movement of a head of a user viewing a displayed video,
in which the control unit gives an instruction to the imaging device about a line-of-sight direction, in accordance with a detection result of the detection unit.

(29) An information processing method including
a communication step for communicating with an imaging device, and
a control step for controlling display of a video received from the imaging device, and giving an instruction about a line-of-sight direction in which the imaging device performs imaging,
in which the control step includes detecting a second viewpoint position included in a first video captured at a first viewpoint position, and causing the first video on which a mark indicating the second viewpoint position is overlaid to be displayed.

(30) An information communication system including
a plurality of transmission devices configured to transmit videos captured at different viewpoint positions, and
a reception device configured to display a video received from any of the plurality of transmission devices,
in which to receive a first video captured at a first viewpoint position by the reception device, a second viewpoint position included in the first video is detected to display the first video on which a mark indicating the second viewpoint position is overlaid.

REFERENCE SIGNS LIST

100 Video viewing system
101 Video-providing device
102 Video-reproducing device
200 Video viewing system
201 Video-providing device
202 Video-reproducing device
300 Video viewing system
301 Video-providing device
302 Video-reproducing device
400 Video viewing system
401 Video-providing device
402 Video-reproducing device
500 Video-providing device
501 Imaging unit
502 Support portion
503, 504 Microphone (stereo microphone)
1200 Information processing device (video-providing device)
1201 Imaging unit
1202 Status indicator
1203 Video encoding unit
1204 Sound input unit
1205 Audio encoding unit
1206 Multiplexer
1207 Communication unit
1208 Control unit
1300 Information processing device (video-reproducing device)
1301 Communication unit
1302 Demultiplexer (DEMUX)
1303 Audio decoding unit
1304 Audio output unit
1305 Video decoding unit
1306 Display unit
1307 Control unit
1308 Sensor unit
1309 Sound collection unit
1310 Multimodal interface
4700 Image display device
4701 Dome screen
4702 Support
4702A, 4702B Shaft portion
4703, 4704, 4708, 4709 Projector
4706 Chair

The invention claimed is:
1. A display device comprising:
a spherical display unit;
a reception unit configured to receive an image from an external device;
a sensor unit configured to measure a line of sight, a head position, or a posture of a user;
a control unit, wherein when a first image received from a first external device is displayed on the display unit, the control unit receives a second image from a second external device included in the first image, on the basis of at least one of a line of sight, a head position, and a posture of a user measured by the sensor unit, and the control unit causes the display unit to display the second image; and a transmission unit configured to transmit information to the external device, wherein the control unit transmits information measured by the sensor unit to the second device to display the second image.

2. A display device comprising:

a spherical display unit;

a reception unit configured to receive an image from an external device;

a sensor unit configured to measure a line of sight, a head position, or a posture of a user;

a control unit, wherein when a first image received from a first external device is displayed on the display unit, the control unit receives a second image from a second external device included in the first image, on the basis of at least one of a line of sight, a head position, and a posture of a user measured by the sensor unit, and the control unit causes the display unit to display the second image; and a sound collection unit, wherein the control unit transmits audios collected by the sound collection unit to the external device.

3. A display device comprising:

a spherical display unit;

a reception unit configured to receive an image from an external device;

a sensor unit configured to measure a line of sight, a head position, or a posture of a user;

a control unit, wherein when a first image received from a first external device is displayed on the display unit, the control unit receives a second image from a second external device included in the first image, on the basis of at least one of a line of sight, a head position, and a posture of a user measured by the sensor unit, and the control unit causes the display unit to display the second image; and a measurement unit configured to measure pressure acting between a user's foot and a ground surface with which the user's foot makes contact, wherein the control unit switches the first image and the second image to control display according to a result of measurement by the measurement unit.

* * * * *